United States Patent [19]

Brewer et al.

[11] Patent Number: 5,440,702
[45] Date of Patent: Aug. 8, 1995

[54] DATA PROCESSING SYSTEM WITH CONDITION CODE ARCHITECTURE FOR EXECUTING SINGLE INSTRUCTION RANGE CHECKING AND LIMITING OPERATIONS

[75] Inventors: Kevin J. Brewer, Kokomo; Scott L. Linke, Flora, both of Ind.

[73] Assignee: Delco Electronics Corporation, Kokomo, Ind.

[21] Appl. No.: 964,138

[22] Filed: Oct. 16, 1992

[51] Int. Cl.⁶ ............................................. G06F 7/48
[52] U.S. Cl. ........................... 395/375; 364/DIG. 1; 364/DIG. 2; 364/258; 364/258.1; 364/258.2; 364/259; 364/259.2; 364/937.1
[58] Field of Search ................ 364/DIG. 1 MS File, 364/DIG. 2 MS File, 736, 736.5, 737, 745; 395/375, 500, 575, 800

[56] References Cited

U.S. PATENT DOCUMENTS

| | | | |
|---|---|---|---|
| 4,107,614 | 8/1978 | Sugai | 325/348 |
| 4,288,753 | 8/1979 | Babano | 330/57 |
| 4,589,087 | 5/1986 | Auslander et al. | 364/768 |
| 4,774,688 | 9/1988 | Kobayashi et al. | 364/900 |
| 4,792,894 | 12/1988 | Artz et al. | 364/200 |
| 4,967,346 | 10/1990 | Kodama et al. | 364/200 |
| 5,031,135 | 7/1991 | Patel et al. | 364/745 |

FOREIGN PATENT DOCUMENTS

| | | | |
|---|---|---|---|
| 0154051 | 9/1985 | European Pat. Off. | |
| 0345819 | 12/1989 | European Pat. Off. | |
| 482290 | 4/1992 | European Pat. Off. | H03G 3/34 |
| 3108407 | 9/1982 | Germany | A61B 5/12 |
| 3930068 | 3/1991 | Germany | H04B 15/00 |
| 60-142735A | 7/1985 | Japan | |
| 2081541 | 2/1982 | United Kingdom | H03G 3/34 |
| 2083961 | 3/1982 | United Kingdom | H03G 11/08 |
| 2178575 | 2/1987 | United Kingdom | |

OTHER PUBLICATIONS

Murugesan, 'Digital Offsetter with Output Clamping', Electronic Engineering, vol. 55, No. 682, Oct. 1983, London, p. 41.

Russell, "The PDP-II: Case Study of How *Not* to Design Condition Codes," Conf. Proc. Annual Symp. of Computer Architecture 5th, Palo Alto Calif., Apr. 3–5, 1978 (IEEE Cat. n 78CH 1284-9c), pp. 190–194.

"ALU Implementing Native Minimum/Maximum Function for Signal Processing Applications," IBM Tech. Disclosure Bulletin, vol. 29, No. 5, Oct. 1986, pp. 1975–1978.

*Primary Examiner*—Robert B. Harrell
*Attorney, Agent, or Firm*—Jimmy L. Funke

[57] ABSTRACT

A data processing system having a mathematically consistent condition code architecture is disclosed for implementing single instruction range checking and limiting operations. The data processing system includes condition code flags that are set to provide indications of the occurrence of arithmetic overflow and the direction of the arithmetic overflow for all of the possible arithmetic operations that can be performed by an arithmetic logic unit within the digital processing system. Based upon the indicated occurrence of arithmetic overflow and the direction of the overflow, the numeric value of a software variable generated by one of the arithmetic operations is limited to an appropriate upper or lower bound of a predetermined range of acceptable values, if the numeric value was generated with the occurrence of arithmetic overflow, or the numeric value was generated without the occurrence of overflow, but was outside of the acceptable range of values.

14 Claims, 22 Drawing Sheets

DATA PROCESSING SYSTEM WITH CONDITION CODE ARCHITECTURE FOR EXECUTING SINGLE INSTRUCTION RANGE CHECKING AND LIMITING OPERATIONS

BACKGROUND OF THE INVENTION

The present invention relates generally to the field of data processing systems, and more particularly to a data processor having a mathematically consistent condition code architecture for executing single instruction range checking and limiting operations.

With the advent of microprocessors, the number of applications using digital data processors has rapidly expanded. Due to their speed and versatility, microprocessors have been found to be particularly useful in performing control functions, as for example, in modern microprocessor based engine control systems. In such applications, it is often necessary to perform range checking and limiting operations on software variables to ensure that their values do not exceed acceptable limits.

In the past, these kind of range checking and limiting operations were typically accomplished by comparing the value of a software variable with a stored limiting value (upper or lower bound), and if the value of the variable exceeded the limiting value (greater than the upper bound or less than the lower bound), then the value of the variable was replaced by the limiting value. This process requires the execution of a sequence of several machine instructions for carrying out a single range checking and limiting operation. Since these operations are required frequently in programs employed in control applications, these sequences tend to consume large amounts of program memory and increase program execution time. Accordingly, there exists a need for a microprocessor that has the ability to perform a range checking and limiting operation on a software variable via a single machine instruction.

Another problem that is generally not addressed, when performing conventional range checking and limiting operations, is that of arithmetic overflow. An overflow occurs when a numeric result produced by an arithmetic operation (unsigned or signed) exceeds the permissible size of the data object's representation in the microprocessor's arithmetic logic unit (ALU), in which case the result is mathematically undefined. Consequently, to properly perform a range checking and limiting operation on a software variable, it first must be known whether the value of the variable is the result of an arithmetic overflow, and second, the direction of the overflow (either positive or negative) must also be known. If such information is not available when performing range checking and limiting operations, the software variable may not be limited when it actually should have been, or it may be set to the wrong limiting value (i.e., set to the upper limiting value when it should have been set to the lower limiting value, or vice versa).

In conventional microprocessor systems, arithmetic overflow conditions resulting from the execution of mathematical operations in the ALU are typically indicated by setting condition code bits (flags) in a status register. Existing condition code architectures usually provide an indication of unsigned arithmetic overflow by setting a condition code carry bit (C-bit). This bit is set whenever an arithmetic operation generates a carry-out or a borrow-in within the ALU, which produces unsigned arithmetic overflow in the positive or negative direction, respectively. However, the carry bit is generally not used exclusively as an unsigned overflow indicator. It is also used as a bit accumulator during ALU shift and rotate operations. Shift operations are commonly used as optimized multiply and divide (by powers of two) operations, and when so used, the C-bit is not always a valid unsigned overflow indicator (depending upon the type of shift operation performed). Also, some data processors include unsigned multiply and divide operations in their instruction sets, which generally do not treat the C-bit as an unsigned overflow indicator.

Indications of signed arithmetic overflow are typically provided by a condition code overflow bit (V-bit). This bit is usually set when an arithmetic operation generates a result that cannot be properly represented in 2's complement form in the ALU. Since 2's complement numbers can be positive or negative, signed arithmetic overflow also occurs in either a positive or negative direction. Historically, for simple operations such as add, subtract, and compare, the states of the V-bit, and a condition code negative bit (N-bit) have been used to indicate both a signed overflow and its direction. For example, when the V-bit and the N-bit are both set to logic 1 values, signed overflow is said to be in the positive direction, and when V-bit is set to a logic 1 value and the N-bit is set to a logic 0 value, signed overflow is said to be in the negative direction. Here again, traditional condition code architectures do not provide for setting the condition codes to correctly indicate signed overflow with direction for shift, multiply and divide operations. Thus, existing condition code architectures do not behave in a systematic fashion when indicating the occurrence of overflow for the various arithmetic operations.

In order to correctly perform range limiting and checking operations, a condition code architecture that deals consistently with arithmetic overflows produced by arithmetic operations is required. Since it is not always possible or practical to ascertain the exact arithmetic instruction used in performing a particular arithmetic operation (for example, a shift may be used for multiplying or dividing by powers of two), all of the instructions in a microprocessor's instruction set that can be used to perform arithmetic operations must provide the necessary arithmetic overflow and direction of arithmetic overflow information in a consistent manner. This applies to instructions for performing primitive arithmetic operations (such as add, subtract, and arithmetic shift operations, including logical shifts), as well as to those instructions performing operations that can be decomposed into sequences of primitive arithmetic operations (such as multiply and divide operations).

In the description that follows the term "mathematically consistent" will be used when referring to condition codes and condition code architectures that deal with the occurrence of arithmetic overflow (unsigned and/or signed) in a consistent manner, when executing all instructions in a microprocessor's instruction set that are capable of performing arithmetic operations. Unless a microprocessor includes such a condition code architecture, the exceptions and special cases required for dealing with the various arithmetic instructions would make range checking and limiting sequences complex, lengthy, and nearly impossible to implement in a single instruction format.

In view of the foregoing, there exists a need for a data processing system that includes a mathematically consistent condition code architecture for executing single instruction range checking and limiting operations.

SUMMARY OF THE INVENTION

The general object of the present invention is to provide a data processing system that deals with arithmetic overflows in a consistent fashion so that single instruction range checking and limiting operations are practicable.

Accordingly, another object of the present invention is to provide a data processing system for operating on a numeric value of a software variable generated by the data processing system to ensure that the numeric value is within a predetermined range of acceptable values established by an upper bound and a lower bound.

The above and other objects of the present invention are achieved by implementing a data processing system with a mathematically consistent condition code architecture. This condition code architecture affords a status for each arithmetic operation performed in an arithmetic logic unit in a consistent manner for the execution of each instruction selected from a set of defined arithmetic instructions for the data processing system. Preferably, the status of each arithmetic operation is provided by a register containing condition code flags that are set to provide indications of the occurrence of arithmetic overflow (unsigned and/or signed) and a direction for the arithmetic overflow, for all of the data processing system's instructions that are capable of effectuating arithmetic operations in the arithmetic logic unit.

The data processing system is implemented to perform range checking and limiting operations on the numeric values of software variables generated by arithmetic operations performed in the arithmetic logic unit. These operations are based upon the setting of the condition code flags. In accordance with these operations, the numeric value of a software variable is preferably: (A) limited to its upper bound when either the numeric value was generated with the occurrence of arithmetic overflow in a positive direction, or the numeric value is greater than the upper bound and was generated without the occurrence of arithmetic overflow; and (B) limited to its lower bound when either the numeric value was generated with the occurrence of arithmetic overflow in a negative direction, or the numeric value is less than the lower bound and was generated without the occurrence of arithmetic overflow.

By consistently dealing with arithmetic overflows in the above fashion for all arithmetic instructions, a minimal set of single instruction range checking and limiting operations is made possible, since there is no need to have a special sequence of operations for each different arithmetic operation.

Also, by indicating both the occurrence of arithmetic overflow, either unsigned or signed, and the direction of the arithmetic overflow, a priori knowledge of the particular unsigned or signed arithmetic instruction that was executed to generate the numeric value of the software variable is not required.

These and other aspects and advantages of the invention may be best understood by reference to the following detailed description of the preferred embodiments when considered in conjunction with the accompanying drawings.

DESCRIPTION OF THE PREFERRED EMBODIMENTS

Figure 1:
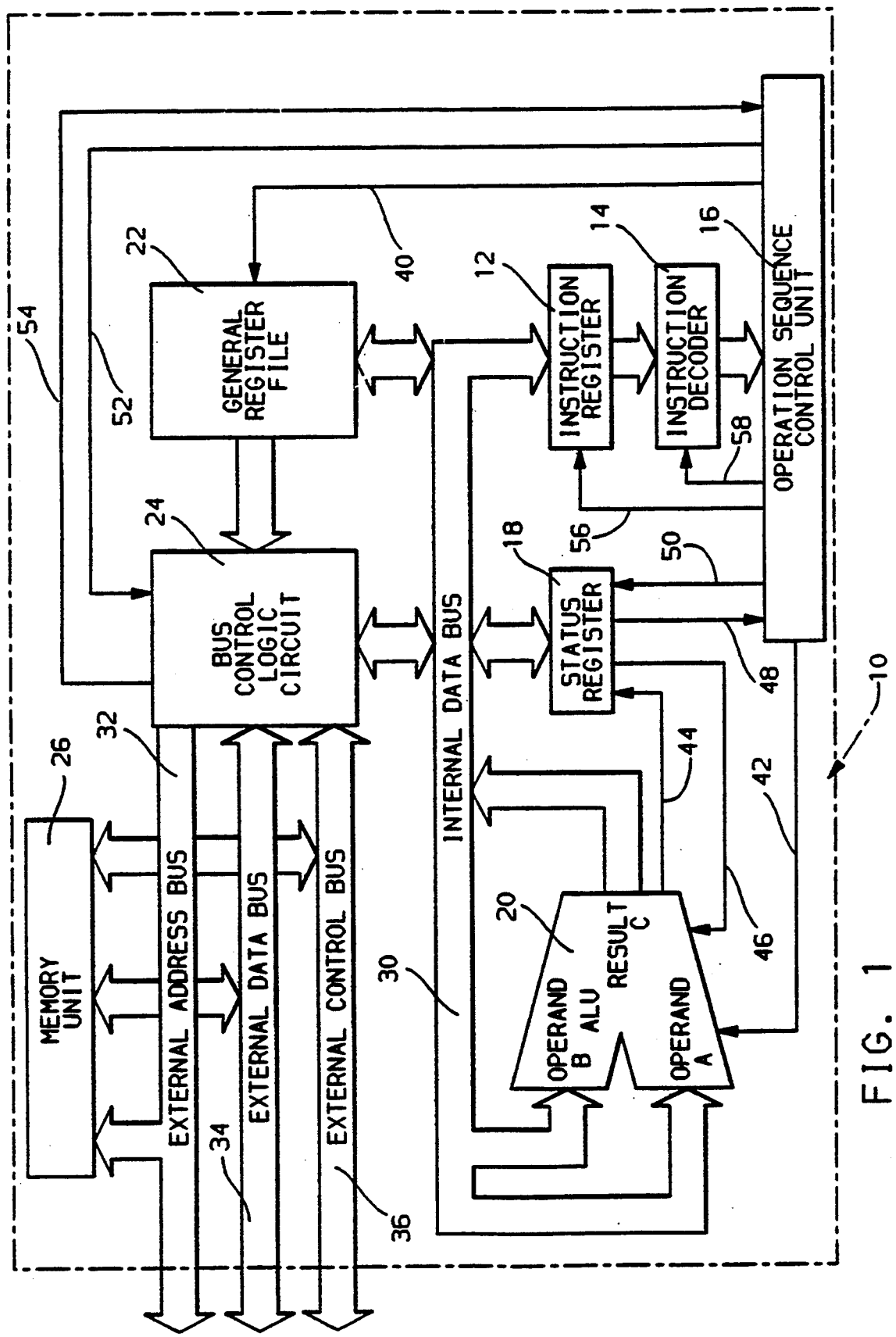
FIG. 1 illustrates in block diagram form, a microprocessor configuration that includes a mathematically consistent condition code architecture for executing single instruction range checking and limiting operations in accordance with the principles of the present invention.

In the description that follows, similar parts or structures used in the figures will be designated with like numerals, and where such parts and structures have been previously discussed with respect to an earlier figure, the description will not be repeated. Also, since the present invention resides primarily in a novel architectural combination and the method of operation of well-known computer circuits and devices, and not in the specific detailed structure thereof, the structure, control, and arrangement of these well-known circuits and devices are illustrated in the drawings by use of readily understandable block representations and schematic diagrams, which show only the specific details pertinent to the present invention. This is done in order not to obscure the disclosure with structural details which will be readily apparent to those skilled in the art in view of the description herein.

Referring now to FIG. 1, there is shown in block diagram form, a microprocessor configuration generally designated by the numeral 10, that operates in accordance with the principles of the present invention. Microprocessor 10 is conventional to the extent that it includes an instruction register 12, an instruction decoder 14, an operation sequence control unit 16, a status register 18, an arithmetic logic unit (ALU) 20, a general register file 22, a bus control logic circuit 24, and a memory unit 26. However, the operation sequence control unit 16, the status register 18, and the ALU 20 are implemented to provide microprocessor 10 with a mathematically consistent condition code architecture that enables the execution of single instruction range checking and limiting operations.

Also shown in the block diagram of FIG. 1 are various signal paths connecting the above enumerated components. These signal paths include internal data bus 30, external address bus 32, external data bus 34, and external control bus 36, and several numbered control and data lines. It will be understood that signal paths between components shown schematically as single lines, will in general, include multiple paths to accommodate the transfer of the necessary control and data signals between the components.

Turning now to the individual components of microprocessor 10, the general register file 22 includes several special purpose registers customarily used in microprocessors, such as a program counter, a zero resource, a stack pointer, a stack frame pointer, and other data, address and index registers. The contents of these registers can be sent to the bus control logic circuit 24 or the internal data bus 30 under the control of the operation sequence control unit 16 via control signals transmitted along line 40. Likewise, data from the internal data bus 30 can also be loaded into registers within the general register file 22.

The ALU 20 is configured to receive one or more operands (operand A, or operands A and B) from the internal data bus 30. In response to control signals provided by the operation sequence control unit 16 via line 42, the ALU 20 performs arithmetic and/or logic operations on the operand A, or operands A and B to generate a result C. For the purpose of simplifying the description of the present invention, the ALU 20 will be shown as containing separate registers for storing operand A, operand B, and result C, however, these registers can and typically are located in general register file 22. The status register 18 is usually included in the general register file 22, but again, for the purpose of clarifying the explanation of the present invention, the status register 18 is also shown as being separated from the general register file 22.

The status register 18 contains condition code bits (flags) that are set to provide a status of arithmetic and/or logical operations carried out by the ALU 20. The condition codes can be set or reset directly by the ALU 20, via control signals sent over line 44, or values for the condition codes can be loaded from or driven onto the internal data bus 30 in response to control signals received from the operation sequence control unit 16 over line 50. Note also that the ALU 20 and the operation sequence control unit 16 have direct access to read the values of the condition codes by way of the data lines 46 and 48, respectively.

In the preferred embodiments, the status register 18 is actually included in the general register file 22, but for the purpose of explaining the present invention, the status register 18 is shown as being separated from the general register file 22.

The operation of the bus control logic circuit 24 is also controlled by the operation sequence control unit 16. Basically, the bus control logic circuit 24 functions to transfer data between the internal data bus 30 and memory locations within the memory unit 26 specified by addresses contained within registers in the general register file 22 (or those register contents placed on the internal data bus 30 following simple addition or subtraction in the ALU 20) as controlled by the operation sequence control unit 16 via control and acknowledge signals carried by lines 52 and 54, respectively.

During operation, microprocessor 10 fetches a machine instruction from memory unit 26 under the control of the operation sequence control unit 16 in the customary fashion, by way of the external data bus 34 and the internal data bus 30. The fetched instruction is then stored in the instruction register 12, to await execution.

Figure 2:
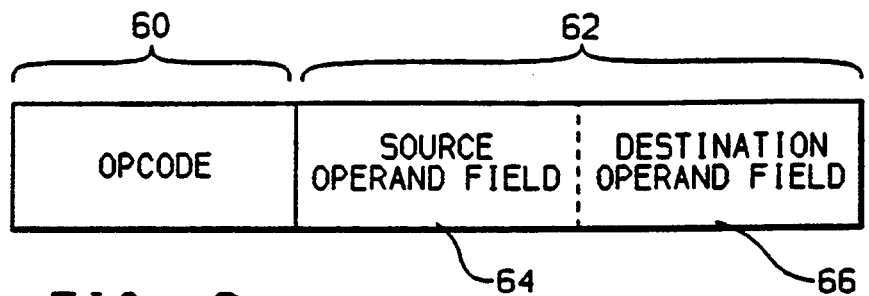
FIG. 2 illustrates diagrammatically the format for a machine instruction used by the microprocessor of the present invention.

As shown diagrammatically in FIG. 2, the stored machine instruction word includes an operation code field (or opcode) 60, and an operand field 62. The bit pattern of the opcode in the operation code field 60 defines the operation that is to be performed by the microprocessor 10, and the addressing mode used by the instruction. The operand field 62 may contain data identifying registers in the general register file 22, addresses for storing data, retrieving data, or changing program flow, and, in some cases, immediate data for use in the microprocessor 10. For most machine instructions, the operand field 62 is subdivided into portions designated as source operand field 64 and a destination operand field 66. For the purpose of describing the present invention, only the instruction word format shown in FIG. 2 will be considered, although, it will be recognized that microprocessors generally provide various addressing modes where an instruction word, such as that shown in FIG. 2, is followed by extension word(s) containing additional data or address displacement information. These different addressing modes will not be discussed herein, since they are not considered pertinent in disclosing and explicating the present invention, and any modifications necessary to accommodate machine instructions having different addressing modes will be readily apparent to those skilled in the art.

The bit patterns of the fields of the machine instruction stored in the instruction register 12 are decoded by the instruction decoder 14, as controlled by the operation sequence control unit 16 via control signals transmitted on lines 56 and 58, respectively. The decoded result is then directed as input to the operation sequence control unit 16. Based on this decoded input, the operation sequence control unit 16 generates the appropriate output control signals in a sequence necessary to execute the machine instruction stored in instruction register 12. For an arithmetic or logic operation, this would typically included (1) fetching the appropriate operand A, or operands A and B for the ALU 20, based upon the decoded instruction operand field 62 (typically specified by the destination operand field 66 and the source operand field 64, respectively); (2) controlling the ALU 20 to perform the necessary internal operations to produce the output result C, according to the decoded operation code field 60 (opcode); and then (3) storing the result C at a memory location in the memory unit 26 or an addressable register in the general register file 22, again based upon the decoded operand field (typically specified by destination operand field 66).

As is well known in the art, the operation sequence control unit 16 can be implemented as hardwired random logic, a programmable logic array, or preferably as a microprogrammed operation sequencer. In such a microprogrammed operation sequencer, output control signal selection and sequencing is determined by microinstructions fetched from a microinstruction store (or control memory) by a microengine (or microsequencer). Each machine instruction is then executed as a microprogram or set of microinstructions that are fetched in succession to generate the necessary output control signals, in response to the decoded instruction output provided by the instruction decoder 14.

In some microprocessor applications, it is often desirable to perform range checking and limiting operations on software variables whose values are generated by arithmetic operations performed in the ALU 20. This is necessary to ensure that the values of the software variables do not exceed acceptable limits. In order to correctly perform such range checking and limiting operations, microprocessor 10 must be provided with indications as to whether the value of a software variable generated from an arithmetic operation resulted in an arithmetic overflow in ALU 20, and the direction of that arithmetic overflow (either positive or negative) must also be known.

Existing microprocessor condition codes and condition code architectures are known to provide the required indications of overflow and direction of overflow, only for the primitive machine instructions performing unsigned and signed addition (ADD), and subtraction (SUB) operations, and instructions, such as compare (CMP), that are derivatives of these operations. Traditional condition code architectures usually include a status register containing a zero or Z-bit flag, a carry or C-bit flag, a signed overflow or V-bit flag, and a negative or N-bit flag for indicating the status of these kinds of arithmetic operations performed in conventional microprocessors.

The zero or Z-bit flag is normally set to a logic "0" value (herein assumed to represent a logic low value) by an arithmetic operation, unless the generated numeric result has a value of zero, in which case, the Z-bit flag is set to a logic "1" value (herein assumed to represent a logic high value). This is typically accomplished by performing a NORing operation on all bits of the generated numeric result, which produces a logic 1 value, only if all of the bits of the numeric result have logic 0 values. The output produced by this NORing operation is then latched as the value for the Z-bit flag in the status register after the completion of the arithmetic operation.

The carry or C-bit flag is customarily used to indicate unsigned overflow, i.e., this bit is set whenever an arithmetic operation generates a carry-out or a borrow-in within the ALU, which produces unsigned overflow in the positive or negative direction, respectively. However, the carry bit is generally not used exclusively as an unsigned overflow indicator. It is also used as a bit accumulator during ALU shift and rotate operations. Shift operations are commonly used as optimized multiply and divide (by powers of two) operations, and when so used, the C-bit is not always a valid unsigned overflow indicator (depending upon the type of shift operation performed). Also, some data processors include unsigned multiply and divide operations in their instruction sets, which generally do not treat the C-bit as an unsigned overflow indicator.

Indications of signed overflow are typically provided by the V-bit flag. This bit is usually set when an arithmetic operation generates a result that cannot be properly represented in 2's complement form. Since 2's complement numbers can be positive or negative, signed overflow occurs in both positive and negative directions. Historically, for simple operations such as add, subtract, and compare, the states of the V-bit, and the N-bit have been used to indicate both a signed overflow and its direction. For example, when the V-bit and N-bit are both set to logic 1 values, signed overflow is said to be in the positive direction, and when the V-bit is set to a logic 1 value and the N-bit is set to a logic 0 value, signed overflow is said to be in the negative direction. Here again, traditional condition code architectures do not provide for setting the condition codes to correctly indicate signed overflow with direction for shift, multiply and divide operations.

In view of the foregoing it is clear that traditional condition code bits and condition code architectures do not deal consistently with overflows produced by all machine instructions used to perform mathematical operations in microprocessors. As a result, the occurrence of overflow, and the direction of overflow cannot be reliably determined from the traditional condition code settings.

The present invention overcomes these disparities by providing microprocessor 10 with a condition code architecture that treats overflows in a mathematically consistent fashion, for all instructions in the microprocessor's instruction set that are used to perform arithmetic operations. As will be shown, this enables the implementation of single instruction range checking and limiting operations in microprocessor 10.

Figure 3:
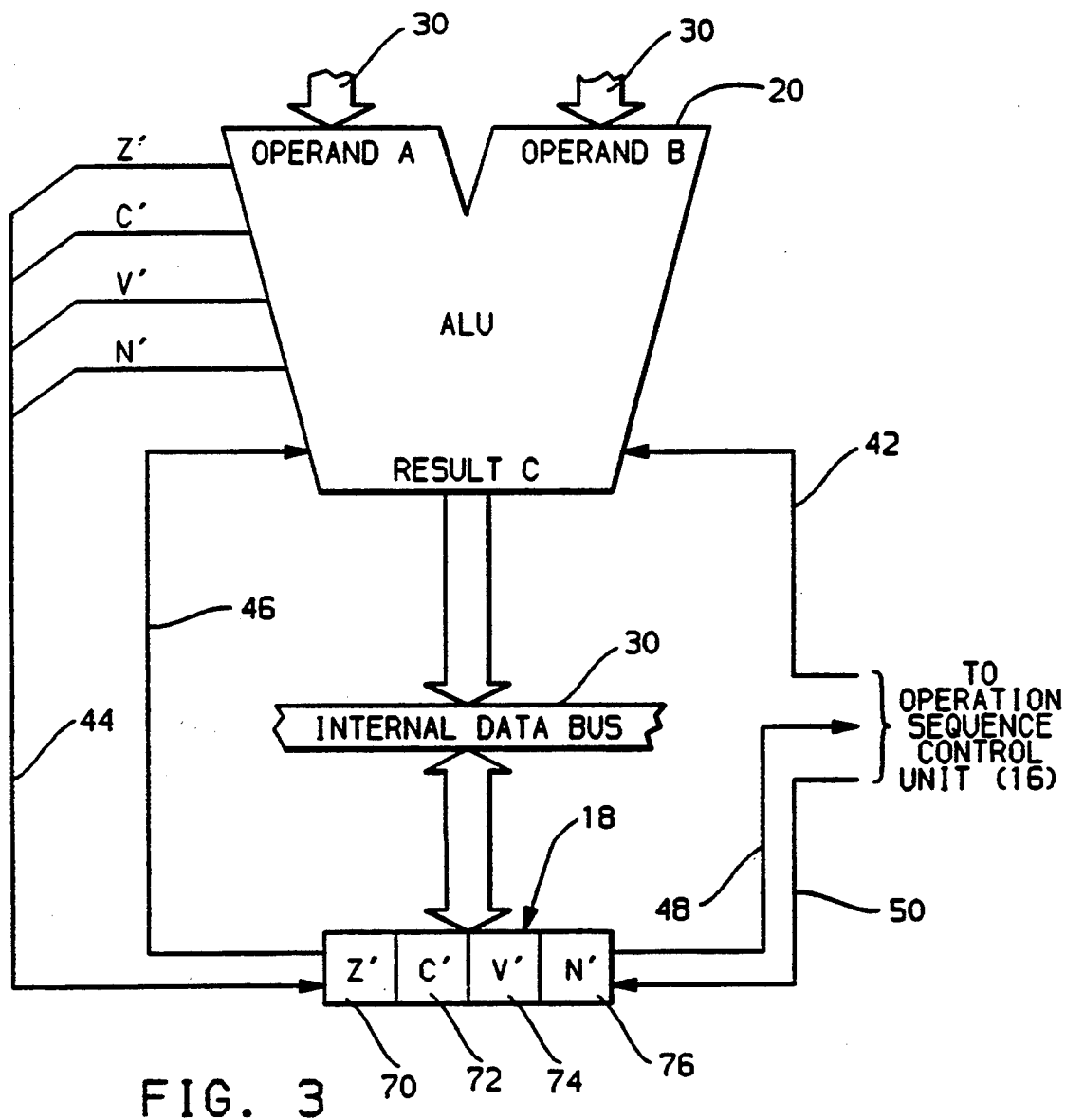
FIG. 3 illustrates a more detailed block diagram for the ALU and status register of FIG. 1, which are configured to provide a mathematically consistent condition code architecture according to a first embodiment of the present invention.

Referring now to FIG. 3, there is shown a more detailed block diagram of the ALU 20 and status register 18 of FIG. 1, which are configured to provide microprocessor 10 with a mathematically consistent condition code according to a first embodiment of the present invention. This architecture ensures that condition codes, designated as a Z'-bit flag 70, a C'-bit flag 72, a V'-bit flag 74, and a N'-bit flag 76, in the status register 18, correctly indicate occurrence of unsigned and signed overflow, and signed overflow direction for signed arithmetic operations for all machine instructions performing addition, subtraction, multiplication, and division (including arithmetic and logical shift instructions commonly used for multiply and divide by powers of two), and any other arithmetic instruction or operation that can be composed thereof.

The control signals on line 42 from the operation sequence control unit 16 select the arithmetic operation performed by the ALU 20 on operand A, or operands A and B, to produce the result C, as specified by the decoded opcode 60 of the machine instruction present in the instruction register 12. Based upon the operand value(s), the value of the result, and the type of arithmetic operation performed, the condition code flags Z', C', V', and N' in status register 18 are then appropriately set to indicate the occurrence of an unsigned and signed overflow, and the direction of signed overflow.

In what follows, the implementation of the mathematically consistent condition code architecture for the first embodiment is described primarily in terms of functional logic circuitry within ALU 20 that generates the appropriate condition code values for a defined set of machine instructions used to perform arithmetic operations. It will be recognized that this particular logic circuitry is merely exemplary, and that one skilled in the art could easily realize different logic arrangements for accomplishing the same functions. In addition, the specific structure and details of circuitry employed in controlling the ALU 20 to perform selected arithmetic operations, and in properly gating and latching condition code values during the execution of machine instructions is well-know in the art and will not be further discussed herein. This is done in order not to obscure the disclosure with structural details which are readily apparent to those skilled in the art.

Values for the condition codes bits Z', C', V', and N' are shown in FIG. 3 as originating in the ALU 20, from which they are transmitted along line 44 for setting their associated flags in the status register 18. It will be readily understood that logic circuitry for generating the values of the condition code bits could also be located external to the ALU 20, or alternatively, the condition code values could be determined and set, in some instances, by random logic hardwired into the operation sequence control unit 16, or by the execution of microinstructions therein. Preferably, values for the condition code bits are determined and set both by hardwired logic components associated with ALU 20, and by the execution of microinstructions within the operation sequence control unit 16.

Referring now to FIGS. 4A–4J, there are shown functional logic diagrams for implementing the mathematically consistent condition code architecture of the first embodiment for the various instructions within the instruction set of microprocessor 10 that are used to perform arithmetic operations. For the first embodiment, the condition code bits Z', C', V', and N' were implemented to correspond functionally to the traditional condition code bits Z, C, V, and N, with respect to instructions performing unsigned and signed addition (ADD) and subtraction (SUB). However, modifications for setting the condition code bits Z', C', V', and N' were required to assure consistent treatment of overflow conditions for instructions performing unsigned multiplication (MULU), signed multiplication (MULS), unsigned division (DIVU), signed division (DIVS), arithmetic shift left (ASL), logical shift right (LSR), and arithmetic shift right (ASR) operations. The microprocessor instruction set is also augmented with an additional instruction for performing an arithmetic shift right with rounding toward zero (ASR0) so arithmetic results consistent with the signed division instruction can be generated when performing division of a negative value by powers of two via an arithmetic right shift operation.

Figure 4A:
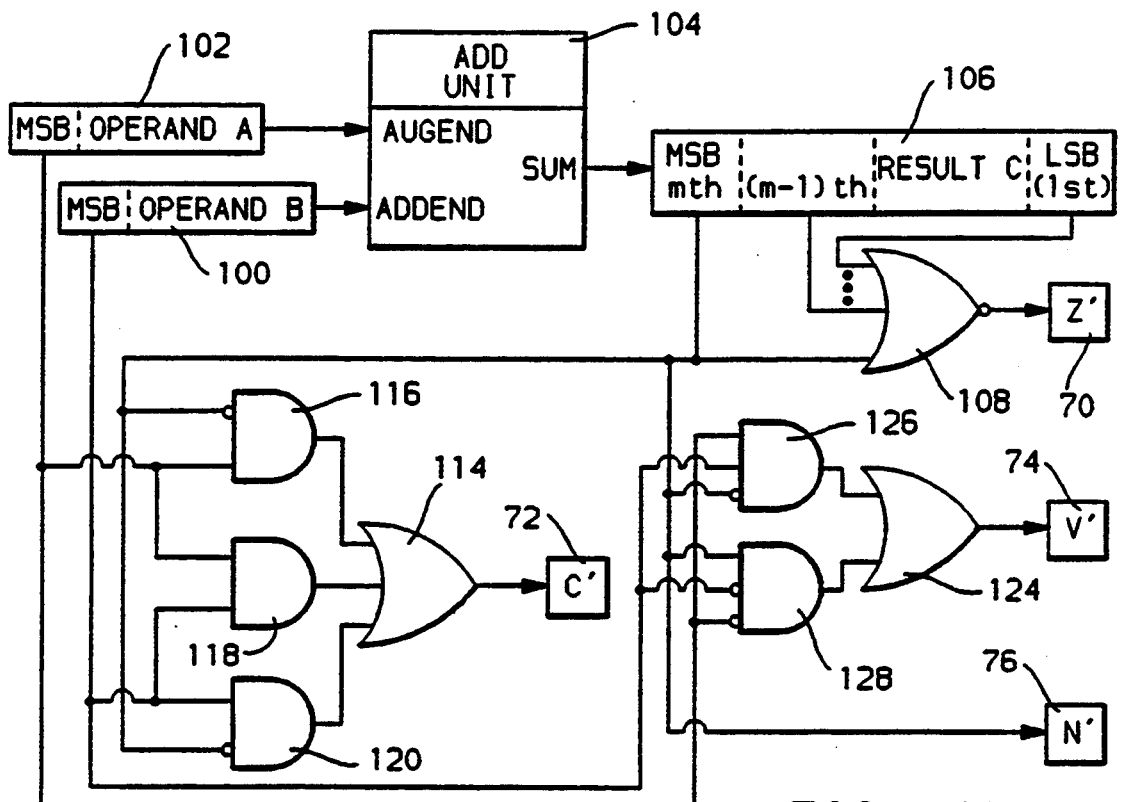
FIGS. 4A, 4B, 4C, 4D, 4E, 4F, 4G, 4H, 4I, and 4J illustrate functional logic diagrams for implementing the mathematically consistent condition code architecture of the first embodiment for various arithmetic machine instructions.

FIG. 4A illustrates functionally that portion of the mathematically consistent condition code architecture for setting the condition code bits when ALU 20 performs unsigned and signed addition during the execution of an ADD instruction stored in instruction register 12.

The ADD instruction adds the source operand, designated by field 64 in the instruction, to the destination operand, designated by field 66. The operation sequence control unit 16 executes the ADD instruction by first sending the source operand to a B register 100, and the destination operand to an A register 102, both of which are located within ALU 20. A standard add unit 104 in ALU 20 is then selected to add the contents of the B register 100 (the addend) to the contents of the A register 102 (the augend), and to store the numeric result C (the sum) in the C register 106, which is also located in ALU 20. Upon the completion of the addition process, the operation sequence control unit 16 replaces the destination operand (specified by field 66) with contents of the C register 106, i.e., the numeric result C. In what follows, each of the registers 100, 102, and 106 will be assumed to have a data width of m bits, unless specifically stated to the contrary. Accordingly, the least significant bit (LSB) in each register will be denoted as the 1st bit, with the most significant bit (MSB) being denoted as the mth bit.

The value for the condition code Z'-bit flag 70 is determined in the conventional manner as the output from a NOR gate 108, which has as inputs, each bit value (1st, ..., (m−1)th, and mth) in the C register 106. As a consequence, the Z'-bit flag 70 located in status register 18 is set to a logic 1 value, only if each bit in the C register 106 has a logic 0 value (i.e., the numeric result C has a binary value of zero), otherwise the Z'-bit flag 70 is set to a logic 0 value. Thus, the setting of the Z'-bit flag 70 corresponds exactly to the setting of the traditional condition code Z-bit.

This implementation for determining the value of the Z'-bit flag 70 is used for all machine instructions in the present embodiment that generate and store a numeric result in the C register 106, and will not be further described or shown in the drawings that follow. A similar implementation exists for the A register 102, whereby the Z'-bit flag 70 is set to a logic 1 value, when all bits in the A register are equal to logic 0 values after the execution of instructions performing shifting operations. When the value of the Z'-bit is required for determining other condition code values, the drawings will show the Z'-bit value as being derived as an output from the Z'-bit flag 70.

For an addition operation, the setting of the C'-bit flag 72 corresponds exactly to the setting of the traditional C-bit, i.e., the C'-bit is set to a value of 1, only when an unsigned overflow is detected, otherwise it is cleared (set to a value of 0). By definition, unsigned overflow occurs whenever the theoretical value to be generated for the result C exceeds the permissible data width of the C register 106 (i.e., $2^m - 1$). It will be understood that the phrase "theoretical value" used in this context refers to the ideal value for a result C (i.e., the mathematically correct or infinite precision value) generated by a mathematical operation.

Those skilled in the art will recognize that the occurrence of an unsigned overflow during an addition operation corresponds to the add unit 104 generating a carry-out (unsigned overflow in the positive direction). As is customary, the detection of unsigned overflow is based upon the logic values of the MSBs of the operand A, the operand B, and the result C, and the operation of OR gate 114 in conjunction with AND gates 116, 118, and 120. Accordingly, the C'-bit flag 72, is set to a logic 1 value, whenever: (1) the MSB of operand A equals 1, and the MSB of the result C equals 0; or (2) the MSB of operand B equals 1, and the MSB of the result C equals 0; or (3) the MSBs of both operand A and operand B equal 1. Note that the standard practice of using a small circular symbol at a logic gate input is used to indicate that the associated input signal is inverted prior to entering the gate.

The setting of the V'-bit flag 74 also corresponds exactly to the setting of the traditional V-bit for an addition operation, i.e., the V'-bit is set to a value of 1 whenever a 2's complement overflow (signed overflow) occurs, otherwise it is cleared. By definition, a 2's complement overflow occurs whenever the theoretical value to be generated for the result C exceeds $2^{(m-1)}-1$, which is the largest positive signed number that can be represented in the data width (m bits) of the C register 106 (i.e., signed overflow in the positive direction); or the numeric value of the result C is less than $-2^{(m-1)}$, which is the largest result with a negative sign that can be represented in the data width of the C register 106 (i.e., signed overflow in the negative direction). Traditionally, the detection of 2's complement overflow for addition is based upon the logic values of the MSBs of the operand A, the operand B, and the result C, and the operation of OR gate 124 in conjunction with AND gates 126 and 128. Accordingly, the V'-bit flag 74, is set to a logic 1 value, whenever: (1) the MSBs of operands A and B equal 1, and the MSB of the result C has a value of 0 (i.e., operands A and B are negative and the result C appears to be positive); or (2) the MSBs of operands A and B equal 0, and the MSB of the result C has a value of 1 (i.e., operands A and B are positive and the result C appears to be negative), which is consistent with the conventional practice for indicating the occurrence of 2's complement overflow during an addition operation.

The setting of the N'-bit flag 76 is also consistent with the setting of the traditional N-bit condition code for addition operations. As indicated, the N'-bit flag 76 is set to a value of 1, whenever the MSB of the result C (the mth bit of the C register 106) has a value of 1, otherwise it is cleared. Thus, the N'-bit is an indicator of the sign of the result C produced by an addition operation performed by the ALU 20.

For the purpose of brevity, the common 2's complement format has been used throughout the present specification for representing signed numbers. Those skilled in the art will readily recognize those modifications to the disclosed logic circuitry that would be required to adapt the functionality of the present invention to microprocessors that use different signed number representations, as for example, 1's complement or sign magnitude.

Figure 4B:
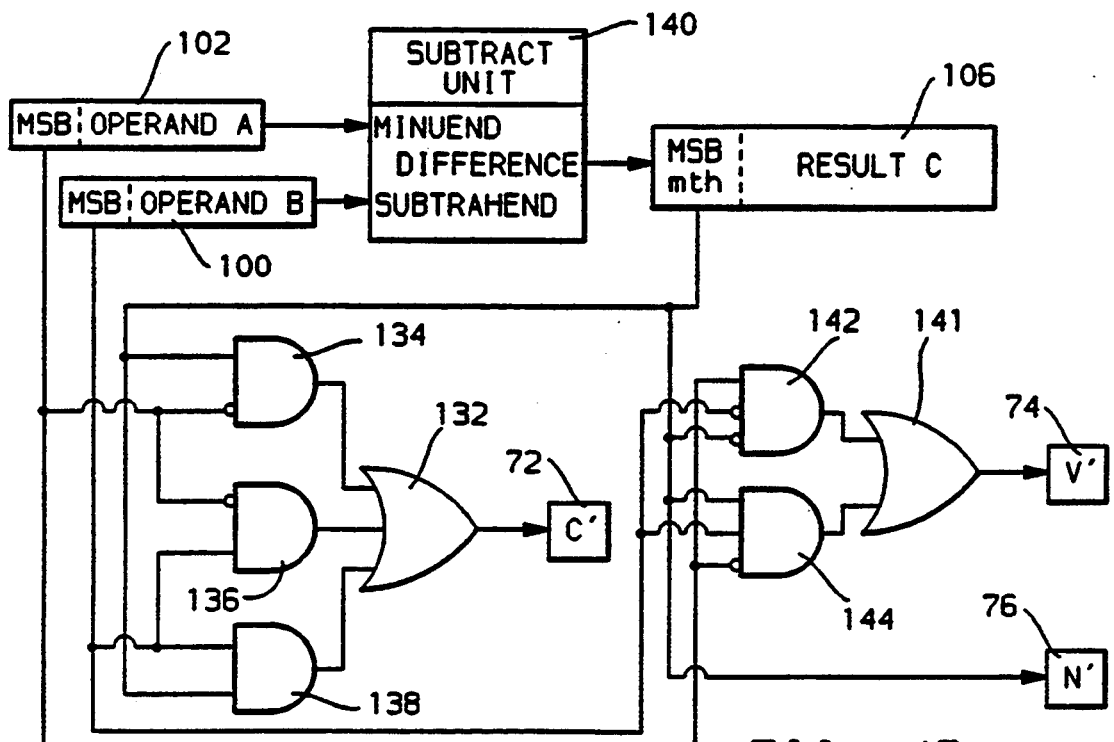

FIG. 4B illustrates functionally that portion of the mathematically consistent condition code architecture for setting the condition code bits when ALU 20 performs unsigned and signed subtraction during the execution of an SUB instruction stored in instruction register 12.

The SUB instruction subtracts the source operand, designated by field 64 in the instruction, from the destination operand, designated by field 66. The operation sequence control unit 16 executes the SUB instruction by first sending the source operand to the B register 100, and the destination operand to the A register 102. A standard subtract unit 140 in the ALU 20 is then selected to subtract the contents of the B register 100 (the subtrahend) from the contents of the A register 102 (the minuend), and to store the numeric result C (the difference) in the C register 106. Upon the completion of the subtraction process, the operation sequence control unit 16 replaces the destination operand (specified by field 66) with the contents of the C register 106, i.e., the numeric result C.

For a subtraction operation, the setting of the C'-bit flag 72 again corresponds exactly to the setting of the traditional C-bit, i.e., the C'-bit is set to a value of 1, only when an unsigned overflow in the negative direction is detected, otherwise it is cleared (set to a logic 0 value). By definition, unsigned overflow in the negative direction (sometimes referred to as underflow) occurs whenever the theoretical value to be generated for the result C cannot be represented as an unsigned number because it is less than zero (i.e., negative, as in the case where the value of operand B is greater than operand A). Those skilled in the art will recognize that the occurrence of a negative unsigned overflow during a subtraction operation corresponds to the subtract unit 140 requiring a borrow-in. As with addition operations, the detection of unsigned overflow for a subtraction operation is based upon the logic values of the MSBs of the operand A, the operand B, and the result C, and the operation of OR gate 132 in conjunction with AND gates 134, 136, and 138. Accordingly, the C'-bit flag 72, is set to a logic 1 value, whenever: (1) the MSB of operand A equals 0, and the MSB of the result C equals 1; or (2) the MSB of operand A equals 0, and the MSB of the operand B equals 1; or (3) the MSBs of both operand B and the result C equal 1.

The setting of the V'-bit flag 74 also corresponds exactly to the setting of the traditional V-bit for a subtraction operation, i.e., the V'-bit is set to a value of 1 whenever a 2's complement overflow (signed overflow) occurs, otherwise it is cleared. Traditionally, the detection of 2's complement overflow (signed overflow) for subtraction is based upon the logic values of the MSBs of the operand A, the operand B, and the result C, using OR gate 141 in conjunction with AND gates 142 and 144. Accordingly, the V'-bit flag 74, is set to a logic 1 value, whenever: (1) the MSB of operand A equals 0, and the MSBs of operand B and result C equal 1 (i.e., operand A is positive, and operand B is negative, and result C appears to be negative); or (2) the MSB of operand A equals 1, and the MSBs of operand B and result C equal 0 (i.e., operand A is negative, operand B is positive, and result C appears to be positive), which is consistent with the conventional practice for indicating the occurrence of 2's complement overflow during a subtraction operation.

The setting of the N'-bit flag 76 is also consistent with the setting of the traditional N-bit for subtraction operations. As indicated, the N'-bit flag 76 is set to a value of 1, whenever the MSB of the result C (the mth bit of the C register 106) has a value of 1, otherwise it is cleared. As a result, the N'-bit flag 76 indicates the sign of the result C produced by the subtraction operation.

As stated previously, the setting of the condition code bits Z', C', V', and N' for addition, and subtraction operations (and instructions, such as compare, that are derivatives of these operations), in this first embodiment were made to correspond exactly with the setting of the traditional condition code bits Z, C, V, and N for these operations. This was done for the purpose of convenience so that the mathematically consistent condition code architecture of this first embodiment of the invention would be compatible with existing microprocessor software and programming practices that make use of traditional condition code settings for comparison and conditional branching instructions.

Accordingly, for unsigned addition and subtraction operations, the C'-bit flag 72 is set to a logic 1 value, whenever a carry-out produces an overflow in the positive direction and a borrow-in produces an overflow in the negative direction (underflow), respectively. As a result, the C'-bit flag 72 provides an indication of unsigned overflow, without indicating the direction of the overflow.

For signed addition and subtraction operations, the V'-bit flag 74 is set to a logic 1 value, whenever a signed overflow occurs (either positive or negative), and the N'-bit flag 76 is set equal to the value of the MSB of the result C stored in the C register 106. When a signed overflow occurs (with the V'-bit equal to a logic 1 value) during an addition or subtraction operation, it is known from the behavior of traditional condition codes that the N'-bit flag 76 will indicate the direction of the signed overflow, i.e., N'-bit will have a logic 1 value for positive overflow, and a logic 0 value for negative overflow. As a result, for signed addition and subtraction operations, the V'-bit flag 74 and the N'-bit flag 76 provide an indication of signed overflow as well as the direction of the signed overflow.

The applicants have recognized that when the N'-bit is set as described above, the value of the N'-bit actually represents an Exclusive ORing (EORing) of the values of the V'-bit and the theoretical sign of the result, which just happens to be the value of the MSB of the result C for signed addition and subtraction (and their derivative operations such as such as compare). The phrase "theoretical sign" when used in this context refers to the ideal or mathematically correct sign that should result when performing a mathematical operation. The applicants then recognized that the N'-bit could be used to indicate the direction of signed overflow for any arithmetic operation, if the N'-bit is set equal to the value produced by an EORing of the values of the V'-bit and the theoretical sign of the result produced by the arithmetic operation. As will be described, this recognition constitutes the underlying basis for dealing with signed overflow in a mathematically consistent fashion for all machine instructions, in addition to ADD and SUB, and their derivatives, which perform mathematical operations and their derivatives.

Figure 4C:
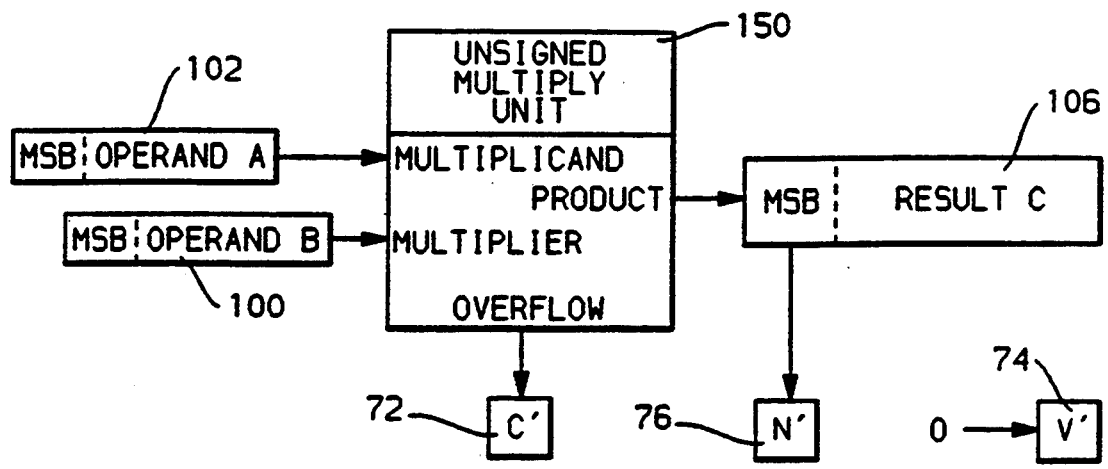

FIG. 4C illustrates functionally that portion of the mathematically consistent condition code architecture for setting the condition code bits when ALU 20 performs an unsigned multiplication operation during the execution of a MULU instruction stored in instruction register 12.

The MULU instruction performs an unsigned multiplication of the unsigned destination operand (designated by field 66) by the unsigned source operand (designated by field 64), and is executed by first sending the source operand to the B register 100, and the destination operand to the A register 102. A standard unsigned multiply unit 150 in the ALU 20 is then selected to multiply the contents of the A register 102 (the multiplicand) by the contents of the B register 100 (the multiplier), and the numeric result C (the product) is stored in the C register 106. Upon the completion of the multiplication process, the operation sequence control unit 16 replaces the destination operand (specified by field 66) with the contents of the C register 106.

The value of the C'-bit flag 72 is set to a logic 1 value by the unsigned multiply unit 150, whenever the theoretical value to be generated for the result C exceeds the permissible data width of the C register 106, i.e., the theoretical value for the product exceeds $2^m - 1$ (only positive overflow can occur for unsigned multiplication). It will be recognized that if the data width of the C register 106 were to be increased to 2 m bits, which is customary for multiplication operations, unsigned overflow would never occur, and the C'-bit flag 72 would always be cleared.

As indicated, the V'-bit flag 74 will always be cleared to a logic 0 value for unsigned multiply operations, since signed overflow is not possible for unsigned arithmetic operations. Also, as is customary, the N'-bit flag 76 is set equal to the value of the MSB of the result C (the product) stored in the C register 106.

Note that for unsigned multiplication operations only overflow in the positive direction can occur, and this positive unsigned overflow will be indicated by the C'-bit flag 72 having a logic i value. For unsigned multiplication, the settings of the V'-bit flag 74 and the N'-bit flag 76 are irrelevant, since they are applicable only to signed arithmetic operations.

Figure 4D:
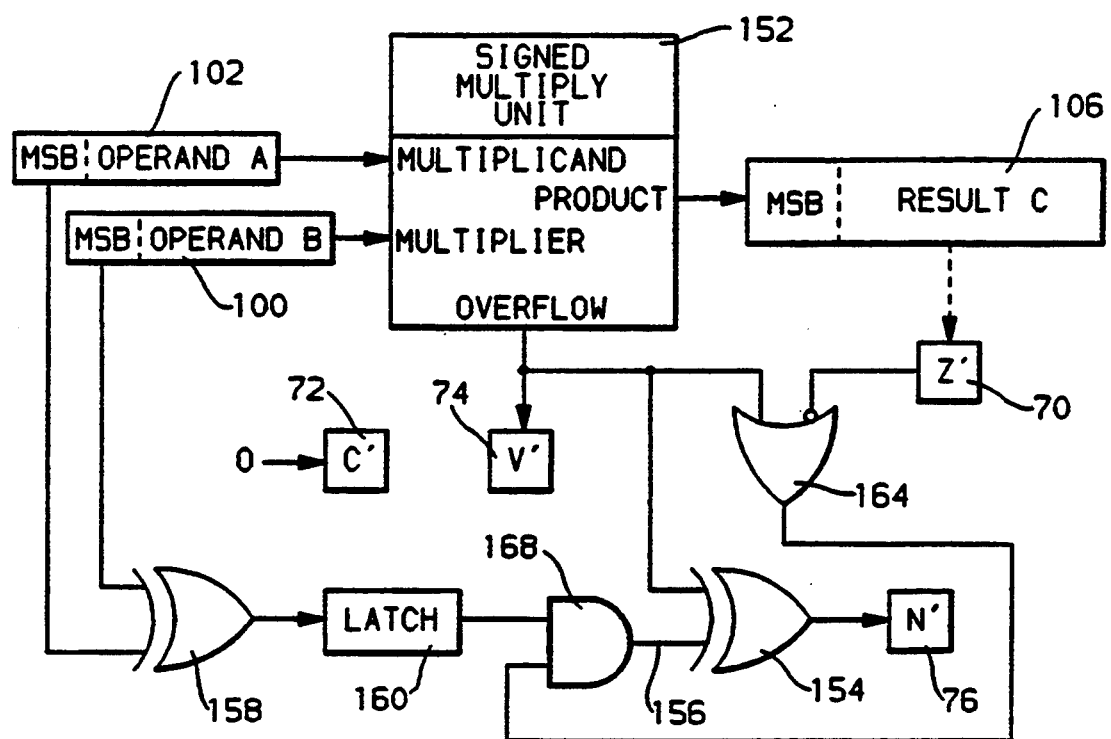

FIG. 4D illustrates functionally that portion of the mathematically consistent condition code architecture for setting the condition code bits when ALU 20 performs signed multiplication during the execution of a MULS instruction stored in instruction register 12.

The MULS instruction performs a signed multiply of the signed destination operand (designated by field 66) by the signed source operand (designated by field 64), and is executed by first sending the source operand to the B register 100, and the destination operand to the A register 102. A standard signed multiply unit 152 in the ALU 20 is then selected to multiply the contents of the A register 102 (the multiplicand) by the contents of the B register 100 (the multiplier), and the numeric result C (the product) is stored in the C register 106. Upon the completion of the multiplication process, the operation sequence control unit 16 replaces the destination operand (specified by field 66) with the contents of the C register 106.

The condition code C'-bit flag 72 is set to a logic 0 value, since a signed multiplication operation is performed, and the setting of the C'-bit is irrelevant for signed arithmetic operations.

The signed multiply unit 152 sets the V'-bit flag 74 to a logic 1 value whenever a 2's complement overflow occurs, i.e., the theoretical value of the generated product exceeds $2^{(m-1)} - 1$, or is less than $-2^{(m-1)}$. It will be recognized that if the data width of the C register were to be increased to 2 m bits, which is customary for multiplication operations, signed overflow would never occur and the V'-bit flag 74 would always be cleared.

To assure that the setting of the N'-bit for signed multiplication is in conformance with the setting of the N'-bit for signed addition and subtraction operations, the N'-bit flag 76 is set equal to the value at the output by EOR gate 154, which has as inputs the value of the V'-bit and the value on line 156 that represents the theoretical sign of the product generated when signed operand A is multiplied by signed operand B.

The value for the theoretical sign generated on line 156 is determined by the values of the MSBs of operand A in register 102 and operand B in register 100, along with the logic values of the V'-bit flag 74 and Z'-bit flag 70. Note that the output of EOR gate 158 will have a logic 1 value only when the signs of operand A and operand B are not equal, which represents the value of the theoretical sign of the product, except for the special case where one of the operands A or B is equal to zero. The output of EOR gate 158 is latched by latch 160 as soon as operands A and B are placed in their respective registers 102 and 100. This is done to save the value of the output from EOR gate 158 for setting the N'-bit flag 76 at the end of the multiplication operation. When the Z'-bit flag 70 is set to a logic zero value (i.e., the result C does not have a numeric value of zero), the output line 162 from OR gate 164 will have a logic 1 value. As a result, the latched output from EOR gate 158 will be passed through AND gate 168 to become the value for the theoretical sign on line 156.

For the special case where one of operands A and B equals zero and the other has a negative value (i.e., its MSB is set to a logic 1 value), the theoretical result will be zero, and the theoretical sign of a zero result is customarily defined to be positive. For this case, the output from EOR gate 158 latched by the latch 160 will be at a logic 1 value, which will not provide the correct value for the theoretical sign on line 156. When the result C in register 106 has a value of zero that is not the result of overflow (i.e., the V'-bit is cleared with the Z'-bit set to a logic 1 value), the output line 162 of OR gate 164 will have a logic 0 value, which prevents the latched output of EOR gate 158 from reaching line 156. Instead the value of the theoretical sign on line 156 will be given the correct logic 0 value. Note that if the result C in register 106 has a value of zero, but it was produced with overflow (i.e., both the Z'-bit and the V'-bit have values of logic 1), then output line 162 of OR gate 164 will have a logic 1 value, so that the value from latch 160 can be passed through AND gate 168.

Figure 4E:
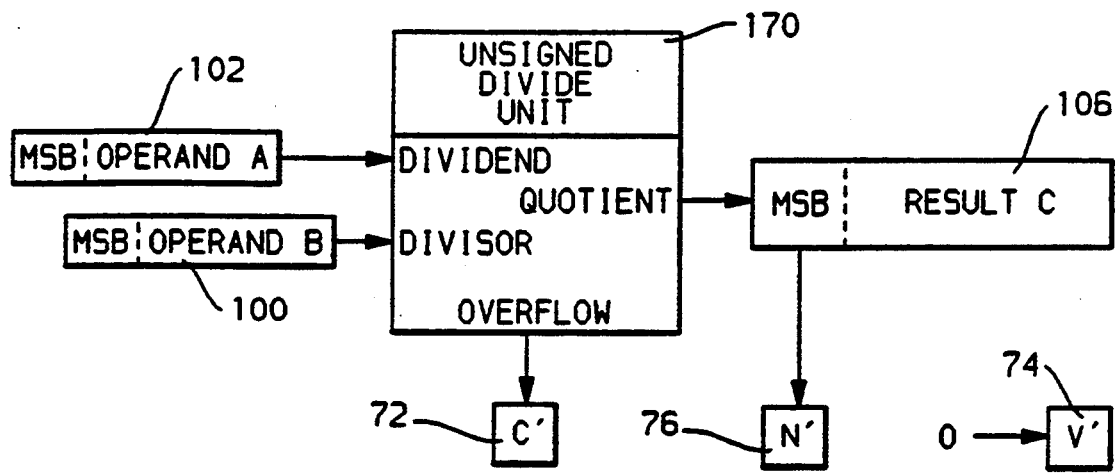

FIG. 4E illustrates functionally that portion of the mathematically consistent condition code architecture for setting the condition code bits when ALU 20 performs an unsigned division operation during the execution of a DIVU instruction stored in instruction register 12.

The DIVU instruction divides the unsigned destination operand (designated by field 66) by the unsigned source operand (designated by field 64), and is executed by first sending the source operand to the B register 100, and the destination operand to the A register 102. A standard unsigned divide unit 170 in the ALU 20 is then selected to divide the contents of the A register 102 (the dividend) by the contents of the B register 100 (the divisor), and the numeric result C (the quotient) is stored in the C register 106. Upon the completion of the division process, the operation sequence control unit 16 replaces the destination operand (specified by field 66) with the contents of the C register 106.

As indicated in FIG. 4E, the values for the C'-bit flag 72, the V'-bit flag 74, and the N'-bit flag 76 are generated in exactly the same way as they were generated for the unsigned multiply instruction MULU (see FIG. 4C), except the C'-bit flag 72 is now set to a logic 1 value, whenever the unsigned divide unit 170 detects an unsigned overflow when generating the quotient to be placed in the C register 106. It will be recognized that for an unsigned divide operation, the unsigned overflow can only be in the positive direction and occurs when the divisor in the B register 100 has a binary value of zero.

Figure 4F:
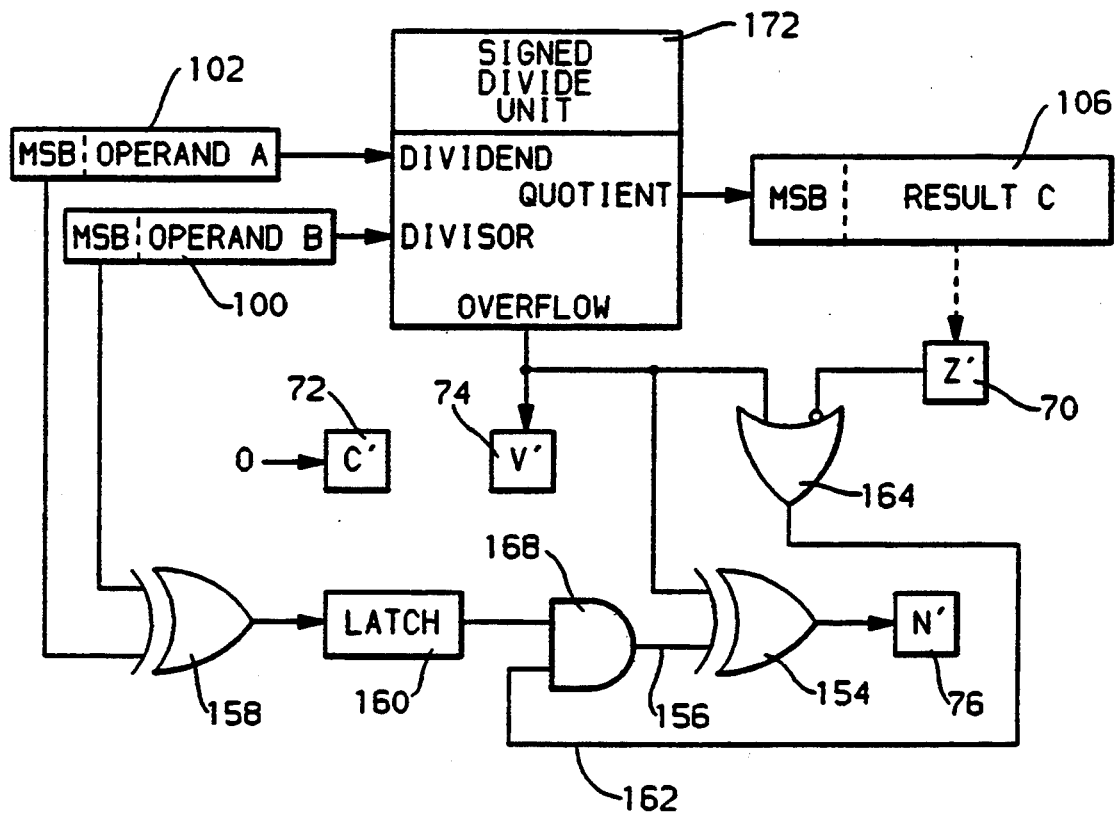

FIG. 4F illustrates functionally that portion of the mathematically consistent condition code architecture for setting the condition code bits when ALU 20 performs signed division during the execution of a DIVS instruction stored in instruction register 12.

The DIVS instruction divides the signed destination operand (designated by field 66) by the signed source operand (designated by field 64), and is executed by first sending the source operand to the B register 100, and the destination operand to the A register 102. A standard signed divide unit 172 in the ALU 20 is then selected to divide the contents of the A register 102 (the dividend) by the contents of the B register 100 (the divisor), and the numeric result C (the quotient) is stored in the C register 106. Upon the completion of the division process, the operation sequence control unit 16 replaces the destination operand (specified by field 66) with the contents of the C register 106.

As indicated in FIG. 4F, the values for the C'-bit flag 72, the V'-bit flag 74, and the N'-bit flag 76 are generated in exactly the same way as they were generated for the signed multiply instruction MULS (see FIG. 4D), except the V'-bit flag 74 is now set to a logic 1 value, whenever the signed divide unit 172 detects a signed overflow in generating the quotient to be placed in the C register. Accordingly, all of the logic gates shown in FIG. 4F have the same reference numerals and function in exactly the same way as those shown in FIG. 4D.

Figure 4G:
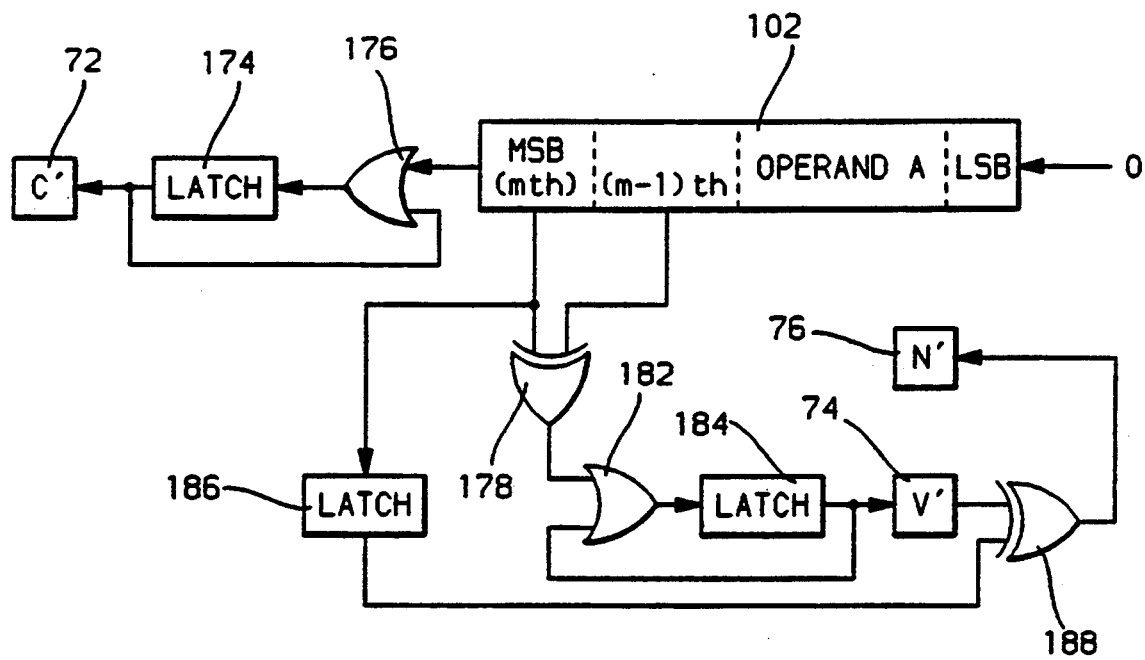

FIG. 4G illustrates functionally that portion of the mathematically consistent condition code architecture for setting the condition code bits when ALU 20 performs unsigned and signed multiplication by powers of two during the execution of an ASL instruction.

The ASL instruction multiplies the destination operand (designated by field 66) by a multiplier, which is a power of two specified as a shift count provided by the source operand (designated by field 64). The ASL instruction is executed by first sending the source operand to the B register 100, and the destination operand to the A register 102. The contents of operand A in the A register 102 are then shifted bitwise to the left by a number of bit positions given by operand B held in the B register 100, while shifting zero(s) into the vacated LSB position in the A register 102. Each left shift multiplies the contents of the A register 102 by two, and the operation is used to emulate the multiplication of unsigned and signed numbers by powers of two. After the shifting operation is complete, the operation sequence control unit 16 replaces the destination operand (specified by field 66) with the contents of the A register 102.

Conventionally, the most recent MSB shifted out of the A register 102 during an ASL instruction is retained as the value for the traditional C-bit condition code. With multiple bit shifts, it is possible for the C-bit to be cleared, after the occurrence of an overflow, i.e., after a logic 1 has already been shifted out of the MSB position of the A register 102. Consequently, the traditional C-bit does not provide a reliable indication for unsigned overflow when the ASL instruction is used for unsigned multiplication by powers of two.

The condition code architecture of the first embodiment of the present invention sets the C'-bit flag 72 to a logic 1 value to indicate the occurrence of unsigned positive overflow, if a logic 1 value is ever shifted out of the MSB position of the A register 102. The latch 174 is initially cleared, and then latches the output of OR gate 176 with each left shift of operand A. It will be understood that the C'-bit flag 72 will then be set to a logic 1 value if a logic 1 value is ever shifted out of the MSB position of the A register 102, since the MSB of the A register 102 and the output of latch 174 both act as inputs to the OR gate 176. Since latch 174 is initially cleared, the C'-bit will be appropriately cleared when the shift count provided by operand B is zero (i.e., multiplication by unity).

The value for the V'-bit flag 74 is determined in the same fashion as the traditional V-bit condition code for the ASL instruction. If the MSB of the A register 102 ever changes value during the shift operation, which indicates the occurrence of signed overflow, the V'-bit flag 74 is set to a logic 1 value. The EOR gate 178 compares the values of the mth bit (MSB) and the (m−1)th bit of the A register 102, and provides OR gate 182 with a logic 1 input value, only if the bits have different values. Latch 184 is initially cleared and latches the output of OR gate 182 with each left shift of operand A. Since output of latch 184 acts as a second input to OR gate 182, any change in the MSB of the A register 102 during the shift operation will set the V'-bit to a logic 1 value for the remainder of the shift operation.

Generally, the traditional condition code N-bit is set to the value of the MSB in the A register 102 for ASL operations (i.e., the apparent sign of the generated result of the shift). As a result, the direction of signed overflow cannot be reliably determined from the value of the N-bit when it is set in this fashion.

In this embodiment of the invention, the value of the N'-bit flag 76 is determined from the EORing of the value of the V'-bit flag 74 with the value for the theoretical sign of the result generated by the shift operation. This ensures that the N'-bit flag 76 indicates the proper direction for signed overflow. Since the ASL instruction emulates multiplication by powers of two, the theoretical sign of the result generated by this type of arithmetic instruction will have the same sign as the operand A prior to the shift operation. Accordingly, the value for the theoretical sign of the result is retained by latching the MSB of operand A into latch 186 before any shifting occurs. EOR gate 188 is then used to generate the appropriate value for the N'-bit flag 76 by EORing the value of the V'-bit flag 74 and the value of the theoretical sign provided by latch 186.

Figure 4H:
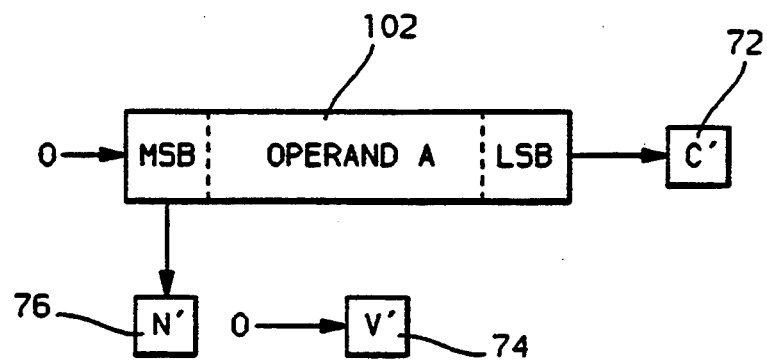

FIG. 4H illustrates functionally that portion of the consistent condition code architecture for setting the condition code bits when ALU 20 performs unsigned division by powers of two during the execution of a LSR instruction.

The LSR instruction divides the destination operand (designated by field 66) by a divisor, which is a power of two specified as a shift count provided by the source operand (designated by field 64). The LSR instruction is executed by first sending the source operand to the B register 100, and the destination operand to the A register 102. The contents of operand A in the A register 102 are then shifted bitwise to the right by a number of bit positions given by operand B held in the B register 100, while shifting zero(s) into the vacated MSB position in the A register 102. Each right shift divides the contents of the A register 102 by two, so the operation is used to emulate the division of unsigned numbers by powers of two. After the shifting operation is complete, the operation sequence control unit 16 replaces the destination operand (specified by field 66) with the contents of the A register 102.

During the execution of a LSR instruction, the conventional practice is to retain the value of the most recent LSB shifted out of the A register 102 as the value of the traditional C-bit, while the V-bit is cleared. Also, as is customary, the N-bit is set equal to the value of the MSB of the A register 102 following the shift operation. Since neither unsigned nor signed overflow can occur during execution of the LSR instruction, the traditional setting of the V-bit condition code correctly indicates that signed overflow has not occurred; however, the traditional C-bit can incorrectly indicate the occurrence of unsigned overflow since it can be set to a logic 1 value if the LSB last shifted out of A register 102 has a logic 1 value.

The above discrepancy could be resolved by implementing the operation sequence control unit 16 to automatically clear the traditional C-bit to a logic 0 value once the shift operation is completed during the execution of the LSR instruction. This was not found to be completely acceptable since the LSR instruction has other programming uses, in addition to simple unsigned divide by powers of two, where it is necessary to retain the last LSB shifted out of the A register 102 (such as rounding up after divides based upon this last LSB shifted out). As a result, the C-bit may be set to whichever of the two ways is more advantageous with respect to the microprocessor's implemented instruction set.

For this embodiment of the invention, the condition code C'-bit flag 72, V'-bit flag 74, and N'-bit flag 76 are set as shown in FIG. 4H for the LSR instruction, which conforms to the traditional condition code architecture. When an LSR instruction is used to perform a division by a power of two operation that will be range checked and limited, it must be followed by a machine instruction which clears the C'-bit flag 72, without changing the values of the other condition code flags. This software solution correctly sets the condition codes when the LSR instruction is used to perform simple division by powers of two operations, while allowing it to also be used for other conventional programming functions.

Figure 4I:
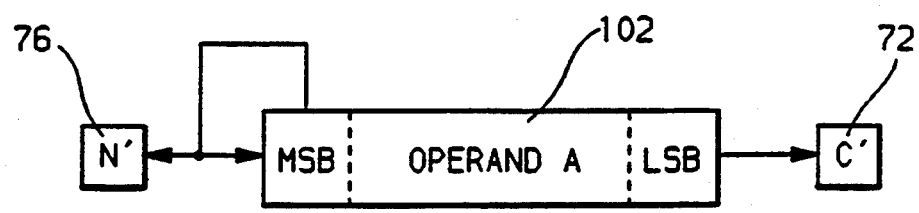

FIG. 4I illustrates functionally that portion of the condition code architecture for setting the condition code bits when ALU 20 performs signed division by powers of two during the execution of a ASR instruction.

The ASR instruction divides the destination operand (designated by field 66) by a divisor, which is a power of two specified as a shift count provided by the source operand (designated by field 64). The ASR instruction is executed by first sending the source operand to the B register 100, and the destination operand to the A register 102. The contents of operand A in the A register 102 are then shifted bitwise to the right by a number of bit positions given by operand B held in the B register 100, while holding the MSB position of the A register 102 constant. Each right shift divides the contents of the A register 102 by two, so the operation is used to emulate the division of signed numbers by powers of two. After the shifting operation is complete, the operation sequence control unit 16 replaces the destination operand (specified by field 66) with the contents of the A register 102.

During the execution of a ASR instruction, the conventional practice is to retain the value of the most recent LSB shifted out of the A register 102 as the value of the traditional C-bit, while the V-bit is cleared and the N-bit is set to the value of the MSB of the A register 102 (i.e., the sign of operand A, which is also the theoretical sign of the result for this instruction). Since neither unsigned nor signed overflow can occur during execution of the ASR instruction, the traditional setting of the V-bit and N-bit condition codes correctly indicate that signed overflow has not occurred; however, just as with the LSR instruction (see FIG. 4H), the traditional C-bit can incorrectly indicate the occurrence of unsigned overflow since the last LSB shifted out of the A register 102 could be a logic 1 value.

Again this discrepancy could be resolved by implementing the operation sequence control unit 16 to automatically clear the traditional C-bit to a logic 0 value once the shift operation is completed during the execution of the ASR instruction. As a result, the C-bit could be set to the value of the LSB shifted out of the A register 102, it could be set to a logic 0 value, or it could even be set based upon the output value of latch 190 as detailed in the description of FIG. 4J to follow. For reasons similar to those presented above when describing the LSR instruction, the condition code C'-bit flag 72, V'-bit flag 74, and N'-bit flag 76 in this embodiment of the invention are set to conform with the setting of the traditional condition code bits for the ASR instruction. As with the LSR instruction, whenever the ASR instruction is used to perform a division by powers of two which will be subjected to a range checking and limiting operation, it can be followed by a machine instruction which clears the C'-bit flag 72, without changing the values of the Z'-bit flag 70, V'-bit flag 74, and the N'-bit flag 76.

When the ASR instruction is used to perform a divide by a power of two operation on a negative operand A, if any bit having a logic 1 value is shifted out of the LSB position of the A register 102, the generated result will differ by a value of $-1$ from the quotient that would have been produced by using the DIVS instruction. This is because negative numbers in 2's complement form are rounded in the wrong direction when performing division by powers of two via right shift operations.

To remedy this inconsistency, the microprocessor instruction set was augmented with an additional instruction for performing an arithmetic shift right with rounding toward zero (ASR0) so that arithmetic values consistent with the signed division instruction (DIVS) could be generated when performing division of a negative value by powers of two via an arithmetic right shift operation.

Figure 4J:
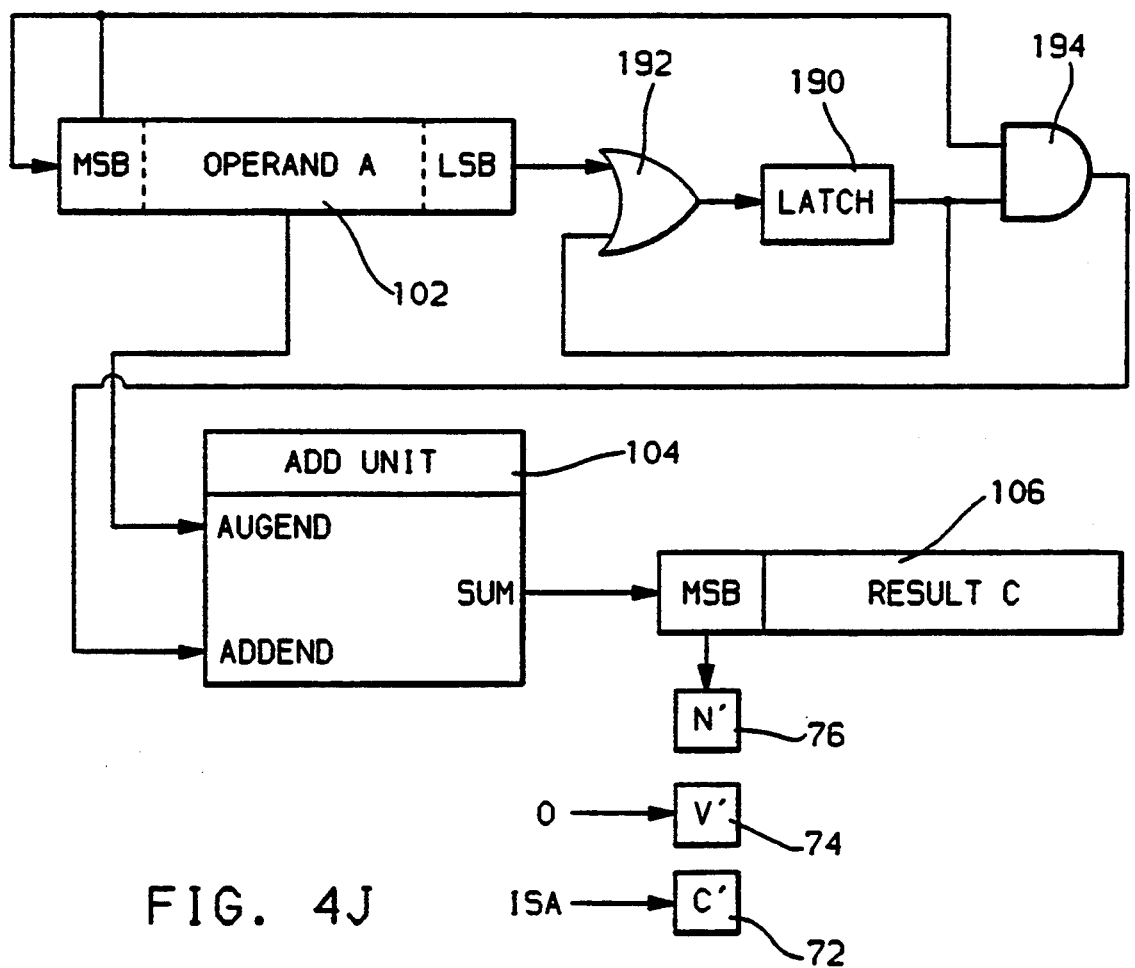

FIG. 4J illustrates functionally that portion of the condition code architecture for setting the condition code bits when ALU 20 performs signed division by powers of two with rounding toward zero, during the execution of the ASR0 instruction.

Just as with the ASR instruction, the ASR0 instruction divides the destination operand (designated by field 66) by a power of two specified as a shift count provided by the source operand (designated by field 64). The ASR0 instruction is executed by first sending the source operand to the B register 100, and the destination operand to the A register 102. The contents of operand A in the A register 102 are then shifted bitwise to the right by a number of bit positions given by operand B held in the B register 100, while holding the MSB position of the A register 102 constant.

To compensate for incorrect rounding that can occur when dividing a negative number by powers of two using this process, the result is increased by a value of 1, if a bit having a logic 1 value is ever shifted out of the LSB position of the A register 102 during the shifting process. This is accomplished by the operation of latch 190, OR gate 192, and AND gate 194, in conjunction with the standard add unit 104 in the ALU 20.

Latch 190 is initially cleared, and latches the output from the OR gate 192 on each right shift of the operand A in the A register 102. The value of the LSB in the A register 102 and the latched value held by latch 190 both act as inputs to the OR gate 192. As a result, if a bit having a logic 1 value is ever shifted out of the LSB of the A register 102, the output of latch 190 is set to a logic 1 value for the remainder of the shift operation.

The output of latch 190 is applied to one input of a two input AND gate 194, with the value of the MSB of operand A applied to the other input. It will be recognized that the output of AND gate 194 will have a logic 1 value, only when operand A represents a negative number (i.e., the MSB is set to a logic 1 value) and if a bit having a logic 1 value is ever shifted out of the LSB position in the A register 102 during one of the right shifts of operand A.

At the completion of the shifting process, the output of AND gate 194 is applied to the addend input of the standard add unit 104, and the operand A after the shifting operation is applied to the augend input. The resulting sum from add unit 104 is stored in the C register 106. After the addition is complete, the operation sequence control unit 16 replaces the destination operand (designated by field 66) with the contents of the C register 106, i.e., the numeric result C. Consequently, for the special case where operand A represents a negative number, and a bit having a logic 1 value is shifted out of the LSB position of the A register 102 during the right shift operation, the result produced in the A register 102 (which remains negative) will be increased by 1 to achieve the correct rounding toward zero.

Since the ASR0 instruction performs signed division by powers of two, the setting of the C'-bit flag 72 is not of any consequence, since unsigned overflow cannot occur, and as such, its setting can be considered instruction set assignable (ISA) as indicated in FIG. 4J (i.e., defined in any way acceptable from the programming point of view). For example, C'-bit flag 72 could be set to a logic 0 value to correctly indicate the nonoccurrence of unsigned overflow, it could be set based upon the value of the LSB shifted out of the A register 102, it could be set based upon the output value of latch 190 to indicate that a bit having a logic 1 value was shifted out of the A register 102, or it could be set in any other way that might be advantageous with respect to the microprocessor's architecture or its implemented instruction set.

For the ASR0 instruction, the V'-bit flag 74 is automatically cleared since signed overflow will not occur during a divide by powers of two operation (the result will always be less than or equal to the operand being divided).

The N'-bit flag 76 is set equal to the MSB of the result C stored in the C register 106, which also represents the theoretical sign of the result.

It will be understood that when the V'-bit is automatically set to a logic 0 value, as for the ASR and ASR0 instructions (see FIGS. 4I and 4J), the N'-bit flag 76 can be set simply to the value of the theoretical sign of the result produced by the arithmetic operation, which is equivalent to the value that would be obtained by EORing the theoretical sign value with the logic 0 value of the V'-bit.

When the foregoing arithmetic instructions are used as described above, the implemented condition code architecture assures that unsigned and signed overflows are treated in a mathematically consistent fashion to provide an indication of the occurrence of overflow during the execution of any of the arithmetic instructions, and in the case of signed arithmetic instructions, an indication of the direction of the signed overflow (either positive or negative) is also provided.

The condition code Z'-bit flag 70 is set to a logic 1 value to indicate that the result of an arithmetic operation has a numeric value of zero. Although the Z'-bit is not used to indicate overflow or overflow direction, as pointed out previously, its value is employed when setting the N'-bit flag 76 to indicate the correct sign for the result when multiplying or dividing by zero (see FIGS. 4D and 4F).

The condition code C'-bit flag 72 is set to a logic 1 value to indicate the occurrence of unsigned overflow during the execution of instructions performing unsigned arithmetic operations, i.e., whenever a result generated by an unsigned arithmetic operation cannot be correctly represented as an unsigned number in the data width allocated for the register holding the result.

The condition code V'-bit flag 74 is set to a logic 1 value to indicate the occurrence of an signed overflow during the execution of instructions performing signed arithmetic operations, i.e., whenever a result generated by a signed arithmetic operation cannot be correctly represented by a signed number in the data width allocated for the register holding the result.

For signed arithmetic operations, the value of the condition code N'-bit flag 76 represents the outcome from an EORing of the values of the V'-bit flag 74 and the theoretical sign of a result generated by the arithmetic operation.

As will be described subsequently, the C'-bit flag 72 is also used to indicate that the value of a software variable generated by a signed arithmetic operation has been limited during the execution of a range checking and limiting instruction. Likewise, the V'-bit flag 74 is used to indicate that the value of a software variable generated by an unsigned arithmetic operation has been limited during the execution of a range checking and limiting instruction.

When the values for the C'-bit flag 72, the V'-bit flag 74, and the N'-bit flag 76 are determined in this fashion, the above described condition code architecture ensures that the resulting condition codes are mathematically consistent. The occurrence of unsigned overflow (and underflow) is indicated, when the C'-bit flag 72 has a logic 1 value. The occurrence of overflow in the positive direction for signed arithmetic operations is indicated when the V'-bit flag 74 and the N'-bit flag 76 are both set to logic 1 values, while the occurrence of signed overflow in the negative direction is indicated when the V'-bit flag 74 has a logic 1 value and the N'-bit flag 76 has a logic 0 value.

Referring now to FIGS. 5A-5D, there are shown flow diagrams representative of the sequence of steps or operations carried out by the operation sequence control unit 16 when executing single instruction range checking and limiting operations, which utilize the values of the condition codes determined in accordance with the first embodiment of the present invention. The microprogramming (or hardwiring) of the operation sequence control unit 16 to perform the sequence of required steps for each range checking and limiting instruction is well within the purview of the microprocessor art, and accordingly, the particulars of such microprogramming (or hardwiring) will not be described in the specification.

The range checking and limiting instructions are utilized to determine whether the numeric value of a software variable computed by a previous arithmetic operation is outside of a predetermined range of acceptable values, and to limit the numeric value of a software variable that is found to be out of range to the appropriate upper or lower bound of the predetermined range.

For software variables having values computed by unsigned arithmetic operations, a LIMHU instruction is provided for range checking and limiting to an upper bound, while a LIMLU instruction is provided for range checking and limiting to a lower bound. Likewise, for software variables having values computed by signed arithmetic operations, LIMHS and LIMLS instructions are provided for range checking and limiting to respectively upper and lower bounds.

To simplify the description that follows, the above range checking and limiting instructions will be applied to a general software variable designated as VAR, which can have its numeric value generated by either unsigned or signed arithmetic operations and will have predetermined upper and lower bounds for its acceptable range designated as UB and LB, respectively. It will be understood that the numeric value of the software variable VAR will be either retained within a register in the general register file 22 of microprocessor 10 or stored at a specified addressable memory location in the memory unit 26, as can the predetermined numeric values for the upper and lower bounds UB and LB.

Figure 5A:
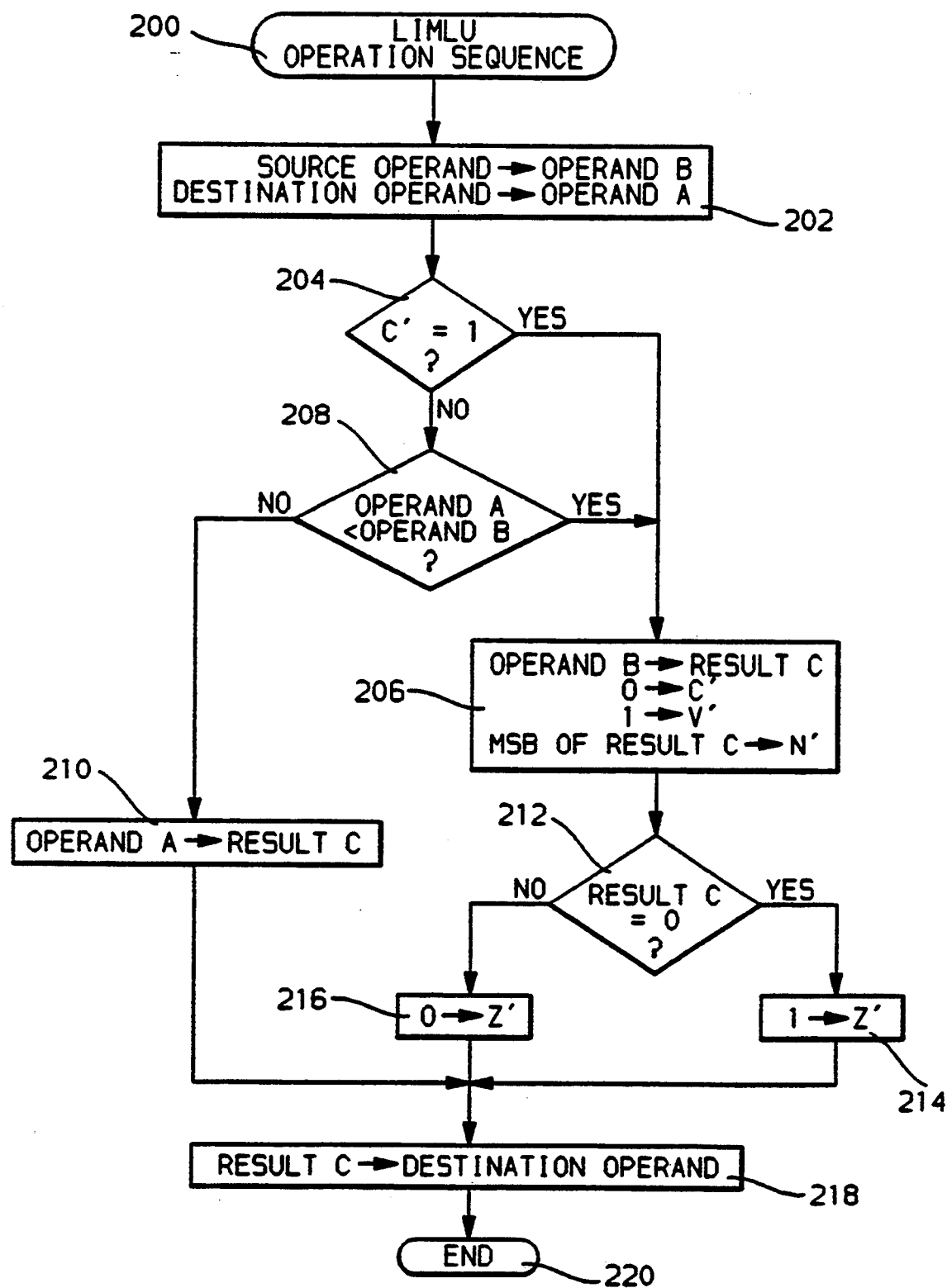
FIGS. 5A, 5B, 5C, and 5D illustrate flow diagrams representative of the sequence of control steps carried out by the operation sequence control unit of FIG. 1, when executing the single instruction range checking and limiting operations utilized by the first embodiment of the invention.

FIG. 5A illustrates the sequence of steps performed by the operation sequence control unit 16 in response to the decoding of a LIMLU instruction stored in the instruction register 12. The LIMLU instruction is inserted in a software program after one of the above described arithmetic instructions that is used to compute an unsigned numeric value for a software variable such as VAR, which is stored at the addressable memory location assigned to the software variable.

The LIMLU operation sequence is entered at point 200, when the operation sequence control unit 16 determines that a LIMLU instruction has been loaded into the instruction register 12, based upon the decoded instruction opcode provided by the instruction decoder 14.

From point 200, the operation sequence proceeds to control step 202, where the source operand designated by the contents of field 64 of the LIMLU instruction is sent to the B register 100 of ALU 20, and the destination operand designated by the contents of field 66 is sent to the A register 102 of ALU 20. For the LIMLU instruction, the destination field 66 specifies the register in general register file 22 that contains the numeric value computed for the software variable VAR. Depending upon the addressing mode used by the LIMLU instruction, its source field 64 specifies an address in memory unit 26 that contains the value of the predetermined lower bound LB for VAR, or alternatively, the source field can specify a register within general register file 22 containing the lower bound LB, or immediate data which represents the value of the lower bound LB. As a result, the numeric value of VAR is stored as operand A in the A register 102, and the numeric value for LB is stored as operand B in the B register 100.

From control step 202, the operation sequence proceeds to decision control step 204, where the value of the condition code C'-bit (provided via line 48) is tested to determine whether the C'-bit flag 72 has been set to a logic 1 value. If the C'-bit has a logic 1 value, this indicates that an unsigned overflow occurred during the execution of the unsigned arithmetic operation used to compute the numeric value for VAR. As a result, the numeric value VAR currently stored as operand A is mathematically undefined, and the operation sequence is directed to control step 206. Conversely, if the C'-bit has a logic 0 value, this indicates that unsigned overflow did not occur during the unsigned arithmetic operation used to compute the numeric value for VAR. Operand A then represents a valid numeric value for VAR, and the operation sequence is directed to decision control step 208.

At decision step 208, the valid numeric value for VAR stored as operand A is tested against the value of the lower bound LB stored as operand B by way of an unsigned compare operation. If operand A is less than operand B, the numeric value for VAR is less than the lower bound LB, and the software variable VAR is out of range in the negative direction. As a result, the control sequence is directed to control step 206. If operand A is not less than operand B, the numeric value for VAR is not less than LB, and VAR is not out of range in the negative direction. As a result, the operation sequence is directed to control step 210.

At control step 210, the numeric value for VAR, which is stored as operand A, is sent to the C register 106 to be stored as the result C. The operation sequence then proceeds to control step 218.

Return now to control step 206, which is either branched to from control step 204 when the C'-bit has a logic 1 value, or branched to from control step 208 when the valid numeric value for VAR is less than its acceptable lower bound LB. At this control step, operand B containing the value of the lower bound LB for VAR is transferred to the C register 106 and stored as the result C. In addition, the condition code C'-bit flag 72 is cleared, the V'-bit flag 74 is set to a logic 1 value, and the N'-bit flag 76 is set equal to the value of the MSB position of the C register 106 containing the result C. The rationale for performing these particular operations will be set forth later, after a discussion of the companion LIMHU instruction has been completed.

From control step 206 the LIMLU operation sequence proceeds to control step 212, where the result C stored in the C register 106 is tested to determine whether it has a binary value of zero. If result C equals binary zero, the operation sequence is directed to control step 214, where the Z'-bit flag 70 is set to logic 1 value. However, if the result C is not equal to a binary zero at control step 212, the operation sequence proceeds to control step 216, where the Z'-bit flag 70 is set to a logic 0 value. It will be recognized by those skilled in the art that the setting of the Z'-bit flag 70 represented by the sequence of control steps 212, 214, and 216, is in accordance with traditional practice and is actually carried out by NOR gate 108, which is coupled to the C register 106 as shown in FIG. 4A.

From control step 210, 214, or 216, the LIMLU operation sequence is directed to control step 218. Here, the result C in the C register 106 is stored in the register specified by the destination operand field 66 of the LIMLU instruction. Recall that this register contains the numeric value of the software variable VAR.

From step 218, the LIMLU operation sequence proceeds to point 220, where it is exited, and the operation sequence control unit 16 is then ready to execute the necessary control steps for the next machine instruction stored in the instruction register 12.

It will be recognized that when the LIMLU operation sequence proceeds to control step 218 from control step 210, the original numeric value for software variable VAR is simply assigned back to VAR in the general register file 22 since at control steps 204 and 208 it was determined that an unsigned overflow did not occur when computing the numeric value of VAR, and the numeric value was not less than the acceptable lower bound LB.

When the LIMLU operation sequence proceeds to control step 218 by way of control step 206, operand B is stored as result C, which is then stored in the register specified by the destination operand field 66 of the LIMLU instruction. This sequence of operations replaces the original numeric value of the software variable VAR in general register file 22 with the lower bound LB for VAR. Thus, the software variable VAR is limited to its lower bound LB, because its numeric value was originally computed with the occurrence of unsigned overflow, or the original numeric value of VAR was less than the its acceptable lower bound LB.

Figure 5B:
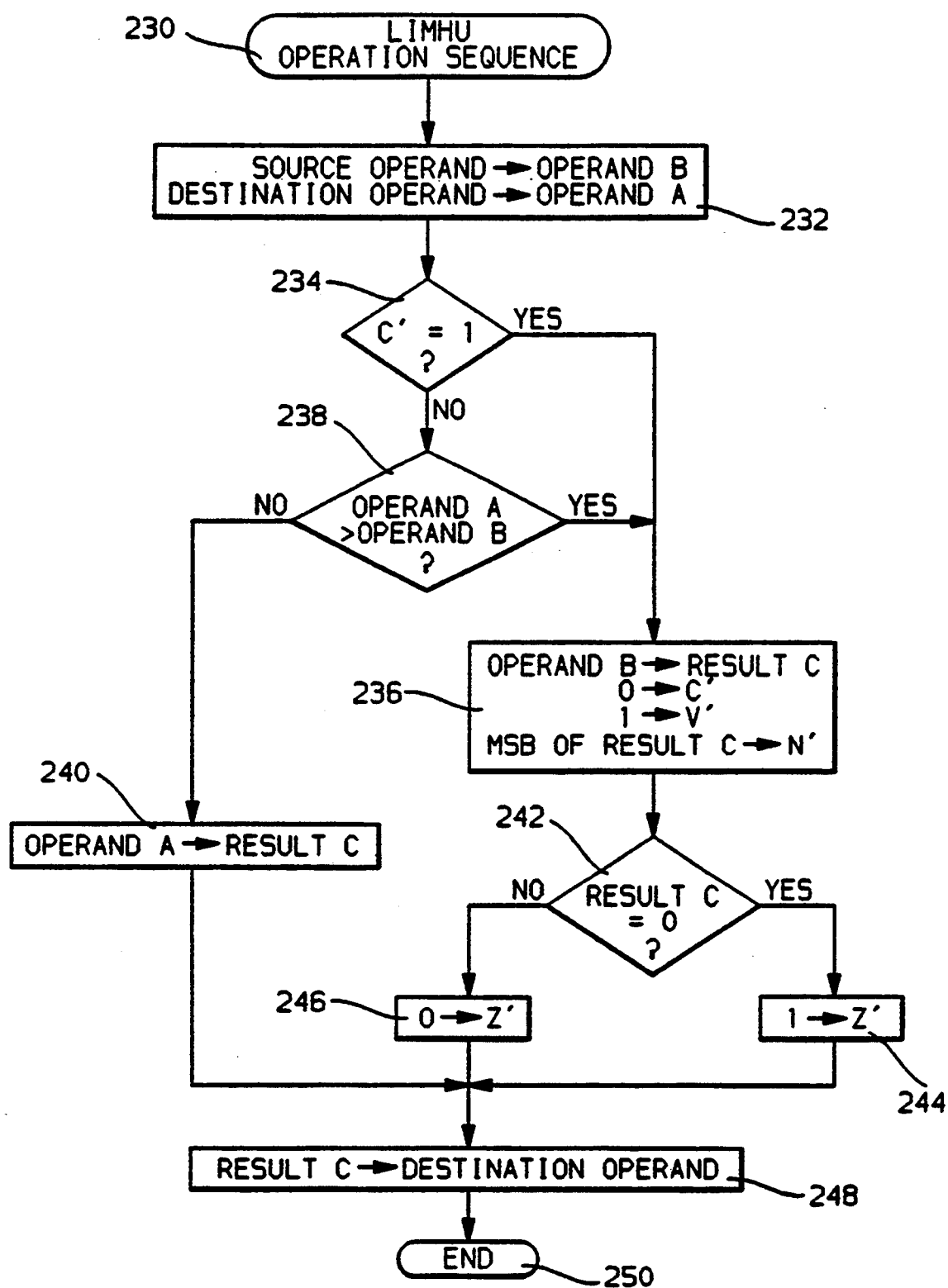

FIG. 5B illustrates the sequence of steps performed by the operation sequence control unit 16 in response to the decoding of a LIMHU instruction stored in the instruction register 12. As with the LIMLU instruction, the LIMHU instruction is inserted in a software program after an arithmetic instruction that is used to compute an unsigned numeric value for the software variable VAR, which is stored at the addressable memory location assigned to VAR.

The LIMHU operation sequence is entered at the point 230 and proceeds to control step 232, where the source operand designated by the contents of field 64 of the LIMHU instruction is sent to the B register 100 of ALU 20, and the destination operand designated by the contents of field 66 of the LIMHU instruction is sent to the A register 102 of ALU 20. For the LIMHU instruction, the destination field 66 specifies the register in general register file 22 that contains the numeric value computed for the software variable VAR. Depending upon the addressing mode used by the LIMHU instruction, its source field 64 specifies an address in memory unit 26 that contains the value of the predetermined upper bound UB for VAR, or alternatively, the source field can specify a register within general register file 22 containing the upper bound UB, or immediate data which represents the value of the upper bound UB. As a result, the numeric value of VAR is stored as operand A in the A register 102, and the numeric value for UB is stored as operand B in the B register 100.

From control step 232, the operation sequence proceeds to decision control step 234, where the value of the condition code C'-bit is tested to determine whether the C'-bit flag 72 has been set to a logic 1 value. If the C'-bit has a logic 1 value, this indicates that an unsigned overflow occurred during the execution of the unsigned arithmetic operation used to compute the numeric value for VAR. As a result, the numeric value for VAR currently stored as operand A is mathematically undefined, and the operation sequence is directed to control step 236. Conversely, if the C'-bit has a logic 0 value, this indicates that unsigned overflow did not occur during the unsigned arithmetic operation used to compute the numeric value for VAR. In this case, operand A represents a valid numeric value for VAR and the operation sequence is directed to decision control step 238.

At decision control step 238, the valid numeric value for VAR stored as operand A is tested against the value for the upper bound UB stored as operand B by way of an unsigned compare operation. If operand A is greater than operand B, the numeric value for VAR is out of range in the positive direction, and the operation sequence is directed to control step 236. If operand A is not greater than operand B, then the numeric value for VAR is not greater that its acceptable upper bound UB, and the operation sequence is directed to control step 240.

At control step 240, the numeric value for VAR, stored as operand A, is sent to the C register 106 to be stored as result C. The operation sequence is then directed to control step 248.

Return now to control step 236, which is either branched to from decision control step 234 when the C'-bit has a logic 1 value, or branched to from decision control step 238 when the valid numeric value for VAR is greater than its acceptable upper bound UB. At this control step, operand B containing the value of the upper bound UB for VAR is transferred to the C register 106 and stored as result C. In addition, the condition code C'-bit flag 72 is cleared, the V'-bit flag 74 is set to logic 1 value, and the N'-bit flag 76 is set to equal the value of the MSB position of the C register 106 containing the result C. The rationale for performing these particular operations will be deferred until the discussion of remaining control steps in the LIMHU instruction has been completed.

From control step 236, the LIMHU operation sequence proceeds to control step 242, where the result C stored in the C register 106 is tested to determine whether it has a binary value of zero. If result C equals binary zero, the operation sequence proceeds to control step 244, where the Z'-bit flag 70 is set to a logic 1 value. However, if the result C is not equal to binary zero, the operation sequence proceeds to control step 246, where the Z'-bit flag 70 is set to a logic 0 value. As stated previously for the LIMLU instruction, the setting of the Z'-bit flag 70 by this sequence control steps is in accordance with traditional practice and is actually carried out by NOR gate 108, which is coupled to the C register 106 as shown in FIG. 4A.

From control steps 240, 244, or 246, the LIMHU operation sequence is directed to control step 248. Here, the result C in the C register 106 is stored in the register specified by the destination operand field 66 of the LIMHU instruction. Recall that this register contains the numeric value of the software variable VAR.

From control step 248, the LIMHU operation sequence proceeds to point 250, where it is exited, and the operation sequence control unit 16 is then ready to execute the necessary control steps for the next machine instruction stored in the instruction register 12.

It will be recognized that when the LIMHU operation sequence proceeds to control step 248 from control step 240, the original numeric value for software variable VAR is simply assigned back to VAR in the general register file 22 since at control steps 234 and 238 it was determined that an unsigned overflow did not occur when computing the numeric value for VAR, and the numeric value was not greater than the acceptable upper bound UB.

When the LIMHU operation sequence proceeds to control step 248 by way of control step 236, operand B is stored as result C, which is then stored in the register specified by the destination operand field 66 of the LIMHU instruction. This sequence of operations replaces the original numeric value of the software variable VAR in general register file 22 with the upper bound UB for VAR. Thus, the software variable VAR is limited to its upper bound UB, because its numeric value was originally computed with the occurrence of unsigned overflow, or the original numeric value for VAR was greater than the its acceptable upper bound UB.

In order to check both bounds of the range, the LIMLU and LIMHU machine instructions are in this case placed in a software program one after the other following the arithmetic instruction that computes the unsigned numeric value of a software variable that is to be range checked and possibly limited. Since the LIMLU and LIMHU instructions depend upon condition code settings generated by the arithmetic instruction, no other machine instructions that alter the condition code settings can be interposed between the arithmetic instruction and the LIMLU and LIMHU instruction pair, except for those instructions that require the C'-bit flag 72 to be cleared (see the discussion related to FIG. 4H for the LSR instruction).

The order in which the LIMLU and LIMHU instructions are used in a program will also depend upon the type of arithmetic instruction used to compute the numeric value of the software variable that is to be range checked and possibly limited. This is due to the fact that the condition code architecture of this first embodiment sets the C'-bit flag 72 to indicate the occurrence of unsigned overflow, but no information related to the direction of the unsigned overflow is made available. If the C'-bit flag 72 is set to indicate the occurrence of unsigned overflow, the LIMLU instruction will limit the value of the software variable being checked to its lower bound LB via control steps 204, 206, and 218. Conversely, the LIMHU instruction will limit the value of the software variable to its upper bound UB, if the C'-bit flag 72 is set to indicate the occurrence of unsigned overflow. Therefore, the LIMLU instruction must appear before the LIMHU instruction in a program when range checking and limiting operations are performed on software variables that have values computed by arithmetic instructions that can generate unsigned overflows only in the negative direction, such as the subtract (SUB) and compare (CMP) instructions. Alternatively, the LIMHU instruction must appear before the LIMLU instruction in a program when range checking and limiting operations are performed on software variables that have values computed by arithmetic instructions that can generate unsigned overflows only in the positive direction, i.e., the add (ADD), unsigned multiply (MULU), unsigned divide (DIVU), and the arithmetic shift left (ASL) instructions discussed previously.

This ordering of the LIMLU and LIMHU instructions assures that the value of a software variable will be correctly limited to its lower bound when an unsigned overflow occurs in the negative direction and to its upper bound when an unsigned overflows occurs in the positive direction. Those skilled in the art will recognize that the operations associated with the lower and upper bounds performed by the execution of the LIMLU and LIMHU instructions could be merged into two modified instructions, where the operations related to LIMLU would be performed before those of LIMHU in one of the modified instructions, and vice versa in the other modified instruction.

At control step 206 in the LIMLU operation sequence and at step 236 in the LIMHU operation sequence, it will be recognized that the C'-bit flag 72 is set to a logic 0 value. This is done so that an unsigned overflow detected during the execution of the first of these instruction in a program will not be detected during the execution of the second, which thereby prevents the software variable from being limited a second time to the incorrect bound.

It will also be recognized that at control steps 206 and 236 in the respective LIMLU and LIMHU operation sequences, the V'-bit flag 74 is set to a logic 1 value. This setting of the V'-bit flag 74 provides an indication that the value of the software variable being checked has been range limited. This indication could be used, for example, to provide a warning that a control parameter is out of range when the microprocessor 10 is employed in a control system application, or to provide diagnostic information regarding the software variable that could be stored in the memory unit 26 for later retrieval. Note that this use of the V'-bit flag 74 does not interfere with the range checking and limiting operations performed by the LIMLU and LIMHU instructions since they are associated with an unsigned arithmetic operation where the setting of the V'-bit is inconsequential.

Also as indicated, the N'-bit flag 76 is to equal the value of the MSB position of the C register 106 containing the result C at control steps 206 and 236 of the respective LIMLU and LIMHU operation sequences. This is consistent with the traditional setting of the N'-bit flag 76 for operations involving unsigned numeric values.

Figure 5C:
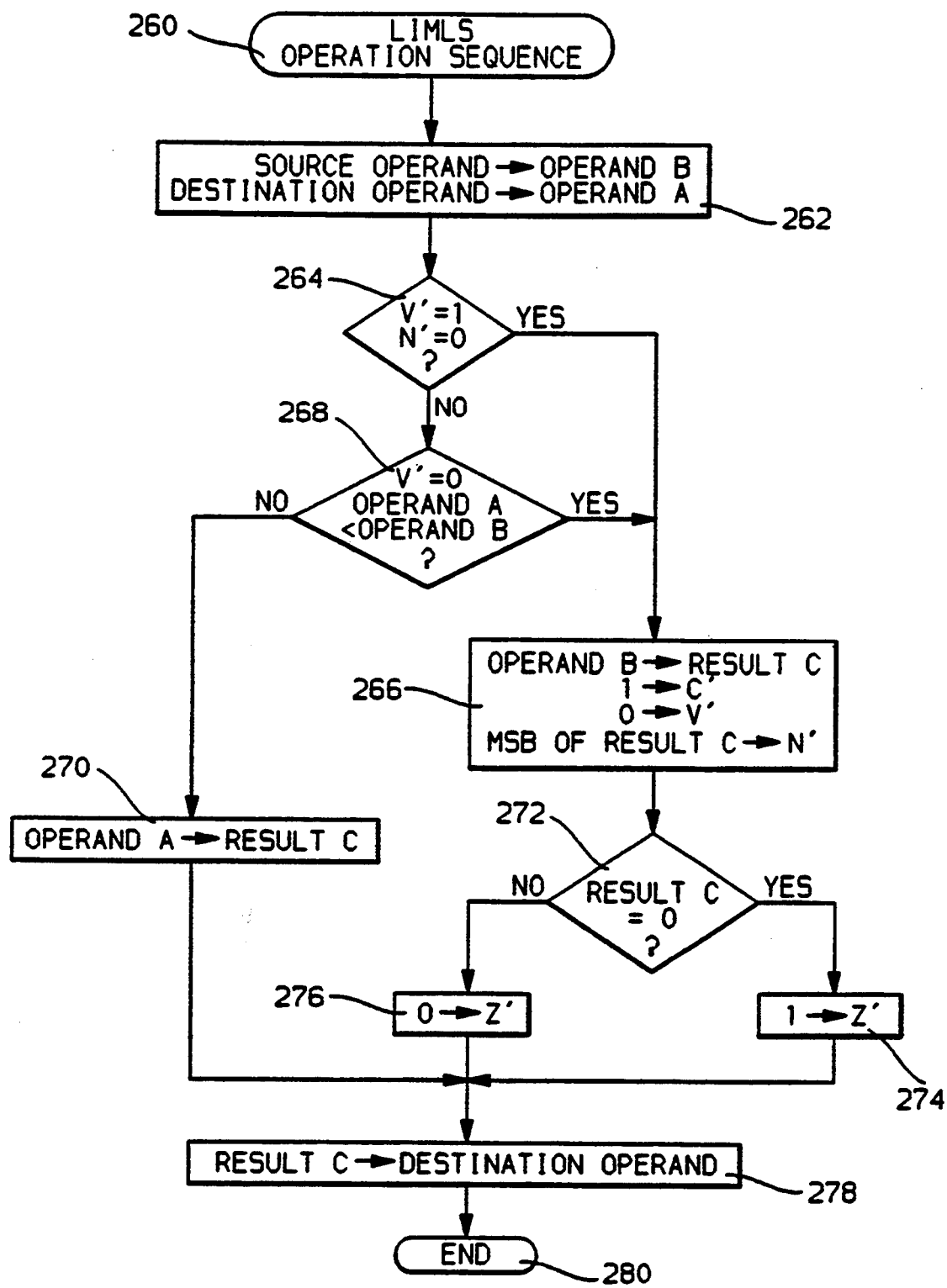

FIG. 5C illustrates the sequence of steps performed by the operation sequence control unit 16 in response to the decoding of a LIMLS instruction stored in the instruction register 12. The LIMLS instruction is inserted in a software program after an arithmetic instruction used to compute a signed numeric value for the software variable VAR, which is stored at the addressable memory location assigned to VAR.

The LIMLS operation sequence is entered at point 260 and proceeds to control step 262, where the source operand designated by the contents of field 64 of the LIMLS instruction is sent to the B register 100 of ALU 20, and the destination operand designated by the contents of field 66 of the LIMLS instruction is sent to the A register 102 of ALU 20. For the LIMLS instruction, the destination field 66 specifies the register in general register file 22 that contains the numeric value computed for the software variable VAR. Depending upon the addressing mode used by the LIMLS instruction, its source field 64 specifies an address in memory unit 26 that contains the value of the predetermined lower bound LB for VAR, or alternatively, the source field can specify a register within general register file 22 containing the lower bound LB, or immediate data which represents the value of the lower bound LB. As a result, the numeric value of VAR is stored as operand A in the A register 102, and the numeric value of LB is stored as operand B in the B register 100.

From control step 262, the operation sequence proceeds to decision control step 264, where the values of the condition code V'-bit and N'-bit are tested to determine whether the V'-bit flag 74 has been set to a logic 1 value and the N'-bit flag 76 has been set to a logic 0 value. If the V'-bit has a logic 1 value and the N'-bit has a logic 0 value, recall from the previous discussion that this indicates that a signed overflow in the negative direction occurred during the execution of the signed arithmetic operation used to compute the numeric value for VAR. As a result, the numeric value for VAR currently stored as operand A is mathematically undefined, and the operation sequence is directed to control step 266. If the condition code V'-bit and N'-bit are not set to these values, signed overflow in the negative direction did not occur when the numeric value for VAR was computed, and the operation sequence is directed to decision control step 268.

At decision control step 268, the value of the V'-bit is tested to determined if the V'-bit flag 74 has been set to a logic 0 value, and the numeric value for VAR stored as operand A is tested against the value of the lower bound LB stored as operand B by way of a signed compare operation. If the V'-bit has a logic 0 value and operand A is less than operand B, this indicates that signed overflow did not occur when the numeric value for VAR was computed, but VAR is out of range in the negative direction. As a result, the operation sequence is directed to control step 266. If either the V'-bit is not equal to a logic 0 value or operand A is not less than operand B, the operation sequence is directed to control step 270.

At control step 270, the numeric value for VAR, stored as operand A, is sent to the C register 106 to be stored as result C. The operation sequence is then directed to control step 278.

Return now to control step 266, which is either branched to from decision control step 264 where the occurrence of signed overflow in the negative direction was detected, or branched to from decision control step 268 where the numeric value of VAR was found to be valid (not computed with the occurrence of signed overflow), but out of range in the negative direction (less than the lower bound LB). In either case, the numeric value for VAR requires limiting to its acceptable lower bound LB, so operand B containing the value of the LB for VAR is transferred to the C register 106 and stored as result C. In addition, the condition code C'-bit flag 72 is set to a logic 1 value, the V'-bit flag 74 is cleared to a logic 0 value, and the N'-bit flag 76 is set equal to the value of the MSB position of the C register 106 containing result C. The rationale for performing these particular operations will be set forth later, after the completion of a discussion for the companion LIMHS instruction.

From control step 266, the LIMLS operation sequence proceeds to control step 272, where the result C stored in the C register 106 is tested to determine whether it has a binary value of zero. If result C equals binary zero, the operation sequence proceeds to control step 274, where the Z'-bit flag 70 is set to a logic 1 value. However, if the result C is not equal to binary zero, the operation sequence proceeds to control step 276, where the Z'-bit flag 70 is set to a logic 0 value. As stated previously for the LIMLU instruction, the setting of the Z'-bit flag 70 by this sequence control steps is in accordance with traditional practice and is actually carried out by NOR gate 108, which is coupled to the C register 106 as shown in FIG. 4A.

From control steps 270, 274, or 276, the LIMLS operation sequence is directed to control step 278. Here, the result C in the C register 106 is stored in the register specified by the destination operand field 66 of the LIMLS instruction. Recall that this register contains the numeric value for the software variable VAR.

From control step 278, the LIMLS operation sequence proceeds to point 280, where it is exited, and the operation sequence control unit 16 is then ready to execute the necessary control steps for the next machine instruction that is stored in the instruction register 12.

It will be recognized that when the LIMLS operation sequence proceeds to control step 278 from control step 270, the original numeric value for software variable VAR is simply assigned back to VAR in the general register file 22 since at control steps 264 and 268 it was determined that an signed overflow did not occur when computing the numeric value for VAR, and the numeric value was not less than the acceptable lower bound LB.

When the LIMLS operation sequence proceeds to control step 278 by way of control step 266, operand B is stored as result C, which is then stored in the register specified by the destination operand field 66 of the LIMLS instruction. This sequence of operations replaces the original numeric value of the software variable VAR in general register file 22 with the lower bound LB for VAR. Thus, the software variable VAR is limited to its lower bound LB, because its numeric value was originally computed with the occurrence of signed overflow in the negative direction, or the original numeric value for VAR was found to be valid, but less than the its acceptable lower bound LB.

Figure 5D:
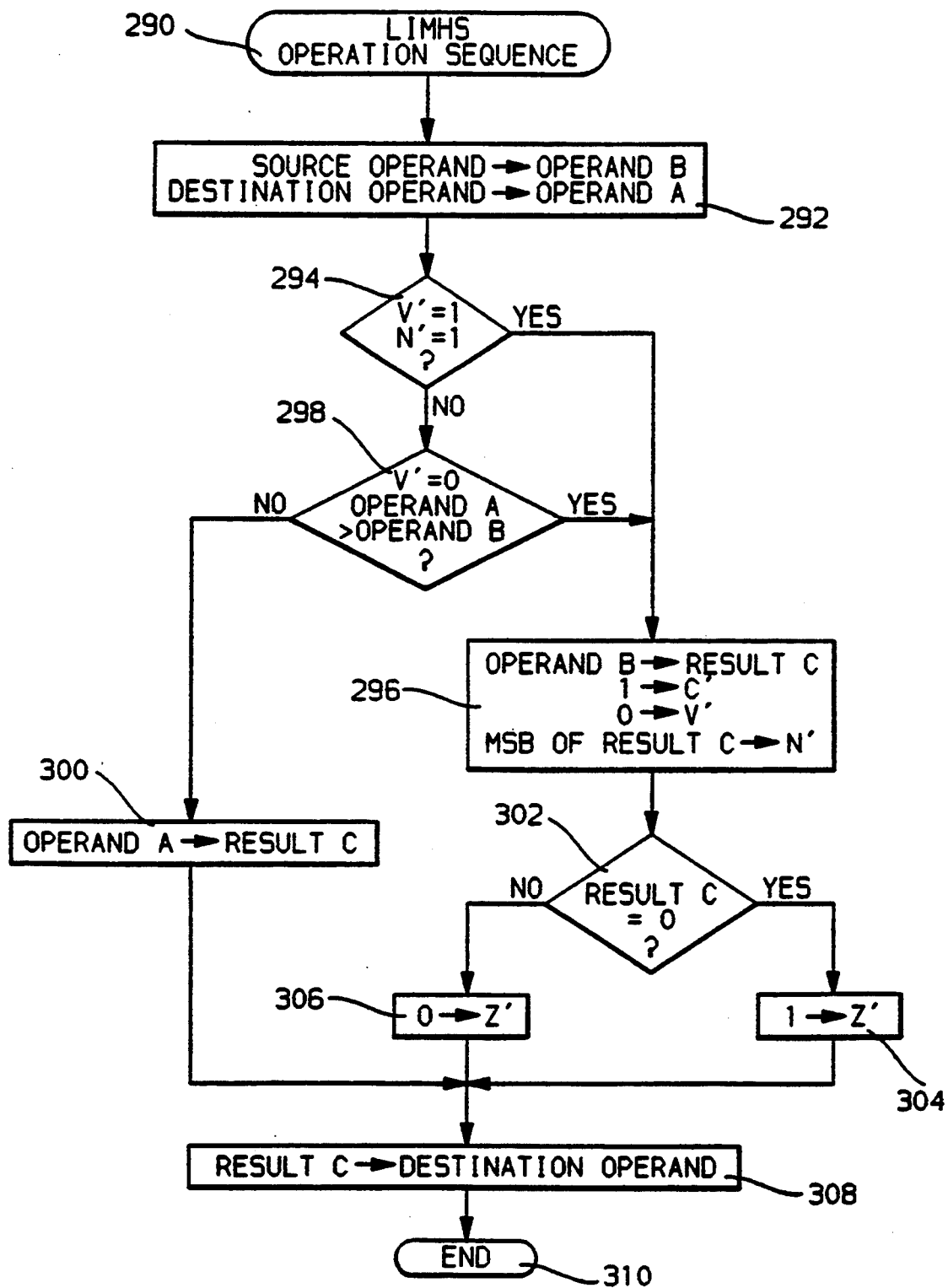

FIG. 5D illustrates the sequence of steps performed by the operation sequence control unit 16 in response to the decoding of a LIMHS instruction stored in the instruction register 12. As with the LIMLS instruction, the LIMHS instruction is inserted in a software program after an arithmetic instruction that is used to compute a signed numeric value for the software variable VAR, which is stored at the addressable memory location assigned to VAR.

The LIMHS operation sequence is entered at point 290 and proceeds to control step 292, where the source operand designated by the contents of field 64 of the LIMHS instruction is sent to the B register 100 of ALU 20, and the destination operand designated by the contents of field 66 of the LIMHS instruction is sent to the A register 102 of ALU 20. For the LIMHS instruction, the destination field 66 specifies the register in general register file 22 that contains the numeric value computed for the software variable VAR. Depending upon the addressing mode used by the LIMHS instruction, its source field 64 can either specify an address in memory unit 26 or a register within general register file 22 that contains the value of the predetermined upper bound UB for VAR, or the source field 64 can specify immediate data which represents the value for the predetermined upper bound UB for VAR. As a result, the numeric value of VAR is stored as operand A in the A register 102, and the numeric value of UB is stored as operand B in the B register 100.

From control step 292, the operation sequence proceeds to decision control step 294, where the values of the condition code V'-bit and N'-bit are tested to determine whether the V'-bit flag 74 has been set to a logic 1 value and the N'-bit flag 76 has been set to a logic 1 value. If the V'-bit has a logic 1 value and the N'-bit has a logic 1 value, recall from the previous discussion that this indicates that a signed overflow in the positive direction occurred during the execution of the signed arithmetic operation used to compute the numeric value for VAR. As a result, the numeric value for VAR currently stored as operand A is mathematically undefined, and the operation sequence is directed to control step 296. If the condition code V'-bit and N'-bit are not set to these values, signed overflow in the positive direction did not occur when the numeric value for VAR was computed, and the operation sequence is directed to decision control step 298.

At decision control step 298, the value of the V'-bit is tested to determined if the V'-bit flag 74 has been set to a logic 0 value, and the numeric value for VAR stored as operand A is tested against the value for the upper bound UB stored as operand B by way of a signed compare operation. If the V'-bit has a logic 0 value and operand A is greater than operand B, this indicates that signed overflow did not occur when the numeric value for VAR was computed, but VAR is out of range in the positive direction. As a result, the operation sequence is directed to control step 296. If either the V'-bit is not equal to a logic 0 value or operand A is not greater than operand B, the operation sequence is directed to control step 300.

At control step 300, the numeric value for VAR, stored as operand A, is sent to the C register 106 to be stored as result C. The operation sequence is then directed to control step 308.

Return now to control step 296, which is either branched to from decision control step 294 where the occurrence of signed overflow in the positive direction was detected, or branched to from decision control step 298 where the numeric value of VAR was found to be valid (not computed with the occurrence of signed overflow), but out of range in the positive direction (greater than the upper bound UB). In either case, the numeric value for VAR requires limiting to its acceptable upper bound UB, so operand B containing the value of the UB for VAR is transferred to the C register 106 and stored as result C. In addition, the condition code C'-bit flag 72 is set to a logic 1 value, the V'-bit flag 74 is cleared to a logic 0 value, and the N'-bit flag 76 is set equal to the value of the MSB position of the C register 106 containing result C. The rationale for performing these particular operations will deferred until the discussion of the remaining control steps in the LIMHS operation sequence has been completed.

From control step 296, the operation sequence proceeds to control step 302, where the result C stored in the C register 106 is tested to determine whether it has a binary value of zero. If result C equals binary zero, the operation sequence proceeds to control step 304, where the Z'-bit flag 70 is set to a logic 1 value. However, if the result C is not equal to binary zero, the operation sequence proceeds to control step 306, where the Z'-bit flag 70 is set to a logic 0 value. As stated previously for the LIMLU instruction, the setting of the Z'-bit flag 70 by this sequence control steps is in accordance with traditional practice and is actually carried out by NOR gate 108, which is coupled to the C register 106 as shown in FIG. 4A.

From control steps 300, 304, or 306, the LIMHS operation sequence is directed to control step 308. Here, the result C in the C register 106 is stored in the register specified by the destination operand field 66 of the LIMHS instruction. Recall that this register contains the numeric value for the software variable VAR.

From control step 308, the LIMHS operation sequence proceeds to point 310, where it is exited, and the operation sequence control unit 16 is then ready to execute the necessary control steps for the next machine instruction that is stored in the instruction register 12.

It will be recognized that when the LIMHS operation sequence proceeds to control step 308 from control step 300, the original numeric value for software variable VAR is simply assigned back to VAR in the general register file 22 since at control steps 294 and 298 it was determined that signed overflow did not occur when computing the numeric value for VAR, and the numeric value was not greater than the acceptable upper bound UB.

When the LIMHS operation sequence proceeds to control step 308 by way of control step 296, operand B is stored as result C, which is then stored in the register specified by the destination operand field 66 of the LIMHS instruction. This sequence of operations replaces the original numeric value of the software variable VAR in general register file 22 with the upper bound UB for VAR. Thus, the software variable VAR is limited to its upper bound UB, because its numeric value was originally computed with the occurrence of signed overflow in the positive direction, or the original numeric value for VAR was found to be valid, but greater than its acceptable upper bound LB.

In order to check both bounds of the range, the LIMLS and LIMHS machine instructions are in this case placed in a software program one after the other following the arithmetic instruction that computes the signed numeric value of a software variable that is to be range checked and possibly limited. Since the LIMLS and LIMHS instructions depend upon condition code settings generated by the arithmetic instruction, no other machine instructions that alter the condition code settings can be interposed between the arithmetic instruction and the LIMLS and LIMHS instruction pair.

The order in which the LIMLS and LIMHS instructions are used in a program does not depend upon the type of arithmetic instruction used to compute the numeric value of the software variable that is to be range checked and possibly limited. This is due to the fact that the condition code architecture of this first embodiment sets the V'-bit flag 74 to indicate the occurrence of signed overflow, and the N'-bit flag 76 is set to indicate the direction of the unsigned overflow, i.e., the N'-bit has a logic 1 value when signed overflow occurs in the positive direction, and a logic 0 value when the signed overflow occurs in the negative direction. Consequently, a software variable having an out of range signed numeric value will be correctly limited to its upper bound when signed overflow occurs in the positive direction, and to its lower bound when signed overflow occurs in the negative direction, regardless of the order in which the LIMLS and LIMHS instructions appear in a software program. Those skilled in the art will recognize that the operations associated with the lower and upper bounds performed by the execution of the LIMLS and LIMHS instructions could be merged into a single instruction since the order in which the operations are performed is not important.

At control step 266 in the LIMLS operation sequence and at step 296 in the LIMHS operation sequence, it will be recognized that the V'-bit flag 74 is set to a logic 0 value. This is done so as to indicate that once operand B (the upper or lower bound) has been transferred to the C register 106 in either control step 266 or control step 296, the numeric value of the software variable VAR is no longer in a state of overflow since the act of limiting (transferring operand B to the C register 106) brings its value within the acceptable range.

It will also be recognized that at control steps 266 and 296 in the respective LIMLS and LIMHS operation sequences, the C'-bit flag 72 is set to a logic 1 value. This setting of the C'-bit flag 72 provides an indication that the signed value of the software variable being checked has been range limited. As stated previously, this type of indication could be used, for example, to provide a warning that a control parameter is out of range when the microprocessor is employed in a control system application, or to provide diagnostic information regarding the software variable that could be stored in the memory unit 26 for later retrieval. Note that this use of the C'-bit flag 72 does not interfere with the range checking and limiting operations performed by the LIMLS and LIMHS instructions since they are associated with a signed arithmetic operation where the setting of the C'-bit is inconsequential.

The value of the N'-bit flag 76 is set equal to the value of the MSB position of C register 106 that contains the result C at control steps 266 and 296 of the respective LIMLS and LIMHS operation sequences. This is consistent with the traditional setting of the N'-bit flag 76 for operations involving signed numeric values, and just happens to be identical to the EOR of the theoretical sign and a logic 0 valued V'-bit.

The above described embodiment of the invention provides for the consistent setting of condition codes with respect to the occurrence of signed and unsigned overflows for all arithmetic operations performed by a defined set of arithmetic instructions for the microprocessor 10. The implemented condition code architecture sets the condition code flags to indicate the occurrence of unsigned overflow, and the occurrence of signed overflow along with its direction. The setting of the condition code flags was made to conform with traditional practice for unsigned and signed addition and subtraction operations, but as such, no indication of the direction of unsigned overflow is provided. As a consequence, the ordering of the instructions used to perform range checking and limiting operations on a software variable having its numeric value generated by an unsigned arithmetic operation is dependent upon the type of unsigned arithmetic operation performed.

A second embodiment of the present invention will now be described that implements a consistent condition code architecture that sets condition code flags to provide indications of the occurrence of unsigned and signed overflow during the performance of arithmetic operations, as well as indicating the direction of both unsigned and signed overflows. As a result, the instructions that are used to perform range checking and limiting operations on a software variable do not have to be executed in any particular order in relation to the arithmetic operation used to generate the numeric value of the software variable as was required for the LIMLU and LIMHU instructions of the first embodiment.

Figure 6:
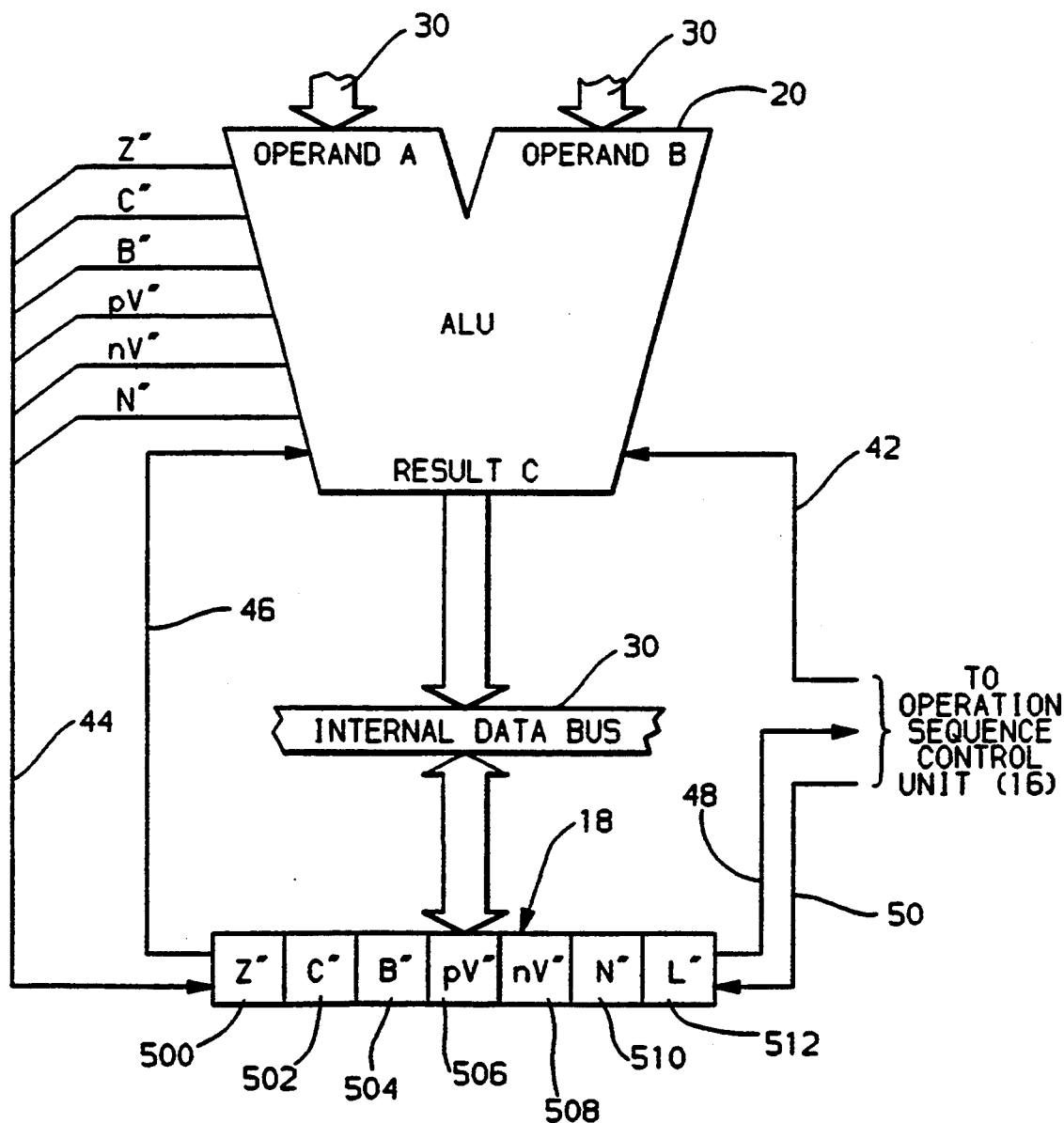
FIG. 6 illustrates a more detailed block diagram for the ALU and status register of FIG. 1, which are configured to provide a mathematically consistent condition code architecture according to a second embodiment of the present invention.

Referring now to FIG. 6, there is shown a block diagram of the ALU 20 and status register 18 of FIG. 1, which are now configured to provide a mathematically consistent condition code architecture according to the second embodiment of the invention. This particular architecture ensures that the condition codes provide indications of unsigned and signed overflow and the direction of both unsigned and signed overflows, for all of the arithmetic operations described previously for the first embodiment of the invention (see the discussion related to FIGS. 4A–4J).

The discussion related to FIG. 3 for the first embodiment also applies to the second embodiment illustrated in FIG. 6, except status register 18 is now expanded to contain a new set of condition code flags indicated as a Z"-bit flag 500, a C"-bit flag 502, a B"-bit flag 504, a pV"-bit flag 506, an nV"-bit flag 508, an N"-bit flag 510, and an L"-bit flag 512. Again, as in FIG. 3, the values for the condition code bits are shown as originating from ALU 20, but as described previously, these values can be generated within the ALU 20, by circuitry located external to ALU 20, by hardwired logic or the execution of microinstructions within the operation sequence control unit 16, or by any combination of these techniques.

In this second embodiment of the invention, the condition code bits are implemented to provide the indications of the occurrence of unsigned and signed overflows during the execution of arithmetic operations in ALU 20, as well as the direction of such overflows (positive or negative).

As with the traditional condition code Z-bit, and the Z'-bit of the first embodiment, the value of the Z"-bit is set to a logic 1 value when a binary zero valued result C is generated by an arithmetic operation in ALU 20, otherwise the Z"-bit is cleared to a logic 0 value (see the discussion related to FIG. 4A). In what follows, the value of the Z"-bit is generated in the same manner as described previously for the Z'-bit, and consequently, the specific circuitry used for its generation will not be repeated.

The C"-bit is an indicator of the occurrence of unsigned overflow in the positive direction during unsigned arithmetic operations. The C"-bit is set to a logic 1 value whenever an arithmetic operation in ALU 20 generates a result that cannot be represented as an unsigned number in the data width of the storage register in the ALU 20 that is to store the result. As with the previous embodiment, the A register 102, the B register 100, and the C register 106 in ALU 20 will each be assumed to have a data width of m bits, unless stated to the contrary. Unsigned overflow in the positive direction will then occur if the theoretical numeric value of a result generated by an unsigned arithmetic operation exceeds the value of $2^{m-1}$.

The B"-bit is an indicator of the occurrence of unsigned overflow in the negative direction (sometimes referred to as underflow) during unsigned arithmetic operations. The B"-bit is set to a logic 1 value whenever an arithmetic operation in ALU 20 generates a result that cannot be represented as an unsigned number because its value is less than zero (i.e., negative). For example, if a result were to be generated by subtracting 1 from 0, the result would have a value of −1, which cannot be represented as an unsigned number, so the B"-bit would be set to a logic 1 value.

The pV"-bit is an indicator of the occurrence of signed overflow in the positive direction during signed arithmetic operations. The pV"-bit is set to a logic 1 value whenever an arithmetic operation in ALU 20 generates a result that cannot be represented as a positive signed number within the data width allocated for the storage register holding the result. For a storage register having a data width of m bits, the largest the positive value that can be represented without setting the positive signed overflow pV"-bit, is $2^{(m-1)}-1$ (assuming the 2's complement format is used for representing negative numbers, as was done in the first embodiment).

The nV"-bit is an indicator of the occurrence of signed overflow in the negative direction during signed arithmetic operations. The nV"-bit is set to a logic 1 value whenever an arithmetic operation in ALU 20 generates a result that cannot be represented as a negative signed number in the data width allocated for the storage register holding the result. For a storage register having a data width of m bits, the largest negative value that can be represented without setting the negative signed overflow nV"-bit is $-2^{(m-1)}$.

For the second embodiment, the N"-bit is an indicator of the theoretical sign of a numeric result produced by a signed arithmetic operation. The N"-bit is set to a logic 1 value whenever a signed arithmetic operation in the ALU 20 generates a result that should theoretically have a negative sign, even though the apparent sign (the MSB position) of the result may be represented incorrectly due to the insufficient data width of the storage register holding the result.

The L"-bit is an indicator that the numeric value of a software variable, designated by the destination field 66 of a range checking and limiting instruction, has been limited to its predetermined upper or lower bound, due to the occurrence of overflow in the direction of the respective bound, or because the value of the software variable was respectively greater than the upper bound or less than the lower bound.

Referring now to FIGS. 7A–7J, there are shown functional logic diagrams for implementing the mathematically consistent condition code architecture of the second embodiment of the present invention for the same set of arithmetic instructions used in describing the first embodiment (see FIGS. 4A–4J). In what follows, the discussion related to FIGS. 7A–7J will be restricted to the setting of condition codes for the various arithmetic instructions, since the operation of the ALU 20 during the execution of these arithmetic instructions was previously set forth in the description related to FIGS. 4A–4J. Also, logic components that are common to both sets of FIGS. 4A–4J and FIGS. 7A–7J, and that perform the same functions, will be designated with like numerals, and where such components have previously been discussed with respect to the early set of FIGS. 4A–4J, the description will not be repeated in discussing FIGS. 7A–7J.

Figure 7A:
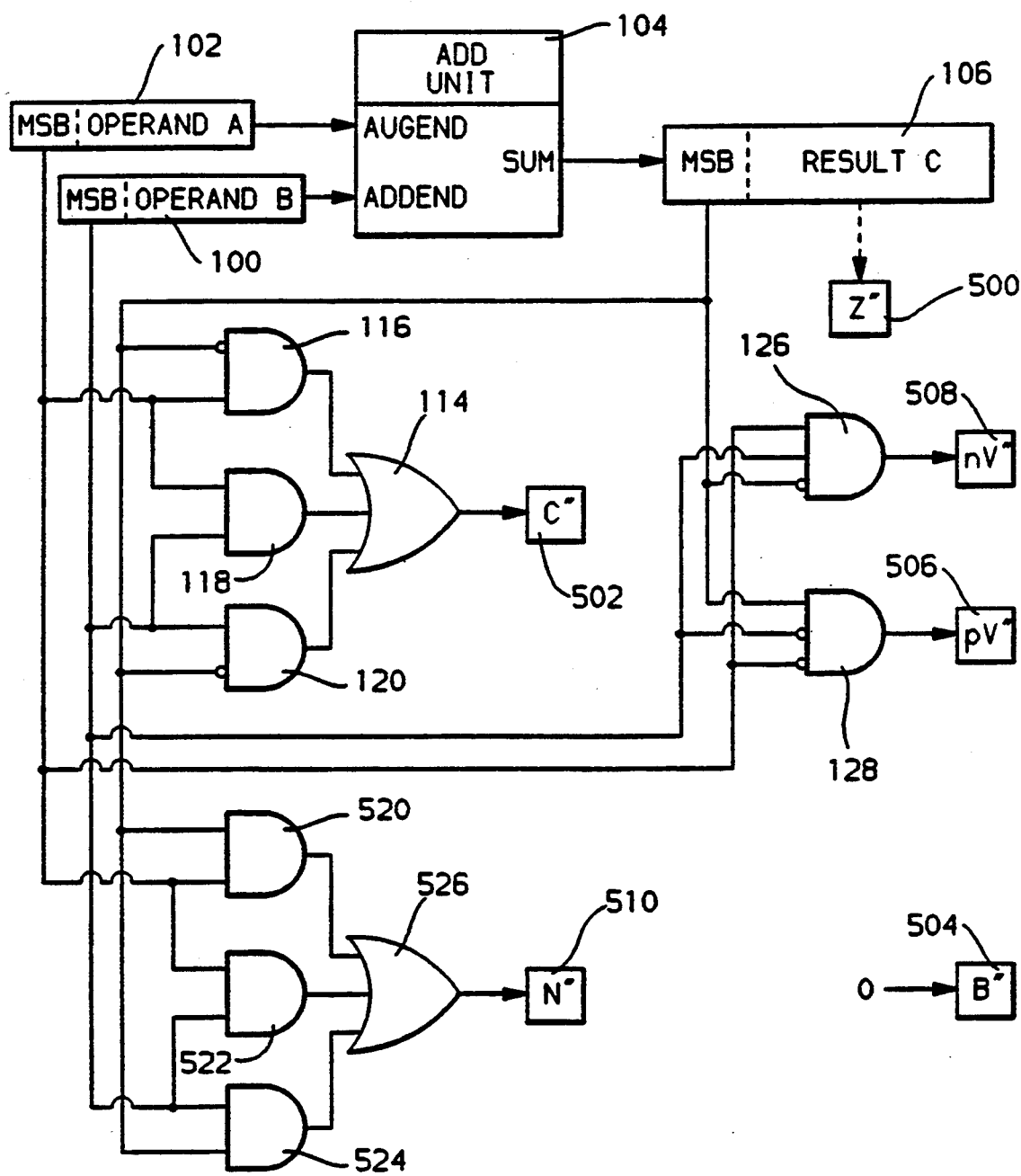
FIGS. 7A, 7B, 7C, 7D, 7E, 7F, 7G, 7H, 7I and 7J illustrate functional logic diagrams for implementing the mathematically consistent condition code architecture of the second embodiment for various arithmetic machine instructions.

FIG. 7A illustrates functionally that portion of the condition code architecture of the second embodiment for setting the condition code bits when the ALU 20 performs unsigned and signed addition during the execution of an ADD instruction.

The Z"-bit flag 500 is set in the same fashion as the Z'-bit flag 70 of the previous embodiment, and, as such, it will be mentioned only briefly when describing the implementation of the second embodiment of the invention.

The combination of OR gate 114 and AND gates 116, 118, and 120, that were used to set the value of the C'-bit flag 72 in the first embodiment (see FIG. 4A) to indicate the occurrence of unsigned overflow, are also used in the second embodiment to set the C"-bit flag 502, since only unsigned overflow in the positive direction can occur for an unsigned addition operation.

The B"-bit flag 504 is cleared to a logic 0 value, since unsigned overflow in the negative direction (underflow) cannot occur during an unsigned addition operation.

In the first embodiment, signed overflow V'-bit was set a logic 1 value to indicate the occurrence of signed overflow (in either the positive or negative direction), when the output from AND gate 126 was a logic 1 value or the output from AND gate 128 was a logic 1 value (see FIG. 4A). In the present embodiment, the output from AND gate 126 is used to set the nV"-bit flag 508 and the output from AND gate 128 is used to set the pV"-bit flag 506. The nV"-bit is set to a logic 1 value to indicate the occurrence of signed overflow in the negative direction when the signs (MSBs) of operand A and operand B are both negative, and the apparent sign (MSB) of result C is positive. Here, it will be recognized that the sign of result C should also be negative, but will have been changed to positive due to the occurrence of signed overflow. The pV"-bit is set to a logic 1 value to indicate the occurrence of signed overflow in the positive direction, when the signs (MSBs) of operand A and and B are both positive, and the apparent sign (MSB) of result C is negative. Here, it will be recognized that the sign of result C should also be positive, but will have been changed to negative due to the occurrence of signed overflow.

The combination of OR gate 526 and AND gates 520, 522, and 524 are used to set the value of the N''-bit flag 510. The N''-bit is set to a logic 1 value only when the theoretical sign of the result is negative, otherwise it is cleared to a logic 0 value. The applicants have found that the theoretical sign of the result can be negative only when: (1) operand A and result C are both negative; (2) operand B and result C are both negative; or (3) operand A and operand B are both negative.

Figure 7B:
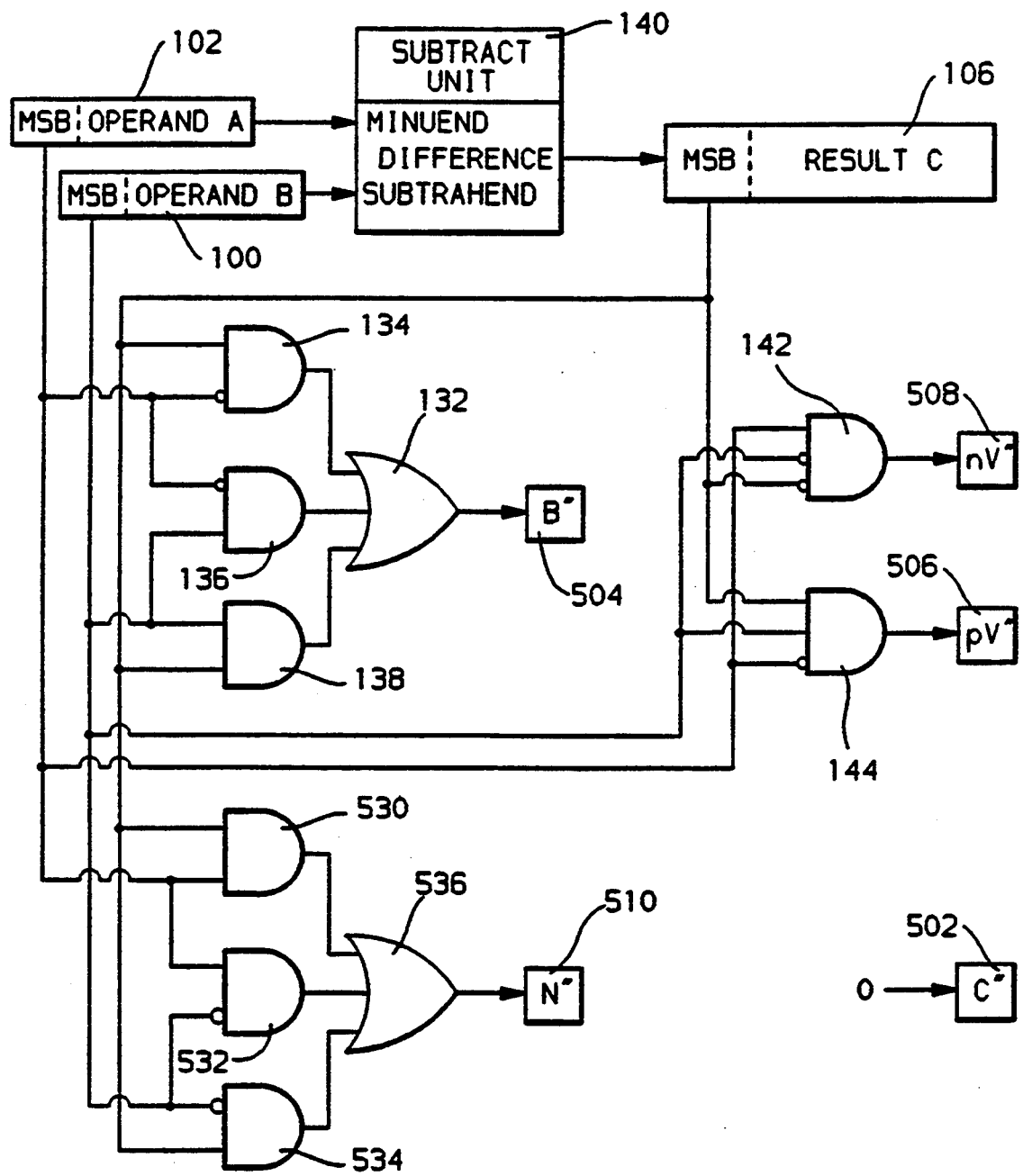

FIG. 7B illustrates functionally that portion of the condition code architecture of the second embodiment for setting the condition code bits when the ALU 20 performs unsigned and signed subtraction during the execution of a SUB instruction.

The combination of OR gate 132 and AND gates 134, 136, and 138, that were used to set the value of the C'-bit flag 72 in the first embodiment (see FIG. 4B) to indicate the occurrence of unsigned overflow, are also used in the second embodiment to set the B''-bit flag 504, since only unsigned overflow in the negative direction (underflow) can occur for an unsigned subtraction operation.

The C''-bit flag 502 is cleared to a logic 0 value, since unsigned overflow in the positive direction cannot occur during an unsigned subtraction operation.

In the first embodiment, signed overflow V'-bit was set a logic 1 value to indicate the occurrence of signed overflow (in either the positive or negative direction), when the output from AND gate 142 was a logic 1 value or the output from AND gate 144 was a logic 1 value (see FIG. 4B). In the present embodiment, the output from AND gate 142 is used to set the nV'''-bit flag 508 and the output from AND gate 144 is used to set the pV'''-bit flag 506. The nV'''-bit is set to a logic 1 value to indicate the occurrence of signed overflow in the negative direction when the sign of operand A is negative, the sign of operand B is positive, and the result C appears to be positive. Here, it will be recognized that the sign of result C should also be negative, but will have been changed to positive due to the occurrence of signed overflow. The pV'''-bit is set to a logic 1 value to indicate the occurrence of signed overflow in the positive direction, when the sign of operand A is positive, the sign of operand B is negative, and the sign of result C appears to be negative. Here, it will be recognized that the sign of result C should also be positive, but will have been changed to negative due to the occurrence of signed overflow.

The combination of OR gate 536 and AND gates 530, 532, and 534 are used to set the value of the N''-bit flag 510. The N''-bit is set to a logic 1 value only when the theoretical sign of the result is negative, otherwise it is cleared to a logic 0 value. The applicants have found that the theoretical sign of the result can be negative only when: (1) operand A and result C are both negative; (2) operand B is positive and result C is negative; or (3) operand A is negative and operand B is positive.

Figure 7C:
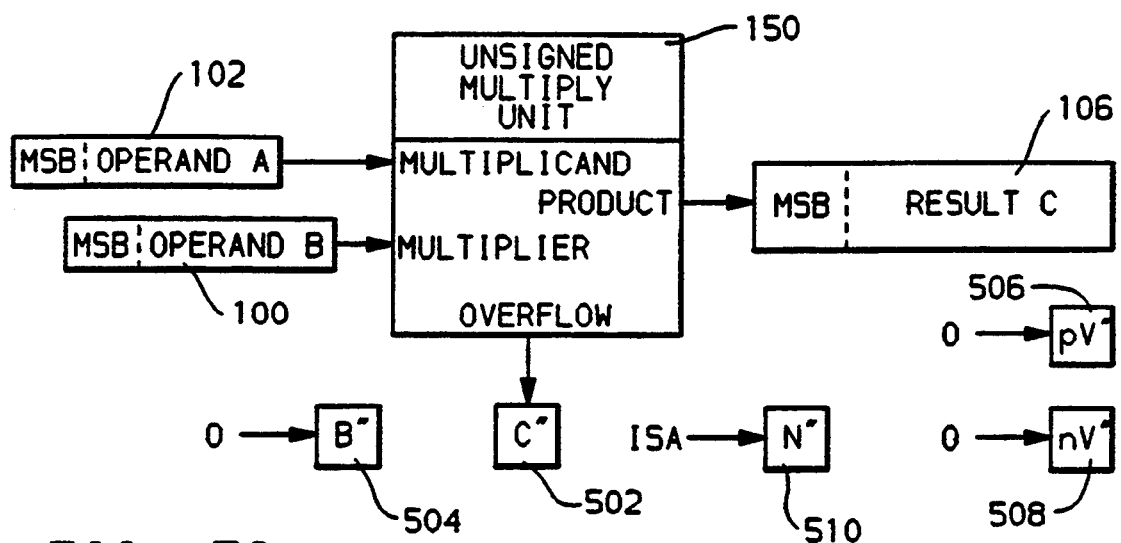

FIG. 7C illustrates functionally that portion of the condition code architecture of the second embodiment for setting the condition code bits when the ALU 20 performs unsigned multiplication during the execution of a MULU instruction.

The overflow output from the unsigned multiply unit 150 in ALU 20 is used in the second embodiment to set the C''-bit flag 502, since only unsigned overflow in the positive direction can occur for an unsigned multiplication operation. Again, as in the first embodiment, the A register 102, the B register 100, and C register 106 in ALU 20 are each assumed to have a data width of m bits.

The B''-bit flag 504 is cleared to a logic 0 value, since unsigned overflow in the negative direction (underflow) cannot occur during an unsigned multiplication operation. Also, the positive and negative signed overflow indicators, the pV'''-bit flag 506 and nV'''-bit flag 508, are both set to logic 0 values, since signed overflow cannot occur during an unsigned arithmetic operation.

As indicated, the value of the N''-bit flag 510 is instruction set assignable (ISA), since the MULU instruction performs an unsigned arithmetic operation and, as such, the setting of the N''-bit is inconsequential. For example, the N''-bit could be set equal to the value of the MSB of the C register 106, which is traditional practice; the N''-bit could be set to a logic 0 value since all unsigned values are, by definition, positive, and no sign information is generated during any unsigned arithmetic operation; or the N''-bit could be set in any other way that might be advantageous with respect to the microprocessor's implemented instruction set.

Figure 7D:
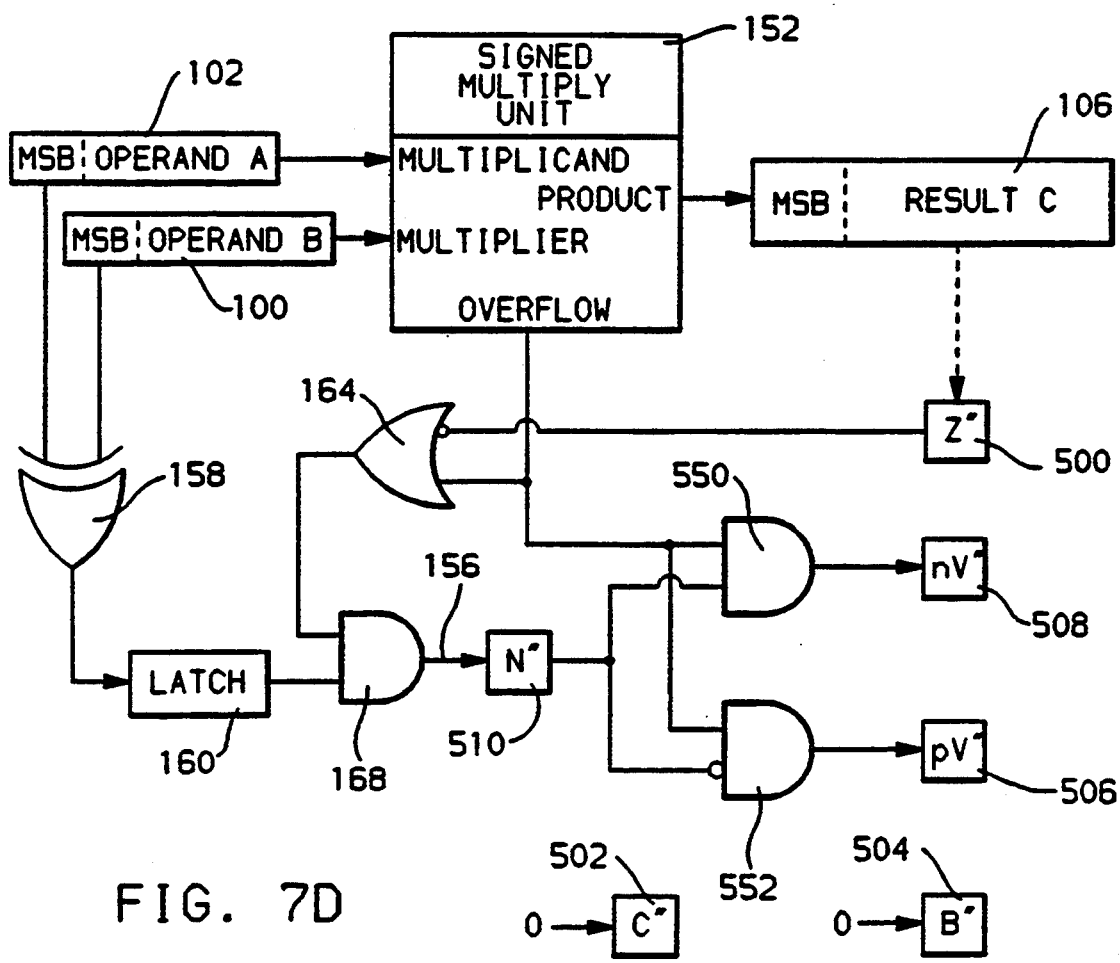

FIG. 7D illustrates functionally that portion of the condition code architecture of the second embodiment for setting the condition code bits when the ALU 20 performs signed multiplication during the execution of a MULS instruction.

Since the arithmetic operation being performed is signed, unsigned overflow cannot occur. As a result, the C''-bit flag 502 and the B''-bit flag 504 are both set to logic 0 values.

Recall from the discussion related to FIG. 4D of the first embodiment that the value for the theoretical sign for the result C generated by a signed multiplication operation was provided at the output of AND gate 168 on line 156. The same circuitry, including EOR gate 158, latch 160, OR gate 164 and AND gate 168, that was used in FIG. 4D to generate a value for the theoretical sign of result C is repeated in FIG. 7D, with the value of the Z''-bit flag 500 now acting as an input (inverted) to OR gate 164 (instead of the value of the Z'-bit flag 70). Thus, for signed multiplication, the theoretical sign or N''-bit flag 510 is set by the logic value appearing on line 156 from AND gate 168.

The setting of the N''-bit flag 510 and the signed overflow output from the signed multiply unit 152 are employed by AND gates 550 and 552 for setting the values of the negative and positive signed overflow indicators, the nV'''-bit flag 508 and the pV'''-bit flag 506, respectively. The nV'''-bit flag 508 is set to a logic 1 value by the output of AND gate 550 when signed overflow occurs and the the N''-bit flag 510 is set to a logic 1 value, which indicates that the signed overflow is in the negative direction (i.e., the theoretical value of the result C was negative). The pV'''-bit flag 506 is set to a logic 1 value by the output of AND gate 552 when signed overflow occurs and the N''-bit flag 510 is cleared to a logic 0 value, which indicates that the signed overflow is in the positive direction (i.e., the theoretical value of result C was positive).

Figure 7E:
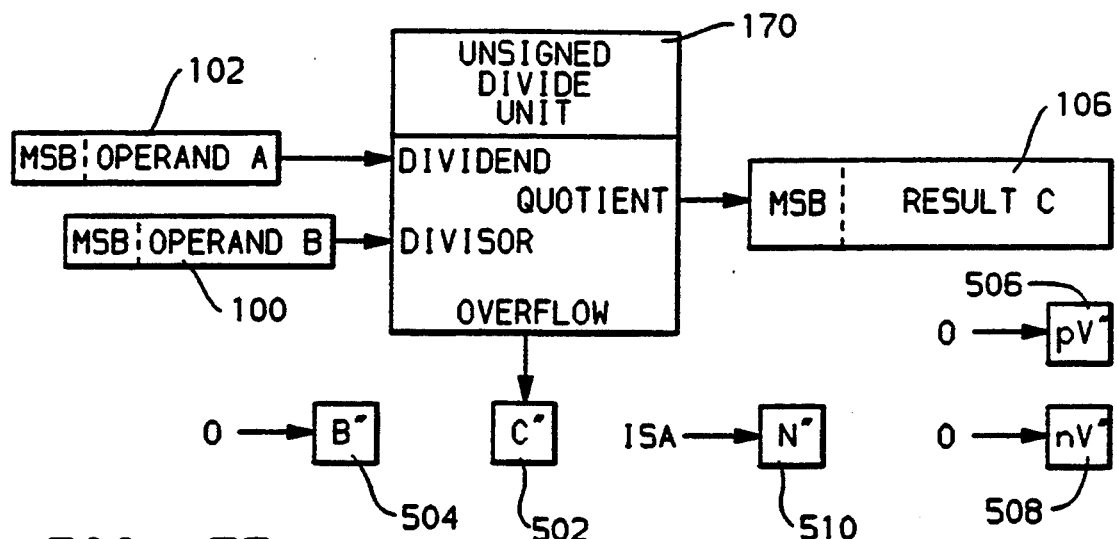

FIG. 7E illustrates functionally that portion of the condition code architecture of the second embodiment for setting the condition code bits when the ALU 20 performs unsigned division during the execution of a DIVU instruction.

The overflow output from the unsigned divide unit 170 in ALU 20 is used in the second embodiment to set the C''-bit flag 502, since only unsigned overflow in the positive direction can occur for an unsigned division operation.

The B''-bit flag 504 is cleared to a logic 0 value, since unsigned overflow in the negative direction (underflow) cannot occur during an unsigned division operation. Also, the positive and negative signed overflow indicators, the pV''-bit flag 506 and nV''-bit flag 508, are both set to logic 0 values, since signed overflow cannot occur during an unsigned arithmetic operation.

As indicated, the value of the N''-bit flag 510 is instruction set assignable (ISA), since the DIVU instruction performs an unsigned arithmetic operation, and, as such, the setting of the N''-bit is inconsequential. For example, the N''-bit could be set equal to the value of the MSB of the C register 106, which is the traditional practice, the N''-bit could be set to a logic 0 value since all unsigned values are, by definition, positive and no sign information is generated during any unsigned arithmetic operation, or the N''-bit could be set in any other way that might be advantageous with respect to the microprocessor's implemented instruction set.

Figure 7F:
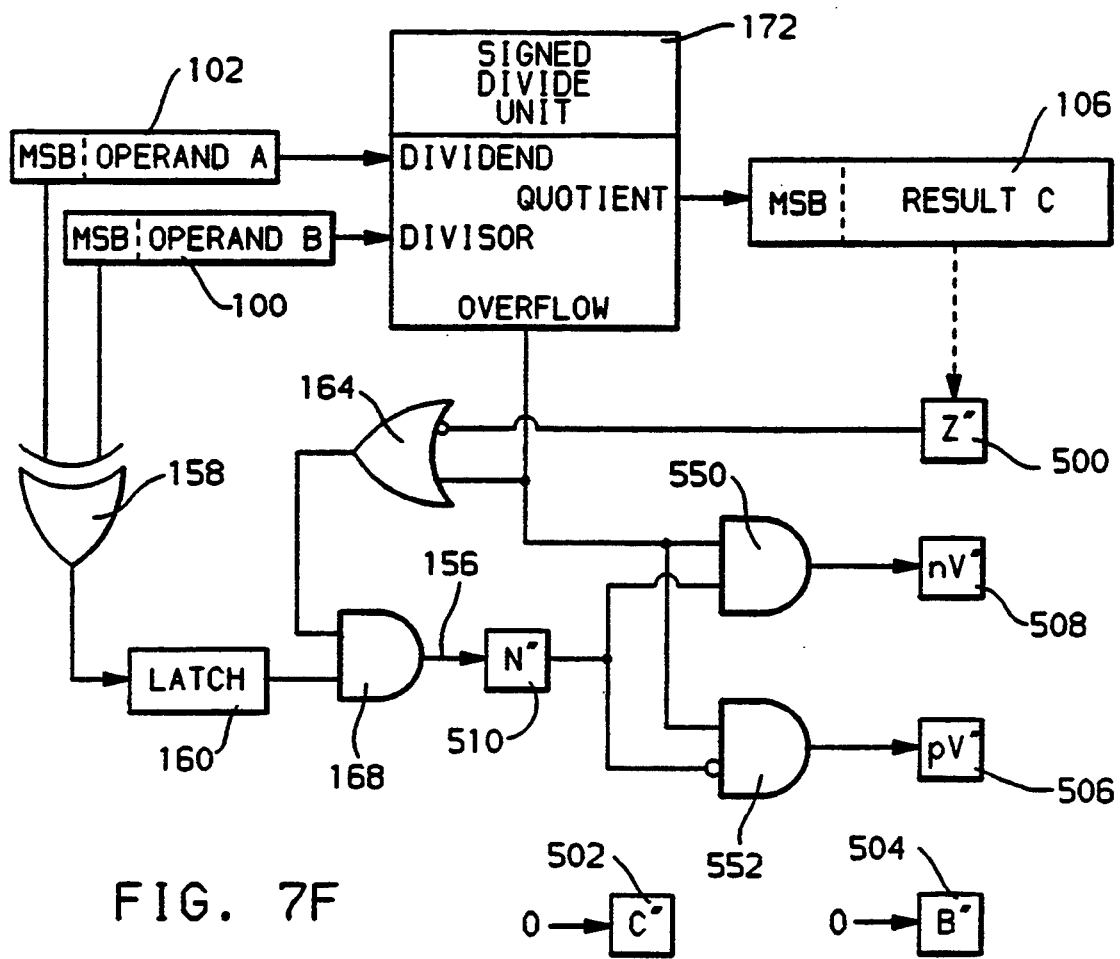

FIG. 7F illustrates functionally that portion of the condition code architecture of the second embodiment for setting the condition code bits when the ALU 20 performs signed division during the execution of a DIVS instruction.

Since the arithmetic operation being performed is signed, unsigned overflow cannot occur. As a result, the C''-bit flag 502 and the B''-bit flag 504 are both set to logic 0 values.

Recall from the discussion related to FIG. 4F of the first embodiment that the value for the theoretical sign for the result C generated by a signed division operation was provided at the output of AND gate 168 on line 156. The same circuitry, including EOR gate 158, latch 160, OR gate 164 and AND gate 168, that was used in FIG. 4F to generate a value for the theoretical sign for result C is repeated in FIG. 7F, with the value of the Z''-bit flag 500 now acting as an input (inverted) to OR gate 164 (instead of the value of the Z'-bit flag 70). Thus, for signed division, the theoretical sign or N''-bit flag 510 is set by the logic value appearing on line 156 from AND gate 168.

The values of the pV''-bit flag 506 and the nV''-bit flag 508 are determined by the setting of N''-bit flag 510 and the signed overflow output from the signed divide unit 172 using the same AND gate 550 and AND gate 552 that were shown previously in FIG. 7D for the signed multiply instruction. The nV''-bit flag 508 is set to a logic 1 value by the output of AND gate 550 when signed overflow occurs and the the N''-bit flag 510 is set to a logic 1 value, which indicates that the signed overflow is in the negative direction (i.e., the theoretical value of the result C was negative). The pV''-bit flag 506 is set to a logic 1 value by the output of AND gate 552 when signed overflow occurs and the N''-bit flag 510 is cleared to a logic 0 value, which indicates that the signed overflow is in the positive direction (i.e., the theoretical value of result C was positive).

Figure 7G:
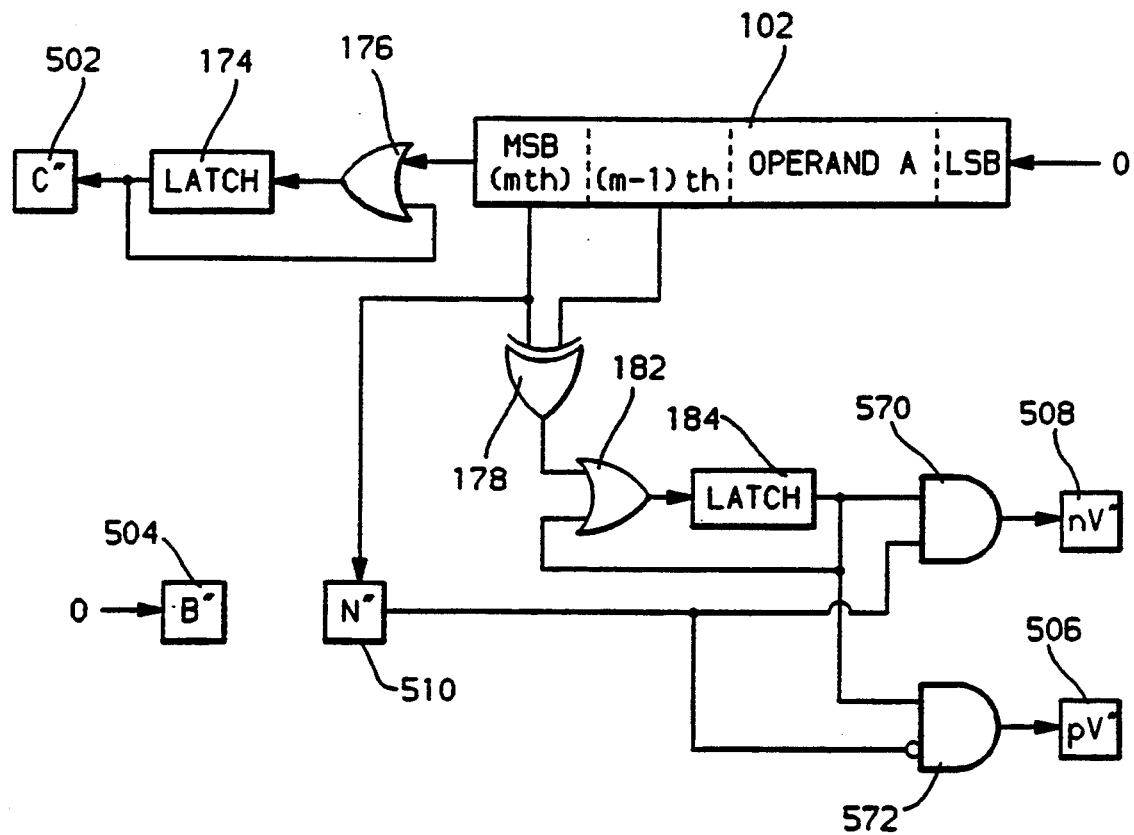

FIG. 7G illustrates functionally that portion of the condition code architecture of the second embodiment for setting the condition code bits when the ALU 20 performs unsigned and signed multiplication by powers of two, during the execution of an ASL instruction.

As in the first embodiment of the invention (see FIG. 4G), latch 174 and OR gate 176 are used to set the C''-bit flag 502 if a logic 1 is ever shifted out of the MSB position of the A register 102, thereby indicating the occurrence of unsigned overflow in the positive direction.

The B''-bit flag 504 is set to a logic 0 value, because the arithmetic shift left operation can only generate unsigned overflow in the positive direction.

The N''-bit flag 510 is set to the value of the MSB of operand A in the A register 102, prior to initiating the shift operation. The value of this MSB represents the theoretical sign of the result that will be generated by the shift operation.

Also, EOR gate 178, OR gate 182, and latch 184 are connected in the same manner as in the first embodiment (see FIG. 4G) to generate an output value from latch 184 that indicates the occurrence of signed overflow, if the MSB of the A register 102 ever changes value during the shift operation. In the second embodiment, AND gate 570 sets the nV'''-bit 508 flag to a logic 1 value to indicate the occurrence signed overflow in the negative direction when the output of latch 184 has a logic 1 value and the N''-bit flag 510 is set to a logic 1 value. The pV'''-bit flag 506 is set to a logic 1 value to indicate the occurrence of signed overflow in the positive direction when the output of latch 184 has a logic 1 value and the N''-bit flag 510 is set to a logic 0 value.

Figure 7H:
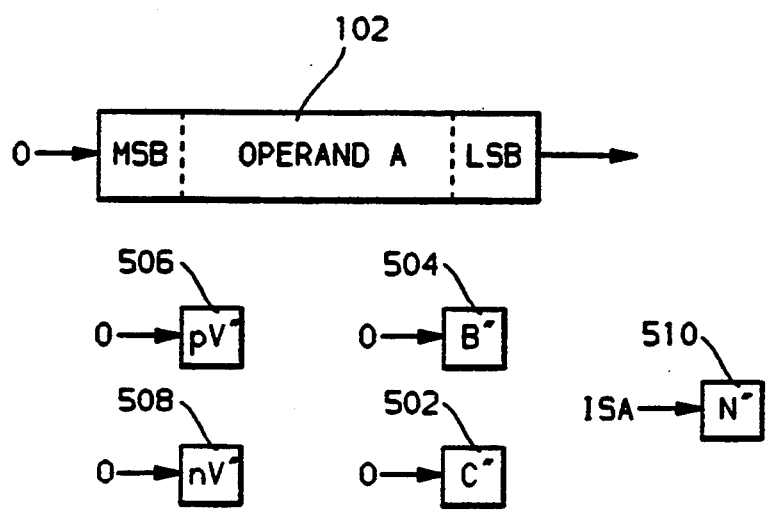

FIG. 7H illustrates functionally that portion of the condition code architecture of the second embodiment for setting the condition code bits when the ALU 20 performs unsigned division by powers of two, during the execution of a LSR instruction.

Unsigned overflow is not possible during an unsigned divide by powers of two operation. As a result, both the C''-bit flag 502 and the B''-bit flag 504 are set to logic 0 values. Likewise, the pV'''-bit flag 506 and the nV'''-bit flag 508 are also set to logic 0 values, since signed overflow cannot occur during an unsigned operation.

As indicated in FIG. 7H, the N''-bit flag 510 can be set to a value that is instruction set assignable (ISA), since the result generated from an unsigned operation does not have a sign bit. For example, the N''-bit flag 510 could to set to a logic 0 value since all unsigned values are, by definition, positive and no sign information is generated during any unsigned arithmetic operation, it could be set to the value of the MSB position of the A register 102 after the shift operation is completed, as is the traditional practice, or it could be set in any other way that might be advantageous with respect to the microprocessor's implemented instruction set.

Figure 7I:
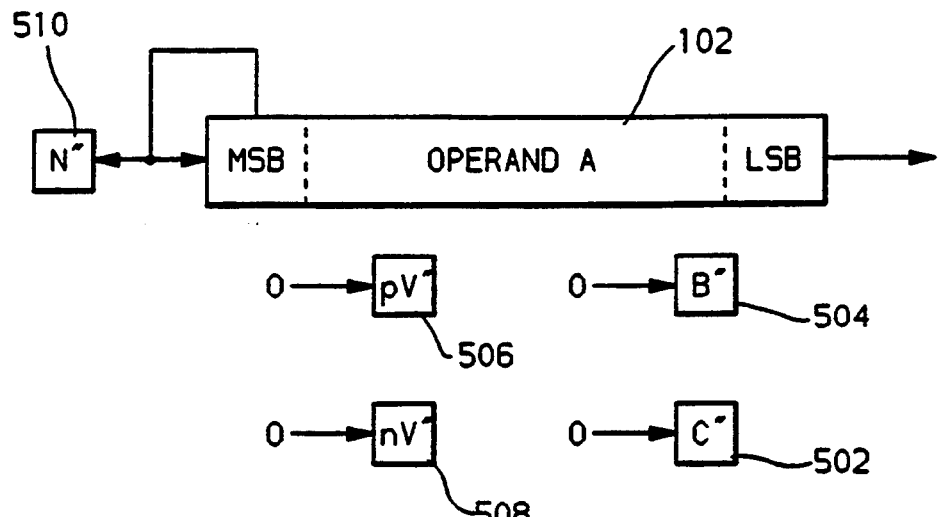

FIG. 7I illustrates functionally that portion of the condition code architecture of the second embodiment for setting the condition code bits when the ALU 20 performs signed division by powers of two, during the execution of an ASR instruction.

Since both unsigned and signed overflows are not possible during a signed division by powers of two operation performed during the execution of an ASR instruction, the C''-bit flag 502, the B''-bit flag 504, the pV'''-bit flag 506, and the nV'''-bit flag 508 are all set to logic 0 values.

Since this is a signed operation, the N"-bit flag 510 represents the theoretical sign of the result, which in this case is value of the MSB of operand A stored in the A register 102.

Figure 7J:
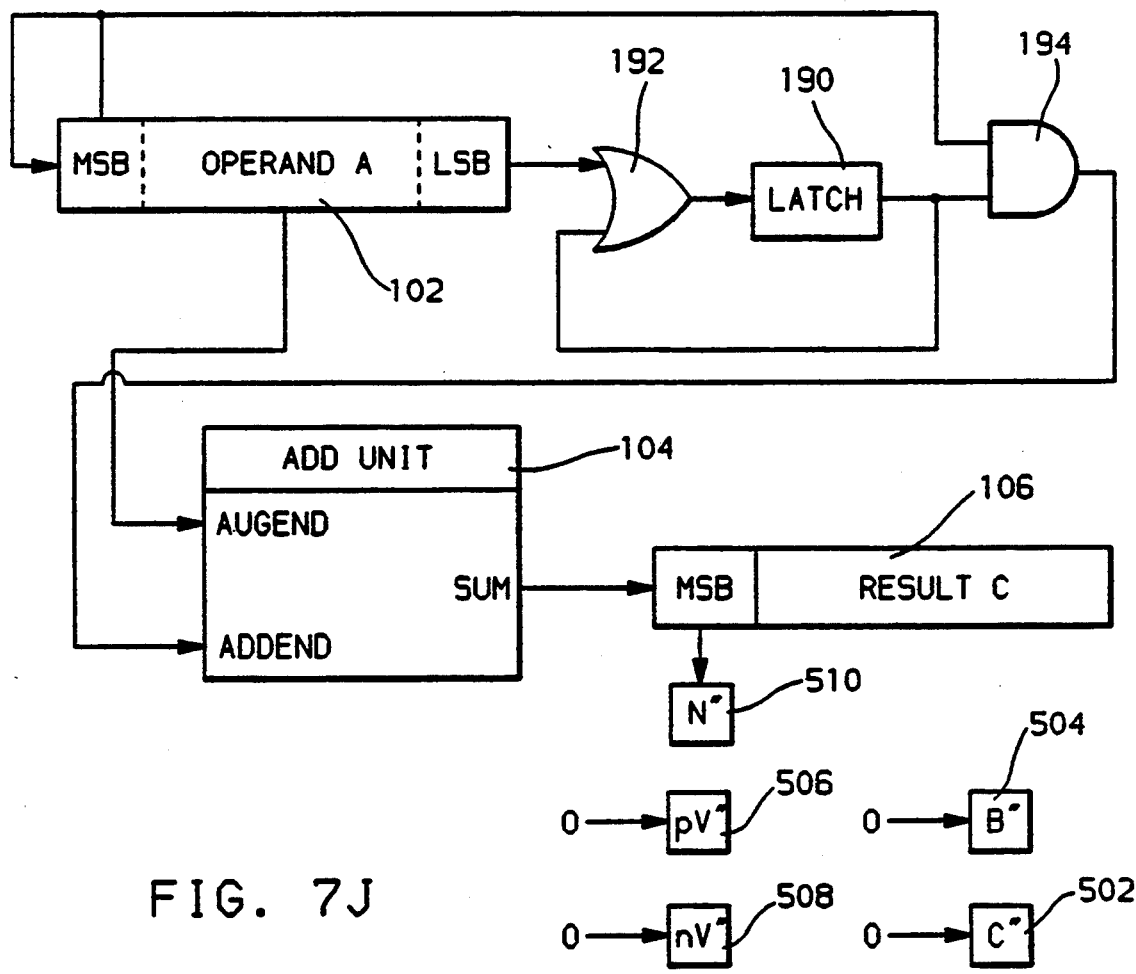

FIG. 7J illustrates functionally that portion of the condition code architecture of the second embodiment for setting the condition code bits when the ALU 20 performs signed division by powers of two with rounding toward zero, during the execution of an ASR0 instruction (see the previous discussion associated with FIG. 4J).

The C"-bit flag 502, the B"-bit flag 504, the pV"-bit flag 506, and the nV"'-bit flag 508 are all set to logic 0 values, because unsigned and signed overflow cannot occur when performing division by powers of two with an arithmetic shift right operation.

The N"-bit flag 510 is set to the value of the MSB of the C register 106, which represents the theoretical sign of the result C generated by executing the ASR0 instruction.

Referring now to FIGS. 8A–8D, there are shown flow diagrams illustrating the sequence of control steps carried out by the operation sequence control unit 16 when executing single instruction range checking and limiting operations, which utilized the values of the condition codes determined in accordance with the second embodiment of the invention.

As in the first embodiment, for software variables having values computed by unsigned arithmetic operations, the LIMHU instruction provides range checking and limiting to an upper bound (see FIG. 5A), while a LIMLU instruction provides range checking and limiting to a lower bound (see FIG. 5B). Likewise, for software variables having values computed by signed arithmetic operations, the LIMHS and LIMLS instructions provide for range checking and limiting to respectively upper and lower bounds, just as in the first embodiment (see FIGS. 5C and 5D).

To simplify the description that follows, the control steps in the flow charts associated with the second embodiment (illustrated in FIGS. 8A–8D) are designated with primed numerals, which correspond to the unprimed numerals used in designating comparable control steps in the flow charts associated with the first embodiment (formerly illustrated in FIGS. 5A–5D). To conserve space in the specification, control steps numbered with primed numerals in FIGS. 8A–8D that perform operations identical with those performed by control steps numbered with corresponding unprimed numerals in FIGS. 5A–5D will be discussed only briefly. Those control steps in the flow charts of FIGS. 8A–8D that function differently from the corresponding control steps of FIGS. 5A–5D will be described with more particularity.

Figure 8A:
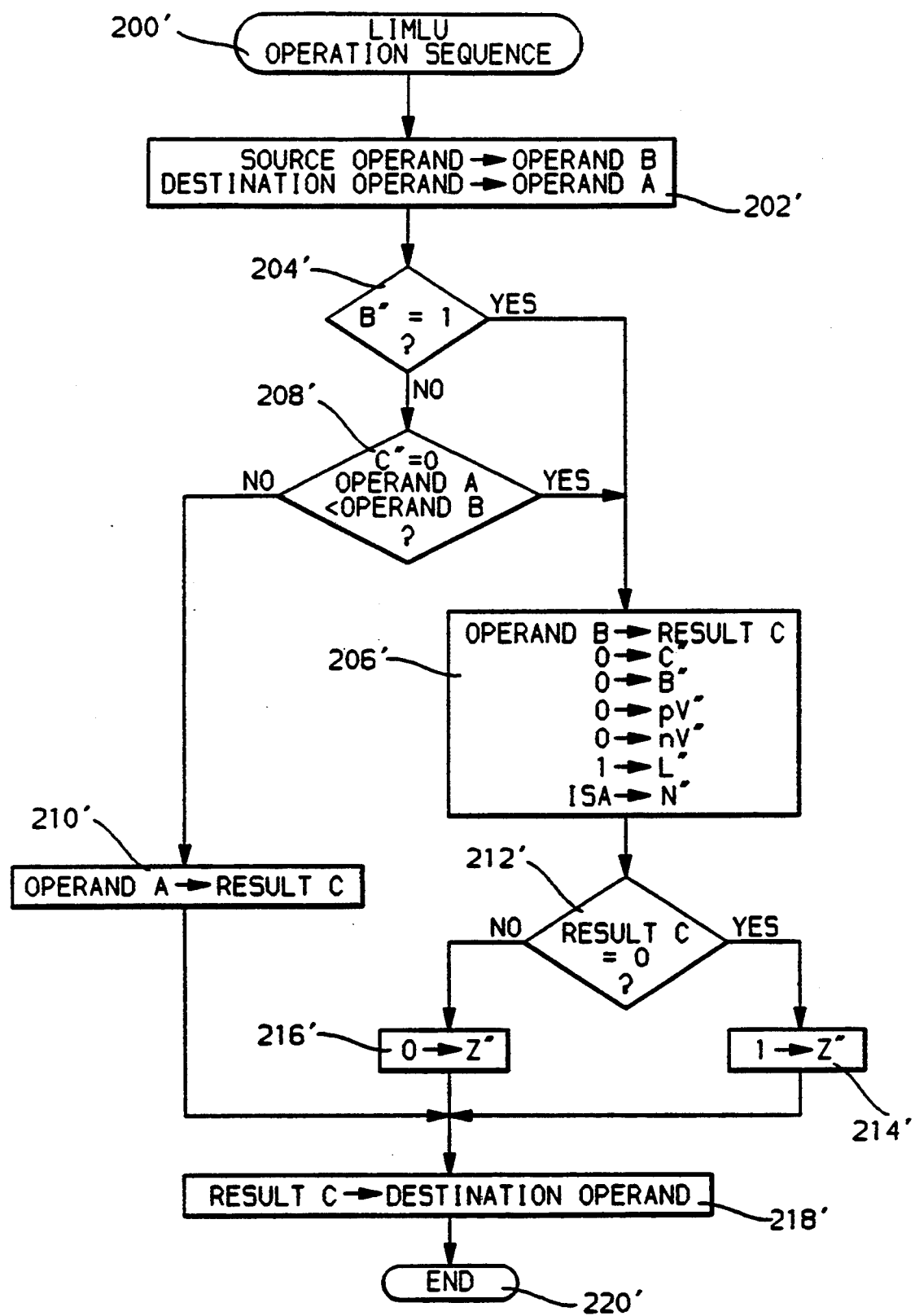
FIGS. 8A, 8B, 8C and 8D illustrate flow diagrams representative of the sequence of control steps carried out by the operation sequence control unit of FIG. 1, when executing the single instruction range checking and limiting operations utilized by the second embodiment of the invention.

FIG. 8A illustrates the sequence of steps performed by the operation sequence control unit 16 in response to the decoding of a LIMLU instruction for the second embodiment of the invention. The LIMLU operation sequence is entered at point 200', when the operation sequence control unit 16 determines that a LIMLU instruction has been loaded into the instruction register 12, based upon the decoded instruction opcode provided by the instruction decoder 14.

From point 200', the operation sequence proceeds to control step 202' where the numeric value of the software variable VAR is stored in the A register 102 as operand A, and the numeric value of the lower bound LB for VAR is stored in the B register 100 as operand B.

From control step 202', the operation sequence proceeds to decision control step 204', where the value of the condition code B"-bit is tested to determine whether the B"-bit flag 504 has been set to a logic 1 value. If the B"-bit has a logic 1 value, this indicates that an unsigned overflow in the negative direction occurred during the execution of the unsigned arithmetic operation used to compute the numeric value for VAR. As a result, the numeric value VAR currently stored as operand A is mathematically undefined, and the operation sequence is directed to control step 206'. Conversely, if the B"-bit has a logic 0 value, this indicates that negative unsigned overflow did not occur during the unsigned arithmetic operation used to compute the numeric value for VAR, and the operation sequence is directed to decision control step 208'.

At decision step 208', the value of the C"-bit is tested to determined if the C"-bit flag 502 has been set to a logic 0 value, and the numeric value for VAR stored as operand A is tested against the value of the lower bound LB stored as operand B by way of an unsigned compare operation. If the C"-bit has a logic 0 value and operand A is less than operand B, this indicates that positive unsigned overflow did not occur when the numeric value for VAR was computed, but VAR is out of range in the negative direction. As a result, the operation sequence is directed to control step 206'. If either the C"-bit is not equal to a logic 0 value, or operand A is not less than operand B, the operation sequence is directed to control step 210'.

At control step 210', the numeric value for VAR, stored as operand A, is sent to the C register 106 to be stored as result C. The operation sequence is then directed to control step 218'.

Return now to control step 206', which is either branched to from control step 204' when the B"-bit has a logic 1 value, or branched to from control step 208' when the valid numeric value for VAR is less than its acceptable lower bound LB. At this control step, operand B is transferred to the C register 106 and stored as the result C. The condition code C"-bit flag 502, B"-bit flag 504, pV"-bit flag 506, and nV"'-bit flag 508 are all cleared to logic 0 values. In addition, the condition code L"-bit flag 512 is set to a logic 1 value, and the N"-bit flag 510 is set to a value that is instruction set assignable (ISA). As in the discussion of the first embodiment, the rationale for performing these particular operations will be set forth later, after a discussion of the companion LIMHU instruction has been completed.

From control step 206' the LIMLU operation sequence proceeds through the set of control steps 212', 214', and 216' to set the value of the Z"-bit flag 500 to a logic 1 value, if the result C stored in the C register 106 is equal to a binary zero value, otherwise the Z"-bit flag 500 is set to a logic 0 value. This setting of the Z"-bit flag 500 compares exactly with the setting of the Z'-bit flag 70 performed by the corresponding control steps 212, 214, and 216 shown in FIG. 5A.

From control step 210', 214', or 216', the LIMLU operation sequence is directed to control step 218'. Here, the result C stored in the C register 106 is stored in the register specified by the destination operand field 66 of the LIMLU instruction. Recall that this register contains the numeric value for the software variable VAR.

From step 218′, the LIMLU operation sequence proceeds to point 220′, where it is exited, and the operation sequence control unit 16 is then ready to execute the necessary control steps for the next machine instruction stored in the instruction register 12.

Figure 8B:
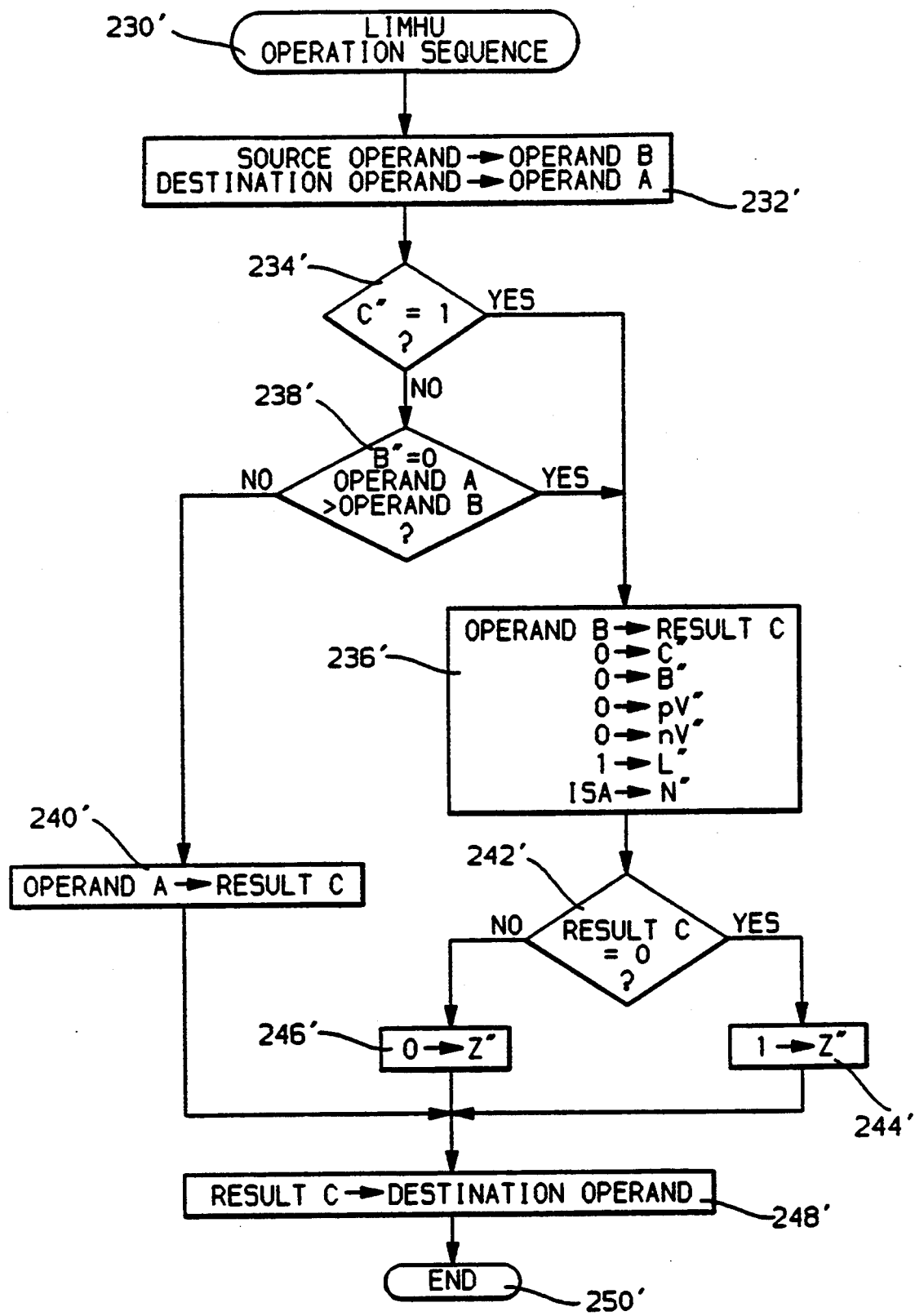

FIG. 8B illustrates the sequence of steps performed by the operation sequence control unit 16 in response to the decoding of a LIMHU instruction for the second embodiment of the invention. The LIMHU operation sequence is entered at point 230′, when the operation sequence control unit 16 determines that a LIMHU instruction has been loaded into the instruction register 12, based upon the decoded instruction opcode provided by the instruction decoder 14.

From point 230′ the operation sequence proceeds to control step 232′ where the numeric value of the software variable VAR is stored in the A register 102 as operand A, and the numeric value of the upper bound UB for VAR is stored in the B register 100 as operand B.

From control step 232′, the operation sequence proceeds to decision control step 234′, where the value of the condition code C″-bit is tested to determine whether the C″-bit flag 502 has been set to a logic 1 value. If the C″-bit has a logic 1 value, this indicates that an unsigned overflow in the positive direction occurred during the execution of the unsigned arithmetic operation used to compute the numeric value for VAR. As a result, the numeric value VAR currently stored as operand A is mathematically undefined, and the operation sequence is directed to control step 236′. Conversely, if the C″-bit has a logic 0 value, this indicates that positive unsigned overflow did not occur during the unsigned arithmetic operation used to compute the numeric value for VAR, and the operation sequence is directed to decision control step 238′.

At decision step 238′, the value of the B″-bit is tested to determined if the B″-bit flag 504 has been set to a logic 0 value, and the numeric value for VAR stored as operand A is tested against the value of the upper bound UB stored as operand B by way of an unsigned compare operation. If the B″-bit has a logic 0 value and operand A is greater than operand B, this indicates that negative unsigned overflow did not occur when the numeric value for VAR was computed, but VAR is out of range in the positive direction. As a result, the operation sequence is directed to control step 236′. If either the B″-bit is not equal to a logic 0 value, or operand A is not greater than operand B, the operation sequence is directed to control step 240′.

At control step 240′, the numeric value for VAR, stored as operand A, is sent to the C register 106 to be stored as result C. The operation sequence is then directed to control step 248′.

Return now to control step 236′, which is either branched to from control step 234′ when the C″-bit has a logic 1 value, or branched to from control step 238′ when the valid numeric value for VAR is greater than its acceptable upper bound UB. At this control step, operand B is transferred to the C register 106 and stored as the result C. The condition code C″-bit flag 502, B″-bit flag 504, pV‴-bit flag 506, and nV‴-bit flag 508 are all cleared to logic 0 values. In addition, the condition code L″-bit flag 512 is set to a logic 1 value, and the N″-bit flag 510 is set to a value that is instruction set assignable (ISA). As in the discussion of the first embodiment, the rationale for performing these particular operations will be deferred until the discussion of remaining control steps in the LIMHU instruction has been completed.

From control step 236′ the LIMHU operation sequence proceeds through the set of control steps 242′, 244′, and 246′ to set the value of the Z″-bit flag 500 to a logic 1 value, if the result C stored in the C register 106 is equal to a binary zero value, otherwise the Z″-bit flag 500 is set to a logic 0 value. This setting of the Z″-bit flag 500 compares exactly with the setting of the Z′-bit flag 70 performed by the corresponding control steps 242, 244, and 246 shown in FIG. 5B.

From control step 240′, 244′, or 246′, the LIMHU operation sequence is directed to control step 248′. Here, the result C stored in the C register 106 is stored in the register specified by the destination operand field 66 of the LIMHU instruction. Recall that this register contains the numeric value for the software variable VAR.

From step 248′, the LIMHU operation sequence proceeds to point 250′, where it is exited, and the operation sequence control unit 16 is then ready to execute the necessary control steps for the next machine instruction stored in the instruction register 12.

As with the first embodiment, to check both bounds of the range of an unsigned software variable, the LIMLU and LIMHU machine instructions are in this case placed in a software program one after the other following the arithmetic instruction that computes the unsigned numeric value of the software variable that is to be range checked and possibly limited. However, in the second embodiment, the order in which the LIMLU and LIMHU instructions are used in a program does not dependent upon the type of arithmetic instruction used to compute the numeric value of the software variable. This is due to the fact that the condition code architecture of the second embodiment distinguishes between the unsigned overflow in the negative and positive directions by setting the C″-bit flag 502 to indicate the occurrence of positive unsigned overflow and sets the B″-bit flag 504 to indicate occurrence of negative unsigned overflow (also known as underflow). The LIMLU and LIMHU instructions of the second embodiment take advantage of this information and limit the numeric value of a software variable that was generated with occurrence of unsigned overflow to the correct bound, regardless of the order in which the LIMLU and LIMHU instructions appear in a software program.

Those skilled in the art will recognize that the operations associated with the lower and upper bounds performed by the execution of the LIMLU and LIMHU instructions could be merged into a single instruction since the order in which the operations are performed is not important.

At control steps 206′ and 236′ of the LIMLU and LIMHU operation sequences in FIGS. 8A and 8B, the C″-bit flag 502, the B″-bit flag 504, the pV‴-bit flag 506, and the nV‴-bit flag 508 were all set to logic 0 values, after storing operand B as result C in the C register 106. These flags are all cleared to logic 0 values to indicate that the software variable VAR is no longer out of range due to unsigned or signed overflow because the transfer of operand B to the C register 106 acts to limit the value of VAR to its acceptable range.

It will also be recognized that at control steps 206′ and 236′ in the respective LIMLU and LIMHU operation sequences, the L″-bit flag 512 is set to a logic 1 value. This setting of the L″-bit indicates that value of the software variable being checked has been range limited. As stated previously, this indication could be used, for example, to provide a warning that a control parameter is out of range when the microprocessor 10 is employed in a control system application, or to provide diagnostic information regarding the software variable that could be stored in the memory unit 26 for later retrieval.

Also as indicated, the N″-bit flag 510 is set equal to an instruction set assignable value (ISA) at control steps 206′ and 236′ of the respective LIMLU and LIMHU operation sequences. Normally the N″-bit flag 510 would be set to a logic 0 value since the value of the software variable being range checked was generated by an unsigned operation, however, it could be set to the value of the MSB of the result C stored in the C register 106, or in any other way that might be advantageous with respect to the microprocessor's implemented instruction set.

Figure 8C:
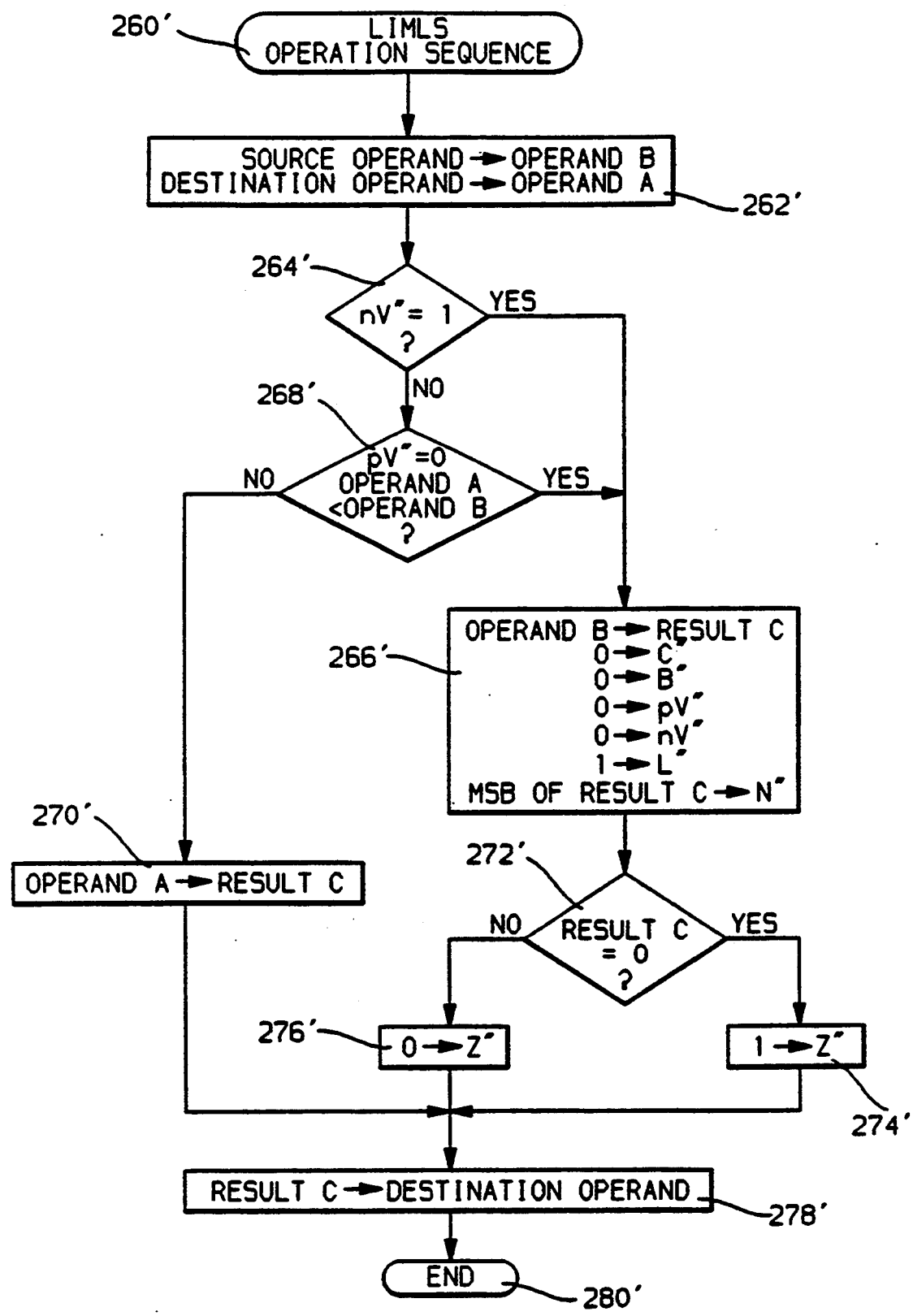

FIG. 8C illustrates the sequence of steps performed by the operation sequence control unit 16 in response to the decoding of a LIMLS instruction for the second embodiment of the invention. The LIMLS operation sequence is entered at point 260′, when the operation sequence control unit 16 determines that a LIMLS instruction has been loaded into the instruction register 12, based upon the decoded instruction opcode provided by the instruction decoder 14.

From point 260′, the operation sequence proceeds to control step 262′ where the numeric value of the software variable VAR is stored in the A register 102 as operand A, and the numeric value of the lower bound LB for VAR is stored in the B register 100 as operand B.

From control step 262′, the operation sequence proceeds to decision control step 264′, where the value of the condition code nV″-bit is tested to determine whether the nV‴-bit flag 508 has been set to a logic 1 value. If the nV‴-bit has a logic 1 value, this indicates that a signed overflow in the negative direction occurred during the execution of the signed arithmetic operation used to compute the numeric value for VAR. As a result, the numeric value VAR currently stored as operand A is mathematically undefined, and the operation sequence is directed to control step 266′. Conversely, if the nV‴-bit has a logic 0 value, this indicates that negative signed overflow did not occur during the signed arithmetic operation used to compute the numeric value for VAR, and the operation sequence is directed to decision control step 268′.

At decision step 268′, the value of the pV‴-bit is tested to determined if the pV‴-bit flag 506 has been set to a logic 0 value, and the numeric value for VAR stored as operand A is tested against the value of the lower bound LB stored as operand B by way of a signed compare operation. If the pV‴-bit has a logic 0 value and operand A is less than operand B, this indicates that positive signed overflow did not occur when the numeric value for VAR was computed, but VAR is out of range in the negative direction. As a result, the operation sequence is directed to control step 266′. If either the pV‴-bit is not equal to a logic 0 value, or operand A is not less than operand B, the operation sequence is directed to control step 270′.

At control step 270′, the numeric value for VAR, stored as operand A, is sent to the C register 106 to be stored as result C. The operation sequence is then directed to control step 278′.

Return now to control step 266′, which is either branched to from control step 264′ when the nV‴-bit has a logic 1 value, or branched to from control step 268′ when the valid numeric value for VAR is less than its acceptable lower bound LB. At this control step, operand B is transferred to the C register 106 and stored as the result C. The condition code C″-bit flag 502, B″-bit flag 504, pV‴-bit flag 506, and nV‴-bit flag 508 are all cleared to logic 0 values. In addition, the condition code L″-bit flag 512 is set to a logic 1 value, and the N″-bit flag 510 is set equal to the value of the MSB of the result C stored in the C register 106. As in the discussion of the first embodiment, the rationale for performing these particular operations will be set forth later, after a discussion of the companion LIMHS instruction has been completed.

From control step 266′ the LIMLS operation sequence proceeds through the set of control steps 272′, 274′, and 276′ to set the value of the Z″-bit flag 500 to a logic 1 value, if the result C stored in the C register 106 is equal to a binary zero value, otherwise the Z″-bit flag 500 is set to a logic 0 value. This setting of the Z″-bit flag 500 compares exactly with the setting of the Z′-bit flag 70 performed by the corresponding control steps 272, 274, and 276 shown in FIG. 5C.

From control step 270′, 274′, or 276′, the LIMLS operation sequence is directed to control step 278′. Here, the result C stored in the C register 106 is stored in the register specified by the destination operand field 66 of the LIMLU instruction. Recall that this register contains the numeric value for the software variable VAR.

From step 278′, the LIMLS operation sequence proceeds to point 280′, where it is exited, and the operation sequence control unit 16 is then ready to execute the necessary control steps for the next machine instruction stored in the instruction register 12.

Figure 8D:
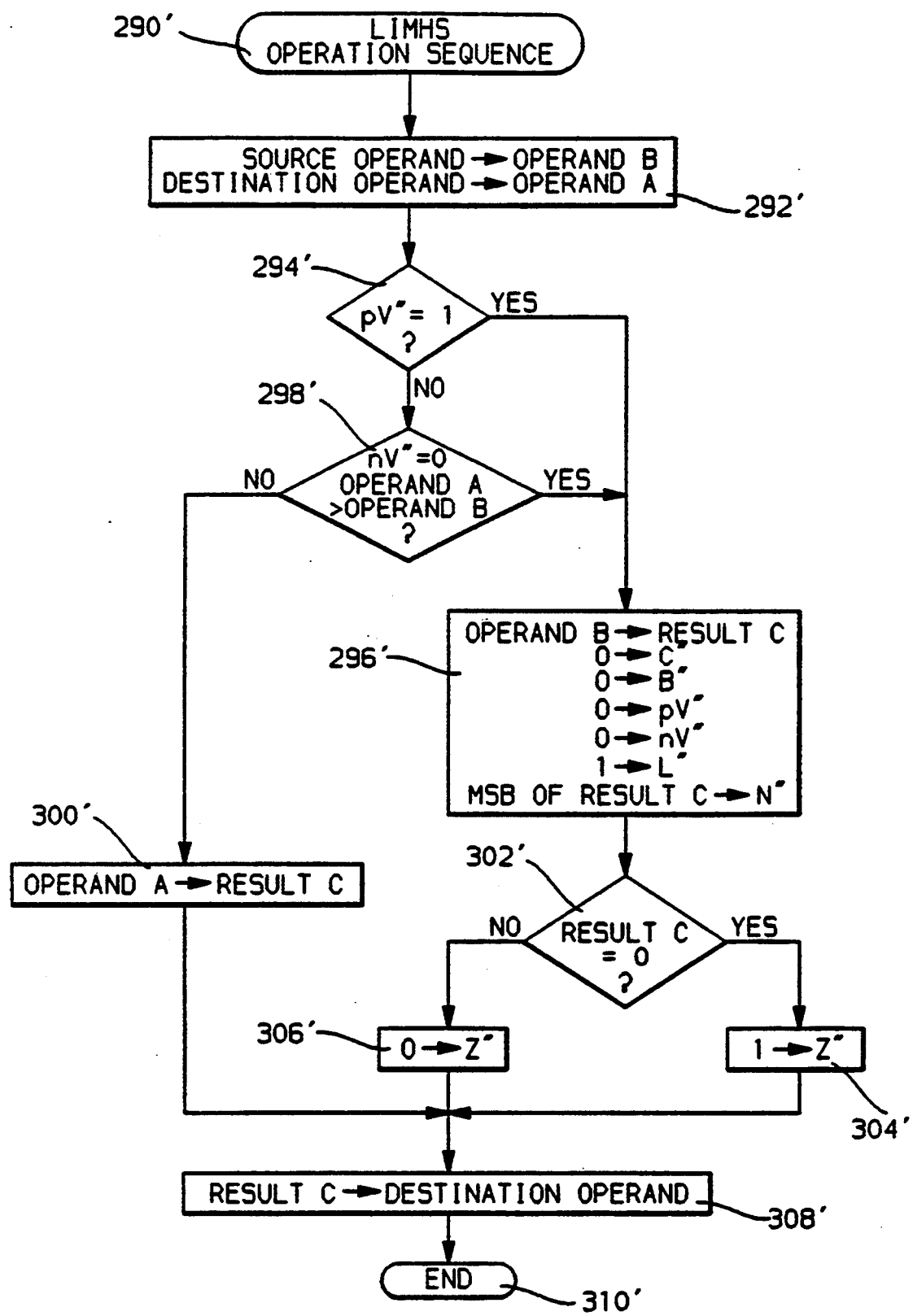

FIG. 8D illustrates the sequence of steps performed by the operation sequence control unit 16 in response to the decoding of a LIMHS instruction for the second embodiment of the invention. The LIMHS operation sequence is entered at point 290′, when the operation sequence control unit 16 determines that a LIMHS instruction has been loaded into the instruction register 12, based upon the decoded instruction opcode provided by the instruction decoder 14.

From point 290′, the operation sequence proceeds to control step 292′ where the numeric value of the software variable VAR is stored in the A register 102 as operand A, and the numeric value of the upper bound UB for VAR is stored in the B register 100 as operand B.

From control step 292′, the operation sequence proceeds to decision control step 294′, where the value of the condition code pV″-bit is tested to determine whether the pV‴-bit flag 506 has been set to a logic 1 value. If the pV‴-bit has a logic 1 value, this indicates that a signed overflow in the positive direction occurred during the execution of the signed arithmetic operation used to compute the numeric value for VAR. As a result, the numeric value VAR currently stored as operand A is mathematically undefined, and the operation sequence is directed to control step 296′. Conversely, if the pV‴-bit has a logic 0 value, this indicates that positive signed overflow did not occur during the signed arithmetic operation used to compute the numeric value for VAR, and the operation sequence is directed to decision control step 298′.

At decision step 298', the value of the nV'''-bit is tested to determined if the nV'''-bit flag 508 has been set to a logic 0 value, and the numeric value for VAR stored as operand A is tested against the value of the upper bound UB stored as operand B by way of a signed compare operation. If the nV'''-bit has a logic 0 value and operand A is greater than operand B, this indicates that negative signed overflow did not occur when the numeric value for VAR was computed, but VAR is out of range in the positive direction. As a result, the operation sequence is directed to control step 296'. If either the nV'''-bit is not equal to a logic 0 value, or operand A is not greater than operand B, the operation sequence is directed to control step 300'.

At control step 300', the numeric value for VAR, stored as operand A, is sent to the C register 106 to be stored as result C. The operation sequence is then directed to control step 308'.

Return now to control step 296', which is either branched to from control step 294' when the pV'''-bit has a logic 1 value, or branched to from control step 298' when the valid numeric value for VAR is greater than its acceptable upper bound UB. At this control step, operand B is transferred to the C register 106 and stored as the result C. The condition code C''-bit flag 502, B''-bit flag 504, pV'''-bit flag 506, and nV'''-bit flag 508 are all cleared to logic 0 values. In addition, the condition code L''-bit flag 512 is set to a logic 1 value, and the N''-bit flag 510 is set equal to the value of the MSB of the result C in the C register 106. As in the discussion of the first embodiment, the rationale for performing these particular operations will be deferred until the discussion of remaining control steps in the LIMHS instruction has been completed.

From control step 296' the LIMHS operation sequence proceeds through the set of control steps 302', 304', and 306' to set the value of the Z''-bit flag 500 to a logic 1 value, if the result C stored in the C register 106 is equal to a binary zero value, otherwise the Z''-bit flag 500 is set to a logic 0 value. This setting of the Z''-bit flag 500 compares exactly with the setting of the Z'-bit flag 70 performed by the corresponding control steps 302, 304, and 306 shown in FIG. 5D.

From control step 300', 304', or 306', the LIMHS operation sequence is directed to control step 308'. Here, the result C stored in the C register 106 is stored in the register specified by the destination operand field 66 of the LIMHS instruction. Recall that this register contains the numeric value for the software variable VAR.

From step 308', the LIMHS operation sequence proceeds to point 310', where it is exited, and the operation sequence control unit 16 is then ready to execute the necessary control steps for the next machine instruction stored in the instruction register 12.

In order to check both bounds of the range, the LIMLS and LIMHS machine instructions are in this case placed in a software program one after the other following the arithmetic instruction that computes the signed numeric value of a software variable that is to be range checked and possibly limited. As in the first embodiment, the order in which the LIMLS and LIMHS instructions are used in a program does not depend upon the type of arithmetic instruction used to compute the numeric value for the software variable that is to be range checked and possibly limited. Those skilled in the art will recognize that the operations associated with the lower and upper bounds performed by the execution of the LIMLS and LIMHS instructions could be merged into a single instruction since the order in which the operations are performed is not important.

It will be recognized that by ??providing separate indicators for the occurrence of negative and positive signed overflows via the nV'''-bit flag 508 and the pV'''-bit flag 506, respectively, the condition code architecture of the second embodiment simplifies the determination signed overflow direction. As a result, the occurrence and direction of signed overflow can be determined by testing the setting of a single condition code flag (see steps 264' and 294' in the respective LIMLS and LIMHS operation sequences of FIGS. 8C and 8D), rather than testing the settings of two flags as required by the first embodiment (see steps 264 and 294 in the respective LIMLS and LIMHS operation sequences of FIGS. 4C and 4D).

At control steps 266' and 296' of the LIMLS and LIMHS operation sequences in FIGS. 8C and 8D, the C''-bit flag 502, the B''-bit flag 504, the pV'''-bit flag 506, and the nV'''-bit flag 508 were all set to logic 0 values, after storing operand B as result C in the C register 106. These flags are all cleared to logic 0 values to indicate that the software variable VAR is no longer out of range due to unsigned or signed overflow because the transfer of operand B to the C register 106 acts to limit the value of VAR to its acceptable range.

It will be recognized that at control steps 266' and 296' in the respective LIMLS and LIMHS operation sequences, the L''-bit flag 512 is set to a logic 1 value. It will be recognized that the second embodiment provides a separate condition code L''-bit flag 512 to indicate when the value of a software variable has been limited. This is much simpler than sharing the limit indicating function between the C'-bit flag 72 and the V'-bit flag 74, as required in the first embodiment of the invention.

Those skilled in the art will understand that not all of the condition code flags and associated architecture described in the second embodiment need be implemented simultaneously. For example, the C'-bit flag 72 described in the first embodiment could be replaced by the C''-bit flag 502 and B''-bit flag 504 of the second embodiment (including the associated condition code architecture) to provide indications of positive and negative unsigned overflow. Alternatively, the V'-bit flag 74 of the first embodiment could be replaced by the pV'''-bit flag 506 and the nV'''-bit flag 508 of the second embodiment (including the associated condition code architecture) to simplify the indication of the occurrence of positive and negative signed overflow. Also, the N'-bit flag 76 of the first embodiment could be replaced by the N'''-bit flag 510 of the second embodiment (including the associated condition code architecture) in order to more simply indicate the theoretical sign of signed arithmetic operations, and in order to reduce the traditional number of branching instructions in a microprocessor's instruction set.

Additionally, the operation sequence control unit 16 does not have to be implemented to execute all of the arithmetic instructions discussed in the specification, as long as the condition code flags are set in a mathematically consistent fashion for all arithmetic instructions that are in the instruction set defined for the microprocessor. In fact, the signed and unsigned portions of the condition code architectures of the first and second embodiments could be implemented separately for microprocessors performing only unsigned arithmetic operations or only signed arithmetic operations.

Those skilled in the art will also recognize that the principles underlying the mathematically consistent condition code architecture provided by the above described embodiments affords various uses and advantages apart from the implementation of single instruction range checking and limiting operations. Those skilled in the art will also recognize that by indicating the theoretical sign of a result generated by a signed arithmetic operation, which is decoupled from the indication of signed overflow, traditional branching instructions within a microprocessor's instruction set that utilize condition code settings can be reduced in number and complexity without any loss in functionality.

It will also be recognized that that the above described limiting functions perform the well known mathematical functions of MAX and MIN when the microprocessor is not in an overflow state. Thus, the LIMLU and LIMLS instructions operate as unsigned and signed MAX functions, respectively, and the LIMHU and LIMHS instructions operate as unsigned and signed MIN functions, respectively, when the numeric value of the software variable being operated on was generated without the occurrence of overflow.

Thus, the aforementioned description of the embodiments of the invention are for the purpose of illustrating the invention, and are not to be considered as limiting or restricting the invention, since many modifications may be made by the exercise of skill in the art without departing from the scope of the invention.

The embodiments of the invention in which an exclusive property or privilege is claimed are defined as follows:

1. A data processing system for operating on a numeric value of a software variable used by the data processing system to ensure that the numeric value is within a predetermined range, of acceptable values established by an upper bound and a lower bound, the data processing system comprising:
   an arithmetic logic unit for performing an arithmetic operation to generate the numeric value of the software variable in response to execution of an arithmetic instruction selected from a set of arithmetic instructions defined for the data processing system;
   a register containing condition code flags;
   first means for setting the condition code flags to indicate an occurrence of arithmetic overflow and a direction for the arithmetic overflow when the arithmetic logic unit performs the arithmetic operation to generate the numeric value of the software variable; and
   second means for limiting the numeric value of the software variable to the upper bound when one of a first condition and a second condition occurs and for limiting the numeric value of the software variable to the lower bound when one of a third condition and a fourth condition occurs, wherein:
   the first condition occurs when the numeric value for the software variable is generated with arithmetic overflow in a positive direction,
   the second condition occurs when the numeric value for the software variable is generated without arithmetic overflow, and the numeric value is greater than the upper bound,
   the third condition occurs when the numeric value for the software variable is generated with arithmetic overflow in a negative direction, and
   the fourth condition occurs when the numeric value for the software variable is generated without arithmetic overflow, and the numeric value is less than the lower bound.

2. The data processing system described in claim 1, wherein the numeric value of the software variable is generated by performing an unsigned arithmetic operation and setting of the condition code flags indicate unsigned arithmetic overflow and a direction for the unsigned arithmetic overflow.

3. The data processing system described in claim 2, wherein the register contains a negative unsigned overflow flag for indicating occurrence of unsigned overflow in a negative direction, and a positive unsigned overflow flag for indicating occurrence of unsigned overflow in a positive direction.

4. The data processing system described in claim 1, wherein the numeric value of the software variable is generated by performing a signed arithmetic operation and setting of the condition code flags indicate occurrence of a signed arithmetic overflow and a direction for the signed arithmetic overflow.

5. The data processing system described in claim 4, wherein the register contains a negative signed overflow flag for indicating occurrence of signed overflow in a negative direction, and a positive signed overflow flag for indicating occurrence of signed overflow in a positive direction.

6. The data processing system described in claim 1, wherein the second means includes means for executing a first instruction to effectuate limiting of the numeric value to the upper bound when one of the first condition and the second condition occurs, and means for executing a second instruction to effectuate limiting of the numeric value to the lower bound when one of the third condition and the fourth condition occurs.

7. A data processing system having a mathematically consistent condition code architecture comprising:
   means for executing instructions selected from a set of arithmetic instructions defined for the data processing system;
   an arithmetic logic unit for performing arithmetic operations in response to execution of instructions selected from the set of arithmetic instructions;
   a register containing condition code flags; and
   means for setting the condition code flags for each instruction in the set of arithmetic instructions to indicate (A) an occurrence of an unsigned overflow and a direction for the unsigned overflow when the arithmetic logic unit performs an unsigned arithmetic operation; and (B) an occurrence of a signed overflow and a direction for the signed overflow when the arithmetic logic unit performs a signed arithmetic operation.

8. The data processing system described in claim 7, wherein the register contains a negative unsigned overflow flag for indicating occurrence of unsigned overflow in a negative direction, and a positive unsigned overflow flag for indicating occurrence of unsigned overflow in a positive direction.

9. The data processing system described in claim 7, wherein the register contains a negative signed overflow flag for indicating occurrence of signed overflow in a negative direction, and a positive signed overflow flag for indicating occurrence of signed overflow in a positive direction.

10. A data processing system for operating on a numeric value of a software variable used by the data processing system to ensure that the numeric value is within a predetermined range of acceptable values established by an upper bound and a lower bound, the data processing system comprising:
- an arithmetic logic unit for performing an arithmetic operation to generate the numeric value of the software variable in response to execution of an arithmetic instruction selected from a set of arithmetic instructions defined for the data processing system;
- a register containing condition code flags;
- first means for setting the condition code flags to indicate an occurrence of unsigned arithmetic overflow when the arithmetic logic unit performs an unsigned arithmetic operation to generate the numeric value of the software variable; and
- second means for limiting the numeric value of the software variable to the upper bound when one of a first condition and a second condition occurs and for limiting the numeric value of the software variable to the lower bound when one of a third condition and a fourth occurs, wherein:
- the first condition occurs when the numeric value for the software variable is generated with unsigned arithmetic overflow in response to the execution of an unsigned arithmetic instruction that only produces unsigned arithmetic overflow in a positive direction,
- the second condition occurs when the numeric value for the software variable is generated without unsigned arithmetic overflow, and the numeric value is greater than the upper bound,
- the third condition occurs when the numeric value for the software variable is generated with unsigned arithmetic overflow in response to the execution of an unsigned arithmetic instruction that only produces unsigned arithmetic overflow in a negative direction, and
- the fourth condition occurs when the numeric value for the software variable is generated without unsigned arithmetic overflow, and the numeric value is less than the lower bound.

11. The data processing system described in claim 10, wherein the second means includes means for executing a first instruction to effectuate limiting of the numeric value to the upper bound when one of the first condition and the second condition occurs, and means for executing a second instruction to effectuate limiting of the numeric value to the lower bound when one of the third condition and the fourth condition occurs.

12. A data processing system having a mathematically consistent condition code architecture comprising:
- means for executing instructions selected from a set of arithmetic instructions defined for the data processing system;
- an arithmetic logic unit for performing arithmetic operations in response to execution of instructions selected from the set of arithmetic instructions;
- a register containing condition code flags;
- means for setting the condition code flags for each instruction in the set of arithmetic instructions to indicate (A) an occurrence of unsigned overflow when the arithmetic logic unit performs an unsigned arithmetic operation, and (B) an occurrence of signed overflow and a direction for the signed overflow when the arithmetic logic unit performs a signed arithmetic operation; and
- wherein the set of arithmetic instructions defined for the data processing systems includes at least one instruction selected from a group of arithmetic instructions effectuating multiplication and division operations in the arithmetic logic unit.

13. A data processing system having a mathematically consistent condition code architecture comprising:
- means for executing instructions selected from a set of arithmetic instructions defined for the data processing system;
- an arithmetic logic unit for performing arithmetic operations in response to execution of instructions selected from the set of arithmetic instructions;
- a register containing code flags;
- means for setting the condition code flags for each instruction in the set of arithmetic instructions to indicate (A) an occurrence of an unsigned overflow and a direction for the unsigned overflow when the arithmetic logic unit performs an unsigned arithmetic operation, and (B) an occurrence of a signed overflow and a direction for the signed overflow when the arithmetic logic unit performs a signed arithmetic operation; and
- wherein the set of arithmetic instructions defined for the data processing systems includes at least one instruction effectuating an unsigned addition operation and at least one instruction effectuating an unsigned subtraction operation in the arithmetic logic unit.

14. A data processing system for operating on a numeric value of a software variable used by the data processing system to ensure that the numeric value is within a predetermined range of acceptable values established by an upper bound and a lower bound, the data processing system comprising:
- an arithmetic logic unit for performing an arithmetic operation to generate the numeric value of the software variable in response to execution of an arithmetic instruction selected from a set of arithmetic instructions defined for the data processing system;
- a register containing condition code flags;
- first means for setting the condition code flags to indicate a status of the arithmetic operation performed in the arithmetic logic unit to generate the numeric value of the software variable; and
- second means for executing a range checking and limiting instruction to (A) determine whether the numeric value of the software variable is outside the acceptable range of values based at least upon the indicated status of the arithmetic operation performed in the arithmetic logic unit, and (B) set the numeric value of the software variable to one of the upper and lower bounds based at least upon the indicated status of the arithmetic operation performed in the arithmetic logic unit, when the numeric value of the software variable is outside the acceptable range of values.

* * * * *